DIGITAL COMPUTER WITH INHERENT SHIFT

Filed March 5, 1954 23 Sheets-Sheet 1

INVENTORS
BERNARD L. SARAHAN, RICHARD C. JEFFREY,
JOHN F. JACOBS, ROLLIN P. MAYER,
SAMUEL L. THOMPSON
BY Ralph L. Thomas
ATTORNEY INVENTORS
BERNARD L. SARAHAN, RICHARD C. JEFFREY,
JOHN F. JACOBS, ROLLIN P. MAYER,
SAMUEL L. THOMPSON.
BY Ralph L. Thomas
ATTORNEY INVENTORS
BERNARD L. SARAHAN, RICHARD C. JEFFREY,
JOHN F. JACOBS, ROLLIN P. MAYER,
SAMUEL L. THOMPSON
BY Ralph L. Thomas
ATTORNEY

DIGITAL COMPUTER WITH INHERENT SHIFT

Filed March 5, 1954 23 Sheets-Sheet 4

INVENTORS
BERNARD L. SARAHAN, RICHARD C. JEFFREY,
JOHN F. JACOBS, ROLLIN P. MAYER,
SAMUEL L. THOMPSON.
BY Ralph L. Thomas
ATTORNEY INVENTORS
BERNARD L. SARAHAN, RICHARD C. JEFFREY
JOHN F. JACOBS, ROLLIN P. MAYER
SAMUEL L. THOMPSON
BY Ralph L. Thomas
ATTORNEY INVENTORS
BERNARD L. SARAHAN, RICHARD C. JEFFREY,
JOHN F. JACOBS, ROLLIN P. MAYER,
SAMUEL L. THOMPSON
BY Ralph L. Thomas
ATTORNEY INVENTORS
BERNARD L. SARAHAN, RICHARD C. JEFFREY, JOHN F. JACOBS, ROLLIN P. MAYER, SAMUEL L. THOMPSON.
BY Ralph L. Thomas
ATTORNEY INVENTORS
BERNARD L. SARAHAN, RICHARD C. JEFFREY,
JOHN F. JACOBS, ROLLIN P. MAYER,
SAMUEL L. THOMPSON
BY Ralph L. Thomas
ATTORNEY Aug. 1, 1961 B. L. SARAHAN ET AL 2,994,478

DIGITAL COMPUTER WITH INHERENT SHIFT

Filed March 5, 1954 23 Sheets-Sheet 9

INVENTORS
BERNARD L. SARAHAN, RICHARD C. JEFFREY,
JOHN F. JACOBS, ROLLIN P. MAYER,
SAMUEL L. THOMPSON
BY Ralph L. Thomas
ATTORNEY

DIGITAL COMPUTER WITH INHERENT SHIFT

Filed March 5, 1954 23 Sheets-Sheet 10

INVENTORS
BERNARD L. SARAHAN, RICHARD C. JEFFREY,
JOHN F. JACOBS, ROLLIN P. MAYER,
SAMUEL L. THOMPSON.
BY Ralph L. Thomas
ATTORNEY Aug. 1, 1961 B. L. SARAHAN ET AL 2,994,478

DIGITAL COMPUTER WITH INHERENT SHIFT

Filed March 5, 1954 23 Sheets-Sheet 11

INVENTORS
BERNARD L. SARAHAN, RICHARD C. JEFFREY,
JOHN F. JACOBS, ROLLIN P. MAYER,
SAMUEL L. THOMPSON.

BY Ralph L. Thomas
ATTORNEY

DIGITAL COMPUTER WITH INHERENT SHIFT

Filed March 5, 1954 23 Sheets-Sheet 12

INVENTORS
BERNARD L. SARAHAN, RICHARD C. JEFFREY,
JOHN F. JACOBS, ROLLIN P. MAYER,
SAMUEL L. THOMPSON.
BY Ralph L. Thomas
ATTORNEY INVENTORS
BERNARD L. SARAHAN, RICHARD C. JEFFREY,
JOHN F. JACOBS, ROLLIN P. MAYER,
SAMUEL L. THOMPSON.
BY Ralph L. Thomas
ATTORNEY INVENTORS
BERNARD L. SARAHAN, RICHARD C. JEFFREY,
JOHN F. JACOBS, ROLLIN P. MAYER,
SAMUEL L. THOMPSON
BY Ralph L. Thomas
ATTORNEY

DIGITAL COMPUTER WITH INHERENT SHIFT

Filed March 5, 1954 23 Sheets-Sheet 15

INVENTORS
BERNARD L. SARAHAN, RICHARD C. JEFFREY,
JOHN F. JACOBS, ROLLIN P. MAYER,
SAMUEL L. THOMPSON
BY Ralph L. Thomas
ATTORNEY INVENTORS
BERNARD L. SARAHAN, RICHARD C. JEFFREY,
JOHN F. JACOBS, ROLLIN P. MAYER,
SAMUEL L. THOMPSON.
BY Ralph L. Thomas
ATTORNEY INVENTORS
BERNARD L. SARAHAN, RICHARD C. JEFFREY,
JOHN F. JACOBS, ROLLIN P. MAYER,
SAMUEL L. THOMPSON BY Ralph L. Thomas
ATTORNEY INVENTORS
BERNARD L. SARAHAN, RICHARD C. JEFFREY,
JOHN F. JACOBS, ROLLIN P. MAYER,
SAMUEL L. THOMPSON.

BY Ralph L. Thomas
ATTORNEY

DIGITAL COMPUTER WITH INHERENT SHIFT

Filed March 5, 1954 23 Sheets-Sheet 19

INVENTORS
BERNARD L. SARAHAN, RICHARD C. JEFFREY,
JOHN F. JACOBS, ROLLIN P. MAYER,
SAMUEL L. THOMPSON,
BY Ralph L. Thomas
ATTORNEY Aug. 1, 1961 B. L. SARAHAN ET AL 2,994,478

DIGITAL COMPUTER WITH INHERENT SHIFT

Filed March 5, 1954 23 Sheets-Sheet 20

INVENTORS
BERNARD L. SARAHAN, RICHARD C. JEFFREY,
JOHN F. JACOBS, ROLLIN P. MAYER,
SAMUEL L. THOMPSON
BY Ralph L. Thomas
ATTORNEY INVENTORS
BERNARD L. SARAHAN, RICHARD C. JEFFREY,
JOHN F. JACOBS, ROLLIN P. MAYER,
SAMUEL L. THOMPSON
BY Ralph L. Thomas
ATTORNEY INVENTORS
BERNARD L. SARAHAN, RICHARD C. JEFFREY,
JOHN F. JACOBS, ROLLIN P. MAYER,
SAMUEL L. THOMPSON.

BY Ralph L. Thomas
ATTORNEY

DIGITAL COMPUTER WITH INHERENT SHIFT

INVENTORS
BERNARD L. SARAHAN, RICHARD C. JEFFREY,
JOHN F. JACOBS, ROLLIN P. MAYER,
SAMUEL L. THOMPSON
BY Ralph L. Thomas
ATTORNEY United States Patent Office
2,994,478
Patented Aug. 1, 1961

2,994,478

DIGITAL COMPUTER WITH INHERENT SHIFT

Bernard L. Sarahan, Poughkeepsie, N.Y., Richard C. Jeffrey, Boston, John F. Jacobs, Natick, and Rollin P. Mayer, Concord, Mass., and Samuel L. Thompson, Poughkeepsie, N.Y., assignors, by direct and mesne assignments, to Research Corporation, New York, N.Y., a corporation of New York Filed Mar. 5, 1954, Ser. No. 414,459
19 Claims. (Cl. 235—175)

This invention relates to electronic digital computing devices and more particularly to electronic digital computing devices of the parallel binary type.

It is of particular importance in this type of computer that the speed, at which certain mathematical processes are performed, be as fast as possible. According to the present invention, addition operations are accompanied by an inherent shift and as a result, an arithmetic operation such as multiplication by over and over addition is accomplished at a much higher rate of speed than was heretofore possible.

Briefly stated, the multiplier in binary form is inspected one bit at a time, proceeding from the least significant bit to the most significant bit, and if the inspected bit is a ONE, the multiplicand (contained in the A Register) is added to the partial product (contained in the Accumulator Register) and the sum appears in the Accumulator Register inherently shifted one binary place. If the inspected bit is a ZERO, no addition takes place but the partial product (contained in the Accumulator Register) is shifted one binary place. During the process of multiplication by over and over addition, it was necessary heretofore to perform a separate shift operation following each addition operation, and therefore the multiplication process was more time consuming.

An object of the present invention is to provide an improved electronic digital computing device of the parallel binary type wherein addition operations are accompanied by an inherent shift.

A further object of this invention is to provide an improved electronic digital computing device of the parallel binary type in which addition is accomplished by successively adding corresponding orders of the addend and augend together with the carry from the next lower order, and producing a sum inherently shifted one binary place.

A still further object of this invention is to provide an improved electronic digital computer of the parallel type in which a carry signal in the nature of a command pulse ripples through a series of adders completing the final summation of three single order numbers in each adder of the series, two of the single order numbers in each adder being represented by D.C. level signals whose sum is represented by a D.C. level signal that waits for the carry signal to execute the final summation.

A still further object of this invention is to provide an improved electronic digital computer of the parallel type in which a carry signal in the nature of a command pulse ripples through a series of adders completing the final summation of three single order numbers in each adder of the series, two of the single order numbers in each adder being represented by D.C. level signals whose sum is represented by a D.C. level signal that waits for the carry signal to execute the final summation; storage of an end carry signal from the highest order adder representative of a carry greater than zero is effected, thereby permitting a command pulse representative of a carry greater than zero to initiate again the ripple operation through the series of adders.

Another object of this invention is to provide an improved high speed electronic digital multiplying device.

Still another object of this invention is to provide an improved electronic digital computing device for performing a multiplication process by over and over addition wherein addition operations are accompanied by an inherent shift.

A still further object of this invention is to provide an improved electronic digital computing device in which the multiplication process is performed with over and over addition by successively adding corresponding orders of the multipicand and partial product together with the carry from the next lower order and producing the next partial product inherently shifted one binary place.

Another object of this invention is to provide an improved digital computer wherein the speed of performing the multiplication process is increased by employing partial product commands which are asynchonous with respect to the execution of the command. More specifically, one partial product may be initiated, but before it has progressed to completion, another or several other partial products may be in progress.

Still another object of this invention is a provide an improved digital computer wherein the speed of performing the multiplication process is increased by employing partial product commands, which are asynchonous with respect to the execution of the commands, (1) to ripple shift a register (Accumulator Register), shifting its contents one order, upon the occurrence of a predetermined digit (zero) in the multiplier, or (2) to ripple through a series of adders, producing a sum in a register (Accumulator Register) inherently shifted one order, upon the occurrence of another predetermined digit (one) in the multiplier.

According to the present invention, the computer operations to perform a division process are reduced to a considerable degree by causing the machine to perform division by the "non-restoring" method and also during such method, subtraction is accomplished by addition of the two's complement, thereby eliminating the need for performing an end carry operation.

Briefly stated, the divisor is placed in what is known as the A Register, the dividend is placed in the Accumulator Register B Register combined and the partial remainders appear in the Accumulator Register. The partial remainders are produced by either adding the divisor as it stands in the A Register to the previous remainder, or adding the one's complement of the divisor and simultaneously an additional ONE in the lowest order to the previous remainder, depending respectively upon the plus or minus nature of the sign of the previous remainder. The quotient is produced bit by bit in the B Register and these bits are a ONE or a ZERO depending respectively upon the plus or minus nature of the sign of the remainder.

An object of this invention is to provide an improved electronic digital computing device wherein division is accomplished at a high rate of speed.

Another object of this invention is to provide an improved electronic digital computing device wherein division is accomplished by the non-restoring method and subtraction steps in the method are performed by adding the one's complement of the divisor and simultaneously a ONE in the lowest order.

A further object of this invention is to provide an improved electronic digital computing device wherein division is accomplished by adding the divisor as it appears in the A Register to two times the remainder resulting from the preceding trial subtraction (at the beginning this is, of course, the dividend), whenever the sign of the remainder is negative or adding the one's complement of the divisor simultaneously with an additional ONE in the lowest order to two times the remainder resulting from the preceding trial subtraction whenever the sign of the remainder is positive and producing the quotient, one bit at a time, proceeding from the highest order to the lowest order by recording a ZERO if the sign of the remainder, after a trial subtraction, is negative and a ONE if the sign of the remainder, after a trial subtraction, is positive.

Other objects of the invention will be pointed out in the following description and claims and illustrated in the accompanying drawings, which disclose, by way of example, the principle of the invention and the best mode which has been contemplated of applying that principle.

In the drawings:

FIG. 1 illustrates the manner in which FIGS. 2 through 20 are mechanically arranged to illustrate the computing device herein disclosed.

FIGS. 2 through 20, taken together as shown in FIG. 1, comprise a wiring diagram in block form of a computing device constructed in accordance with the principles of this invention.

Figure 1:
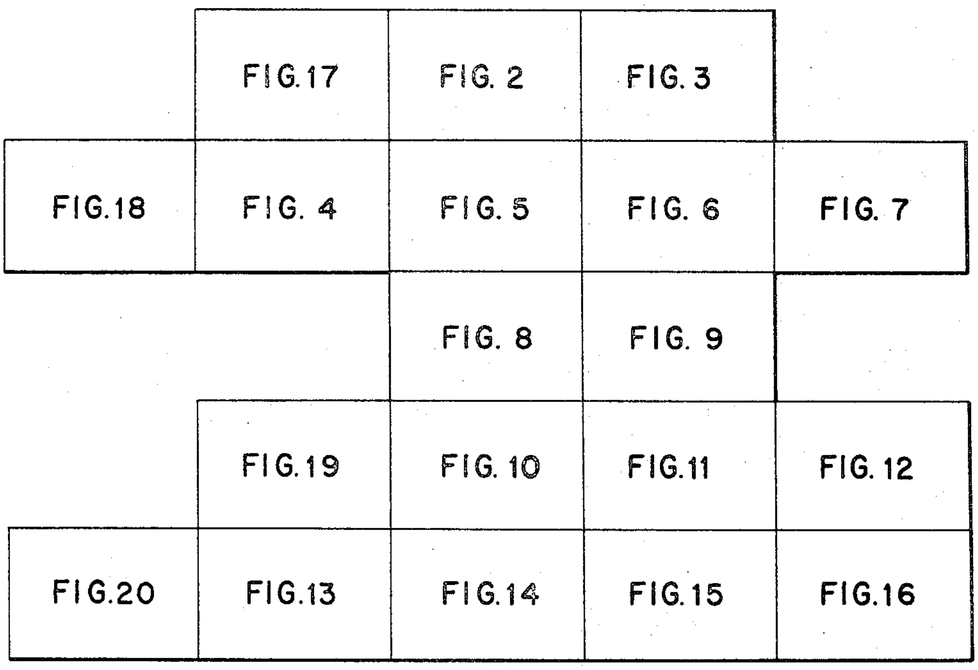

The apparatus illustrated and described is of the fixed binary point type wherein the numbers entered into the apparatus are of the binary fraction type. It is to be understood, however, that the invention is applicable to apparatus of the floating binary point type, and furthermore apparatus employing whole numbers could be used. In the interest of simplicity, the apparatus illustrated in the drawings and described hereinafter has been limited to three bits or stages plus sign bit or stage. It is to be understood, however, that the number of bits or stages employed in any apparatus constructed in accordance with the principles of this invention may be varied in accordance with the size of the numbers handled. A description of the general mathematical processes involved precedes the detailed description of the apparatus.

Positive numbers are held in the apparatus herein described as true numbers with a zero in the sign bit indicating a positive value.

Examples of positive numbers:

| Fraction: | Binary equivalent |
|---|---|
| +3/8 | 0.011 |
| +7/8 | 0.111 |
| +0 | 0.000 |

At least two distinct types of complementing systems for a binary computer are in common use today. These are given various names by different groups, but are most commonly referred to as the one's complement system and the two's complement system. Both systems are actually employed in the apparatus herein described.

Negative numbers are generally used in the apparatus as one's complements of the corresponding positive number. An exception to this rule occurs during the division process when the two's complement system is used.

Examples:

| Fraction: | Binary one's complement |
|---|---|
| —3/8 | 1.100 |
| —7/8 | 1.000 |
| —0 | 1.111 |

It is obvious from inspection of the above examples that the rule for obtaining the binary one's complement (to represent a negative number) from the binary number representative of the same valued plus number is simply to exchange all binary zeros for ones and all binary ones for zeros. This is a particularly simple machine operation since it is merely necessary to complement each flip-flop of the register by applying a negative pulse directly to both grids of the flip-flop simultaneously.

By definition, the argument of a complement system is that number which results when a number and its complement with respect to a particular argument are added together. By this definition, the one's complement system is a misnomer for the system just described; it more properly is labelled the negative zero complement system, since a binary number and its one's complemnt add up to 1.111. However, the definition just given is valid without reservation for the two's complement system. Thus, to find the two's complement of a binary number, that number is subtracted from the binary number 10.000 by the standard paper pencil method of borrows whenever necessary.

| Examples: | Binary two's complement |
|---|---|
| —3/8 | 1.101 |
| —7/8 | 1.001 |
| —0 | 10.000 |

A further characteristic of the two's complement system is that only positive zero can exist whereas in the one's complement system both positive zero (0.000) and negative zero (1.111) are possible. Nevertheless, this does not lead to any difficulty in using either system.

Inspection of the following examples indicates that the two's complement is equal to the one's complement increased by one in the lowest order.

| Positive Number | One's Complement | Two's Complement |
|---|---|---|
| 0.011 | 1.100 | 1.101 |
| 0.111 | 1.000 | 1.001 |
| 0.000 | 1.111 | 0.000 |

It is difficult for any digital calculating machine to subtract by borrowing. Hence, another way to obtain the two's complement of a binary number, is first to obtain the one's complement of the binary number and then add one to the lowest order of the one's complement. This is the method employed in the divide process in the apparatus herein described.

When adding two numbers together, it is possible to obtain a combination such that there will be a carry out of the highest order stage, or sign bit stage.

Examples:

| | | | |
|---|---|---|---|
| Case 1 | −3/8 | 1.100 | |
| | +(−3/8) | 1.100 | |
| | | 1.000 | Partial Sum |
| | −6/8 | 1.001 | Correct Answer |
| Case 2 | +1/8 | 0.001 | |
| | +(−3/8) | 1.100 | |
| | | 1.101 | Partial Sum |
| | −2/8 | 1.101 | Correct Answer |
| Case 3 | +1/8 | 0.001 | |
| | +(+3/8) | 0.011 | |
| | | 0.100 | Partial Sum |
| | +4/8 | 0.100 | Correct Answer |
| Case 4 | −1/8 | 1.110 | |
| | +(+3/8) | 0.011 | |
| | | 0.001 | Partial Sum |
| | +2/8 | 0.010 | Correct Answer |

Inspection of these examples indicates that the partial sum is either equal to the correct answer (cases 2 and 3) or is too low by one in the lowest order (cases 1 and 4). The cases where the partial sum is too low by one are those cases where there is a carry out of the sign bit. If circuits are provided to add the carryout of the sign bit into the lowest order bit, all cases are automatically corrected. In the apparatus herein described the carry out of the sign bit is stored temporarily in a "carry flip-flop" which is inspected after an add operation to see if a carry out from the sign bit took place. If so, a one is added to the lowest order bit; otherwise, nothing is added to the lowest order bit. This is known as end carry control.

It should be noted that the one's complement system was used for all negative numbers in the last examples cited. If the two's complement system is used, (as is employed at times during divide) all answers are automatically correct.

Examples:

| | | |
|---|---|---|
| −1/8 | 1.111 | |
| +(−3/8) | 1.101 | |
| | 1.100 | Partial Sum |
| −4/8 | 1.100 | Correct Answer |
| +1/8 | 0.001 | |
| +(−3/8) | 1.101 | |
| | 1.110 | Partial Sum |
| −2/8 | 1.110 | Correct Answer |
| +1/8 | 0.001 | |
| +(+3/8) | 0.011 | |
| | 0.100 | Partial Sum |
| +(4/8) | 0.100 | Correct Answer |
| −1/8 | 1.111 | |
| +(+3/8) | 0.011 | |
| | 0.010 | Partial Sum |
| +2/8 | 0.010 | Correct answer |

Ordinarily one using the output data from the computer would prefer to see negative numbers displayed as a magnitude and sign. For the one's complement system this is done by inspecting each number before it is read out. If the number is negative, the number is complemented and a negative sign attached to it before the read-out operation. The two's complement system is somewhat more involved since in addition to taking the one's complement of the number, a one must be added to the lowest order bit before the read-out operation.

Example: Convert negative number to magnitude and sign.

| Number | One's Complement | Commands | Two's Complement |
|---|---|---|---|
| −3/8 | 1.100 | | 1.101 |
| | 0.011 | Complement flip-flops | 0.010 |
| | | Add one to low order | 0.011 |
| | −.011 | Attach sign | −.011 |

Thus, the two's complement system is slower when read-out conversions to magnitude and sign are executed, but total machine time is reduced when the two's complement system is used in certain computations, since no end carry control is used.

As noted above, addition processes in the apparatus herein described are accompanied by an inherent shift. Such an inherent shift is particularly desirable when performing multiplication by over and over addition. If however, it is desired to obtain the sum of two numbers, another shift operation must be performed in the direction opposite to the inherent shift in order to restore the sum to its correct value. Likewise, when the apparatus herein described is used to perform subtraction (addition of complement), another shift operation must be performed in the direction opposite to the inherent shift in order to restore the difference to its correct value.

When two binary numbers are multiplied, the product may be considered as a sum of partial products where each partial product is made up of the multiplicand times one bit of the multiplier. For example, consider the product of 2/8 and 3/8 as follows:

$$\begin{aligned}\tfrac{2}{8}\times\tfrac{3}{8}&=0.010\times 0.011\\&=0.010\times(0.001+0.010+0.000)\\&=0.010\times 0.001+0.010\times 0.010+0.010\times 0.000\\&=0.000010+0.00010+0.000\\&=0.000110\end{aligned}$$

From this example, it is obvious that each of the partial products can be obtained by the following rule: If the multiplier bit, in the $n$ position to the right of the binary point, is a ZERO, the corresponding partial product is ZERO; if the multiplier bit, in the $n$ position to the right of the binary point, is a ONE, the corresponding partial product is equal to the multiplicand multiplied by $\frac{1}{2^n}$. The product is the sum of all such partial products.

The division of one binary number $y$ by another binary number $x$ can be accomplished by first arranging the binary points of the two numbers, one below the other, and then proceeding by over and over subtraction. A rule for the first subtraction step of the division process is as follows:

| Sign of $(y-x)$ | Quotient Bit | True Remainder |
|---|---|---|
| + | 1 | $y-x$ |
| − | 0 | $y$ |

After the first subtraction has been carried out, the true remainder should be multiplied by 2 and the divisor subtracted from the true remainder. The new true remainder is a function of the previous quotient bit as follows:

| Previous Quotient Bit | True Remainder | New True Remainder |
|---|---|---|
| 1 | $(y-x)$ | $2(y-x)$. |
| 0 | $y$ | $2y$. |

The second quotient bit is a function of the new true remainder and is determined as follows:

| Previous Quotient Bit | New True Remainder | New Quotient Bit |
|---|---|---|
| 1 | $2(y-x)$ | 1—Sign of $(2(y-x)-x)$. |
| 0 | $2y$ | 1—Sign of $(2y-x)$. |

While the rules for determing only the first two quotient bits have been discussed, it will be obvious how the succeeding quotient bits are obtained.

It will be noted that the above discussion applies only to that type of binary division called the "restoring" method, that is, in the case of the previous quotient bit being equal to 0, the true remainder is $y$. This infers that when he subtraction $(y-x)$ was made and a negative balance was noted, $x$ was added back in, giving $(y-x)+x=y$ as a true remainder.

The method of division used in the apparatus herein described is known as the "non-restoring" method. In this method, the remainder resulting from a trial subtraction may be either positive or negative. Whenever the resulting remainder is negative, the trial for the next quotient bit involves an addition of the divisor. Whenever the resulting remainder is positive, the trial for the next quotient bit involves a subtraction of the divisor. If, during one of these trials, the sign of the remainder was plus and changes from plus to minus or if the sign of the remainder was minus and remains minus, a zero is recorded as the quotient bit. If the sign of the remainder was minus and changes from minus to plus or if the sign of the remainder was plus and remains plus, a one is recorded as the quotient bit.

It was stated above that whenever the resulting remainder is negative, the trial for the next quotient bit involves an addition of the divisor, and whenever the resulting remainder is positive, the trial for the next quotient bit involves a subtraction of the divisor. The apparatus herein described performs subtraction of the divisor during the divide operation by adding the two's complement of the divisor. If, therefore, the resulting remainder is positive, this subtraction is accomplished by adding the one's complement of the divisor to the remainder and simultaneously adding an additional one in the lowest order. Since the apparatus herein described incorporates an inherent shift of one binary place during an addition operation, a shift in the opposite direction must take place in order for the remainder to have its orders properly arranged.

The rule for the first subtraction step of the "non-restoring" method of division process is as follows:

| Sign of $(y-x)$ | Quotient Bit | Machine Remainder |
|---|---|---|
| 0 | 1 | $(y-x)$ |
| 1 | 0 | $(y-x)$ |

The rule for the second subtraction step of the division process is as follows:

| Previous Quot. Bit | New Machine Remainder | Sign of New Machine Remainder | New Quotient Bit |
|---|---|---|---|
| 1 | $2(y-x)$ | 0 | 1—Sign of $(2(y-x)-x)$. |
| 0 | $2(y-x)$ | 1 | 1—Sign of $(2y-x)$. |

From this it will be seen that if the sign of the new machine remainder is 0, the sign of $(2(y-x)-x)$ is determined by subtracting $x$ from the new machine remainder, whereas, if the sign of the new machine remainder is 1, the sign of $(2y-x)$ is determined by adding $x$ to the new machine remainder which will give $$2(y-x)+x=2y-x$$

For a more thorough analysis of the mathematics involved in proving the validity of the step of the division process presented above, reference is made to the publication entitled "Preliminary Discussion of the Logical Design of an Electronic Computing Instrument," Part I, 2nd edition, volume 1, by John von Neumann, Arthur Burks and Herman Goldstine (Institute for Advanced Study, Princeton, N.J., 1947) pages 23 through 29.

Reference is made to FIGS. 1 through 20 for a detailed showing of the logical components employed in a system of the present invention and how they are interrelated. FIGURE 1 shows how figures 2 through 20 of the drawings should be arranged to properly relate the various parts illustrated. The wiring diagrams of circuit components, illustrated in block form in FIGURES 2 through 20, are shown in detail in FIGURES 21 through 30 and described subsequent to the description of the system.

A conventional closed arrowhead is employed on lines throughout the drawing to indicate (1) a circuit connection, (2) energization with positive pulses, and (3) the direction of pulse travel which is also the direction of control; a diamond shaped arrowhead (1) indicates a circuit connection and (2) energization with a D.C. level. The D.C. levels are in the order of 10 volts when positive and 30 volts when negative; whereas pulses are 0.1 microsecond in duration and in the order of 20 to 40 volts positive unless otherwise indicated.

The input and output lines for the blocks in FIGURES 2 through 20 are connected to the most convenient side of the block, including the same side in some cases. The wiring schematic for any block in question, together with the description given hereinafter, renders the actual circuit connections unmistakably clear.

*A Register*

Figure 2:
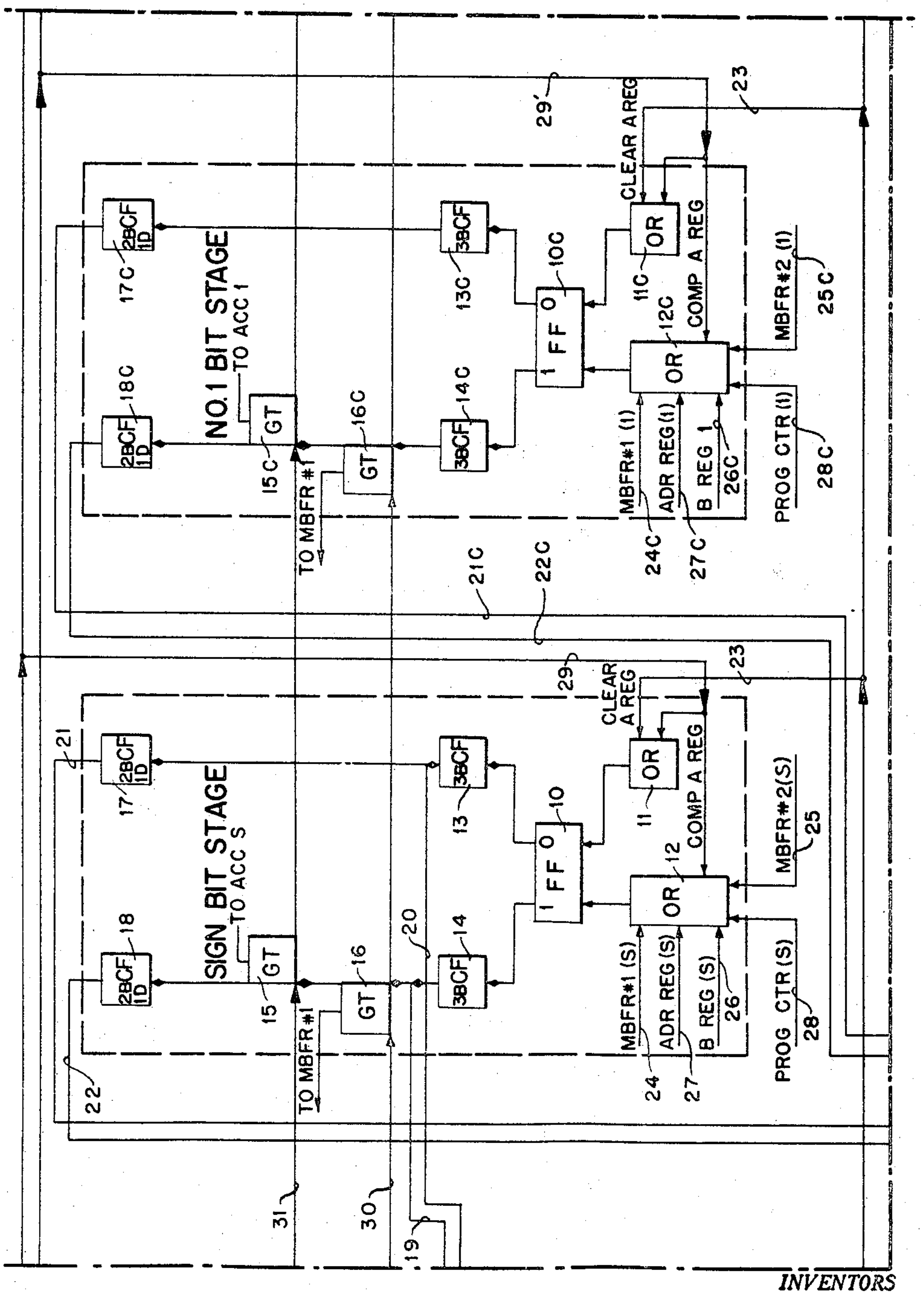
Figure 3:
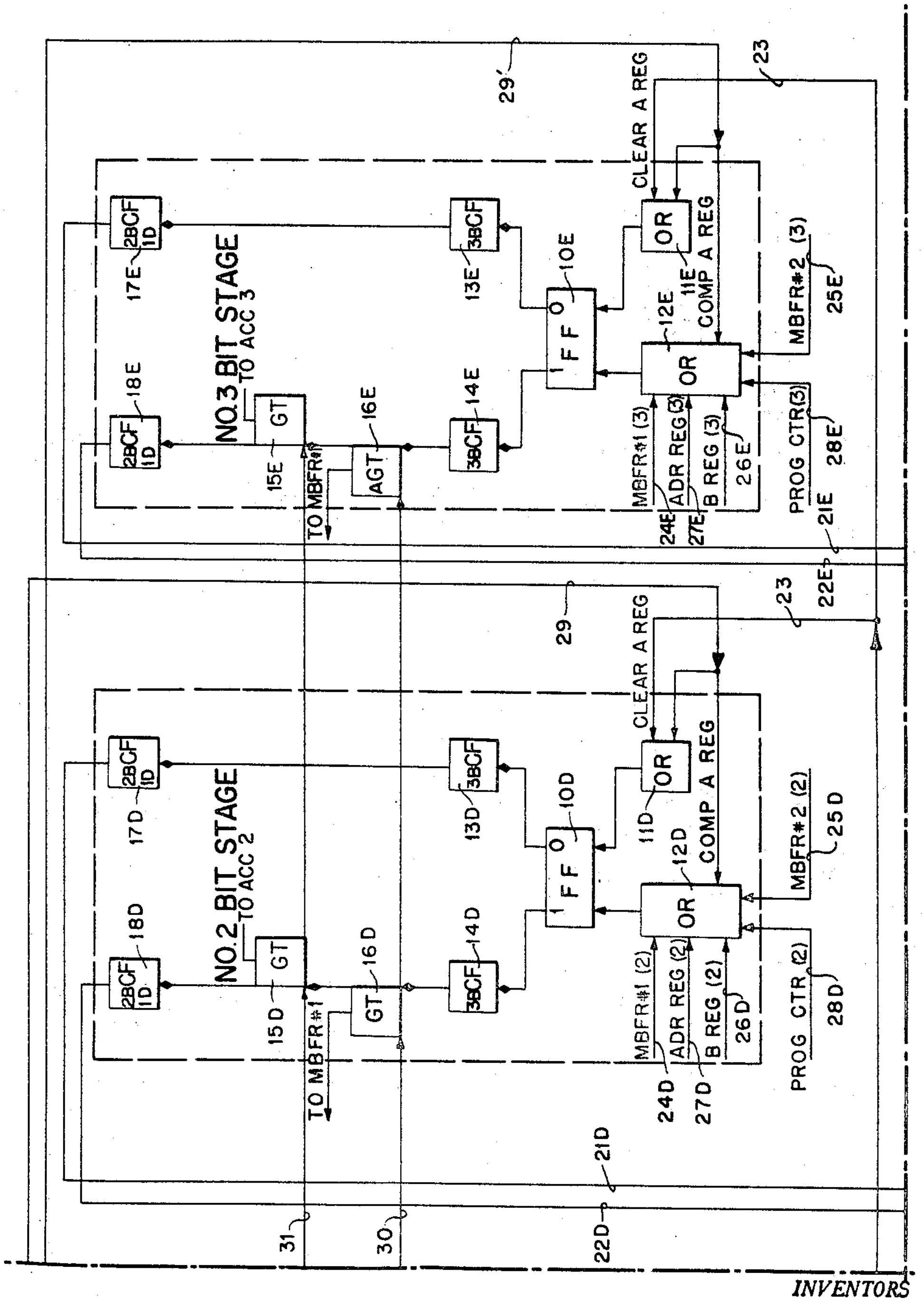

Attention is first directed to FIGURES 2 and 3 wherein an A Register composed of four binary bit stages, namely Sign bit stage, number 1 bit stage, number 2 bit stage and number 3 bit stage is shown. The Sign bit stage and number 1 bit stage of the A Register are shown in the left and right halves, respectively, of FIGURE 2, while the number 2 bit stage and number 3 bit stage as shown in the left and right halves, respectively, of FIGURE 3. The numbers used to label the elements in the Sign stage are used for like elements in stages 1 through 3 with the letters C, D and E affixed, respectively. A description of the Sign stage serves to clarify the stages 1 through 3.

A flip-flop 10 in the Sign stage of FIGURE 2 receives multiple input pulses through OR circuits 11 and 12 connected to its right and left halves, respectively. A typical OR circuit yields an output in response to energization of any one of its multiple input lines. It serves further to isolate each input line from the remaining input lines, and thus prevent one input line from being loaded by other input lines. The logical OR circuits 11 and 12 are of the pulse variety which pass pulses from multiple input lines to flip-flop 10. The output of flip-flop 10 is a D.C. level, indicated by the diamond-shaped arrowheads, leading to cathode followers 13 and 14 from the right and left halves respectively. The D.C. level from the non-conducting tube in all flip-flops used throughout the drawing is approximately plus 10 volts and the D.C. level from the conducting tube is approximately minus 30 volts. As indicated on flip-flop 10, a binary zero is represented when the right output line supplies a positive D.C. level to cathode follower 13, whereas, a binary one is indicated when the left output line supplies a positive D.C. level to cathode follower 14. The D.C. level output of cathode follower 14 is applied as one of the inputs to coincidence gates 15 and 16. When the D.C. level input is positive, these gates are conditioned to receive and pass a pulse. The output of cathode followers 13 and 14 is applied to additional cathode followers 17 and 18 respectively, and via lines 19 and 20 to FIGURE 17, described hereinafter. Output leads 21 and 22 from cathode followers 17 and 18 respectively, lead to Adder S (FIG. 4) which is described subsequently.

Prior to insertion of a binary number in the various bits of the A Register, flip-flops 10 and 10C through 10E are cleared and set to the binary zero state by applying a positive pulse to OR circuits 11 and 11C through 11E on an input lead 23. As explained more fully hereinafter, a positive pulse applied to the input of the right half of a flip-flop will establish a D.C. voltage level on the right half output line. In order to insert a binary number in the A Register, all flip-flops in the A Register to represent a binary zero are left intact, and all flip-flops to represent a binary one receive an input pulse on its left half input line.

The lines 24 and 24C through 24E connected to OR circuits 12 and 12C through 12E, respectively, convey pulses from a memory buffer register number 1, not shown, which may contain a binary number to be inserted in the A Register. Alternatively, flip-flops 10 and 10C through 10E may receive binary ones from a memory buffer register 2, not shown, by leads 25 and 25C through 25E, respectively, connected to OR circuits 12 and 12C through 12E, respectively. When it is necessary to transfer the contents of another register in the present system, termed the B Register and explained hereinafter, to the A Register, the A Register is first cleared and binary ones from corresponding bits of the B Register are inserted in the A Register by pulsing those input lines 26 through 26E where binary ones are to be inserted. Input leads 27 through 27E from an Address Register, not shown, and input leads 28 through 28E from a Program Counter, not shown, supply ones to the flip-flops 10 and 10C through 10E, respectively, by means of OR circuits 12 through 12E, respectively. The contents of the Address Register and Program Counter are used in the A Register, for example, as an expedient to facilitate the programming operation in mathematical calculations.

Complementing is the operation whereby all binary ones are changed to zeros, and all binary zeroes are changed to ones. The complementing operation, effected by simultaneous application of positive pulses to both the right and left half sections of a flip-flop, is more fully explained hereinafter.

Both OR circuits 11 and 12 in stage S of the A Register are simultaneously supplied with a positive pulse from lead 29 when it is desired to complement this stage. It is seen that the stages S through 3 of the A Register may be complemented by positive pulsing lead 29, connected to stages S and 2, and lead 29′ connected to stages 1 and 3.

When it is desired to transfer a binary number from the A Register to the memory buffer register, the memory buffer register is first cleared and binary ones inserted from corresponding bits in the A Register. In executing the transfer, binary ones from the various bits S through 3 of the A Register are transferred from the gates 16 and 16C through 16E simultaneously as a pulse is applied to lead 30. When input line 31 is pulsed, gates 15 and 15C through 15E transfer binary ones from the A Register to an Accumulator Register, to be described subsequently. Additional gates may be provided on the output of the left half section of the flip-flops 10 through 10E where it is desired to store information directly from the A Register in various additional storage devices. For simplicity only transfer gates for memory buffer register 1 and the Accumulator Register are herein shown and described. It is understood that any additional gates employed are connected in like manner as gates 16 through 16E.

*Adder*

Reference is made to FIGURES 4 through 7 wherein Adder stages S through 3 respectively, are illustrated. It is noted that these stages correspond to the stages S through 3 of the A Register. A description of one of these stages suffices for an understanding of the remaining stages. Each Adder stage serves to totalize three single digit binary numbers; to transfer the sum to the next lower order stage in the Accumulator, to be described hereinafter, and to transmit the carry to the next higher order Adder stage. The first single digit binary number for each Adder comes from the corresponding stage in the A Register; the second single digit binary number comes from the corresponding stage in the Accumulator Register, and the third single digit binary number is received from the next lower Adder stage. The first and second binary numbers are represented by D.C. levels whereas the third binary number is represented by a pulse.

Figure 6:
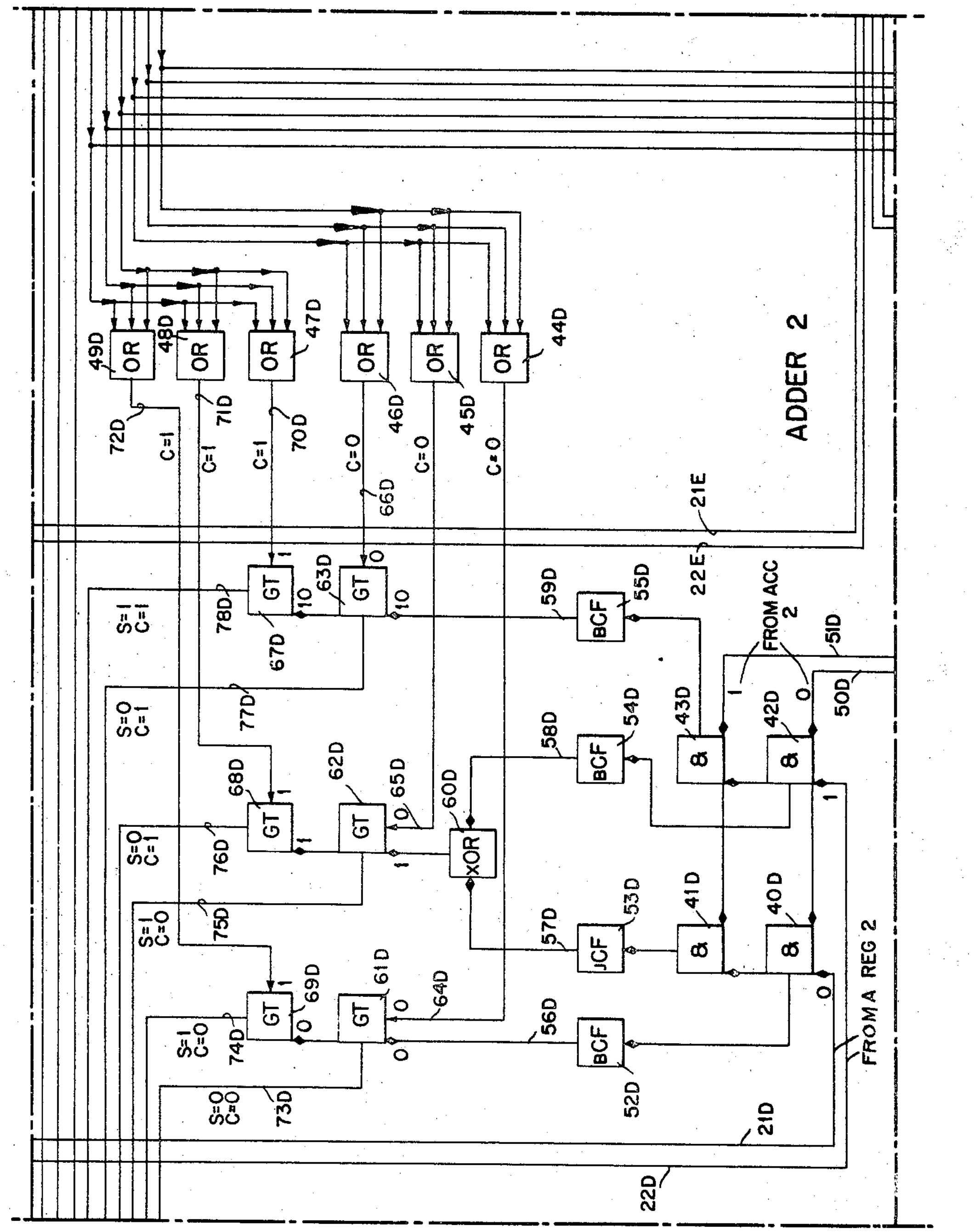

Line 21D of Adder 2 in FIGURE 6, representative of binary zero when energized with a positive D.C. level by the number 2 bit stage of the A Register, constitutes one of the inputs to AND circuits 40D and 41D. Line 22D, representative of a binary one when energized with a positive D.C. level, serves as one of the inputs to AND circuits 42D and 43D. The lines 21D and 22D from the number 2 bit stage of the A Register, one of which is always energized with a positive D.C. level, represent the first single digit binary number supplied to Adder 2. The second single digit for Adder 2 is supplied from the number 2 bit stage of the Accumulator Register in FIGURE 11 by lines 50D and 51D, respectively. The lines 50D and 51D are connected to AND circuits 40D, 42D and 41D, 43D, respectively. A positive D.C. level on line 51D represents a binary one whereas a positive D.C. level on line 50D represents a binary zero. One of these lines is always positive.

The AND circuits 40D through 43D, described more fully hereinafter, are alike and require two positive D.C. levels simultaneously applied to their input to yield a positive D.C. level output. The outputs of AND circuits 40D through 43D undergo power amplification in cathode followers 52D through 55D, respectviely, before being applied to lines 56D through 59D, respectively. The output lines 56D through 59D, when energized with a positive D.C. level, represent the sum of the two single digit binary numbers supplied to AND circuits 40D through 43D by the corresponding A Register stage and Accumlator stage. If the lines 21D and 50D are positively energized, AND circuit 40D receives two inputs each representing a binary zero, and the output established on line 56D represents the sum of zero.

Secondly, if lines 21D and 51D are positively energized, the AND circuit 41D provides an output on line 57D that represents the sum of one. Thirdly, if lines 22D and 50D are positively energized, the output of AND circuit 42D represents a binary one on line 58D. Lastly, if a positive D.C. level is established on lines 22D and 51D, the output established on line 59D by AND circuit 43D represents the decimal equivalent of two in the binary form, i.e. a binary one zero. To summarize briefly, line 56D, represents a binary zero, line 57D a binary one, line 58D a binary one, and line 59D the binary number, one zero. Since lines 57D and 58D each represent a binary one, both are shown as connected to $_X$OR circuit 60D before being transmitted on. Only one of the lines 56D through 59D is energized with a positive D.C. level at any one time.

Figure 7:
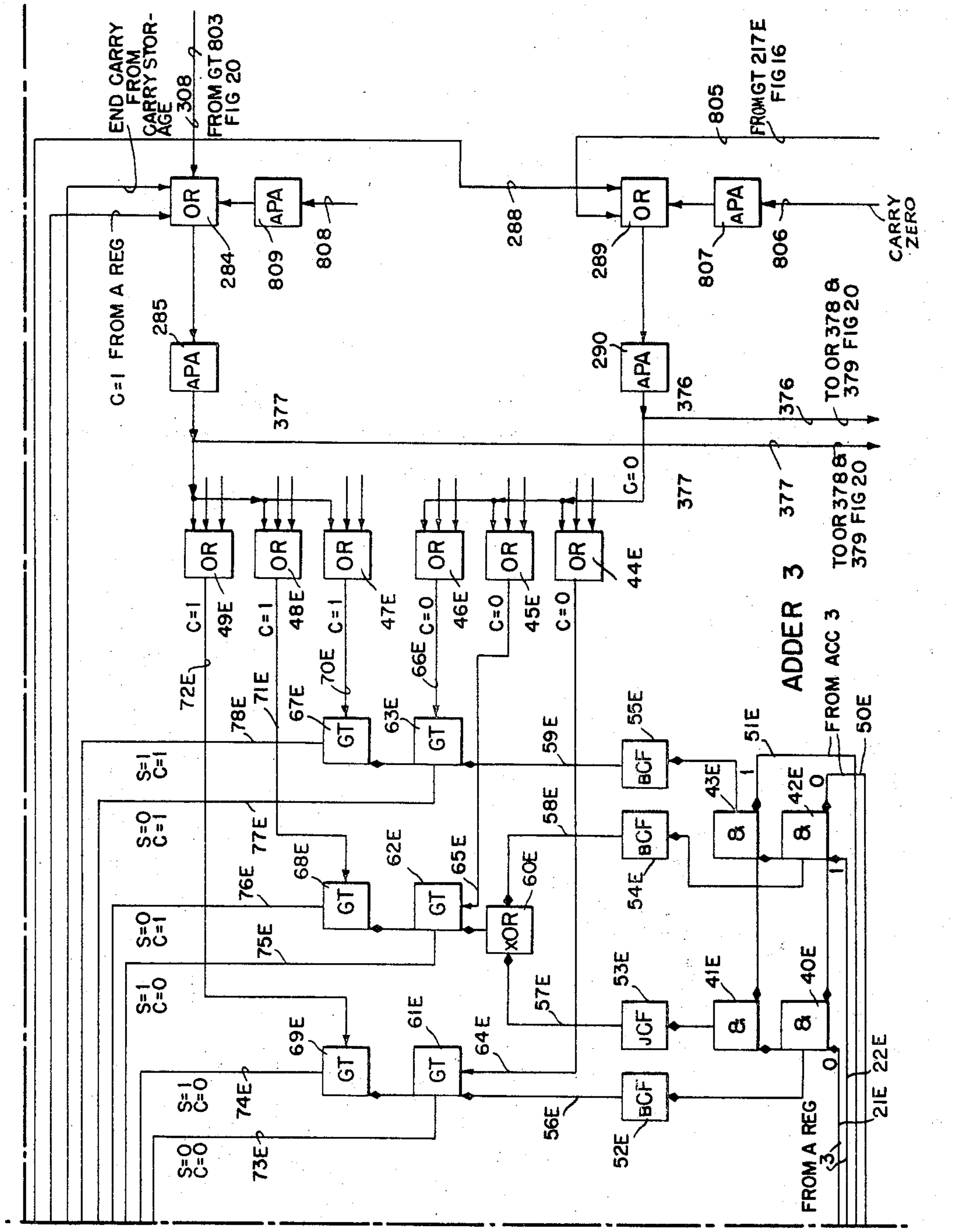

A positive pulse applied to one of the OR circuits 44D through 49D (FIG. 6) from Adder 3 in FIGURE 7 represents the third binary number i.e., carry supplied to Adder 2. The OR circuits 44D through 46D, representing a carry of zero conveyed in from the adjacent Adder 3 in FIGURE 7, are connected to gates 61D through 63D, respectively by lines 64D through 66D, respectively. In a like manner, OR circuits 47D through 49D, conveying a carry of one from Adder stage 3 in FIGURE 7, are connected to gates 67D through 69D, respectively, by lines 70D through 72D respectively. The OR circuits 44D through 49D are of the type which when energized with 1/10 microsecond pulses, operate to pass the pulses to gates 61D through 63D and 67D through 69D, respectively. The output pulses from these gates, representative of the final sum of the three single digit binary numbers supplied to Adder 2, are applied to the Adder stage 1 in FIGURE 5 as a carry and also to Accumulator stage 3 in FIGURE 12 as a sum for storage. For convenience, the input lines to the gates 61D through 63D and 67D through 69D are shown with the binary numbers represented when each is positively energized. For example, when lines 56D and 64D convey a positive D.C. level and a positive pulse respectively, to gate 61D, the output pulse on line 73D represents the sum of zero and a carry of zero. If gate 69D receives a positive D.C. level on line 56D which represents a binary zero and a positive pulse on line 72D which represents a binary one, the 1/10 microsecond positive pulse established on line 74D represents a sum of one and a carry of zero. An output pulse on line 75D represents a sum of one and a carry of zero, on 76D a sum of zero and a carry of one, on line 77D a sum of zero and a carry of one, and on line 78D a sum of one and a carry of one. The lines 73D through 75D, each representing a carry of zero, are each connected to the carry zero OR circuits in the next left succeeding stage in FIGURE 5, while the lines 76D through 78D, each representing a carry of one, are each connected to the carry one OR circuits of Adder 1 in FIGURE 5. The cathode followers 79 and 80 in FIGURE 4 share a comon cathode resistor. The $_X$OR circuit 81 and $_X$OR circuits 60 and 60C through 60E of FIGURES 4 through 7, respectively, are not physical OR units of the conventional type as shown more fully hereinafter.

*Transfer circuits*

Figure 8:
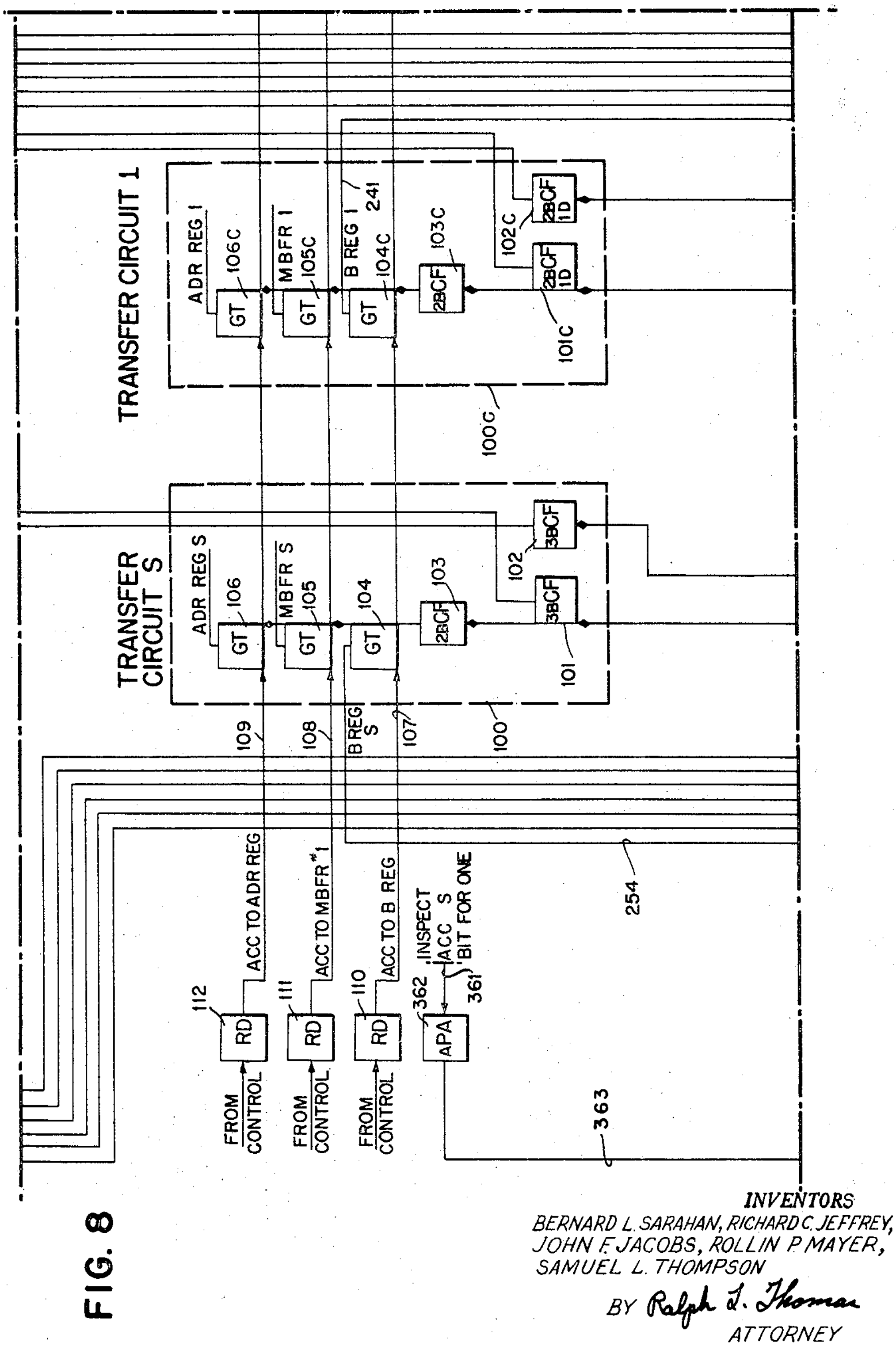
Figure 9:
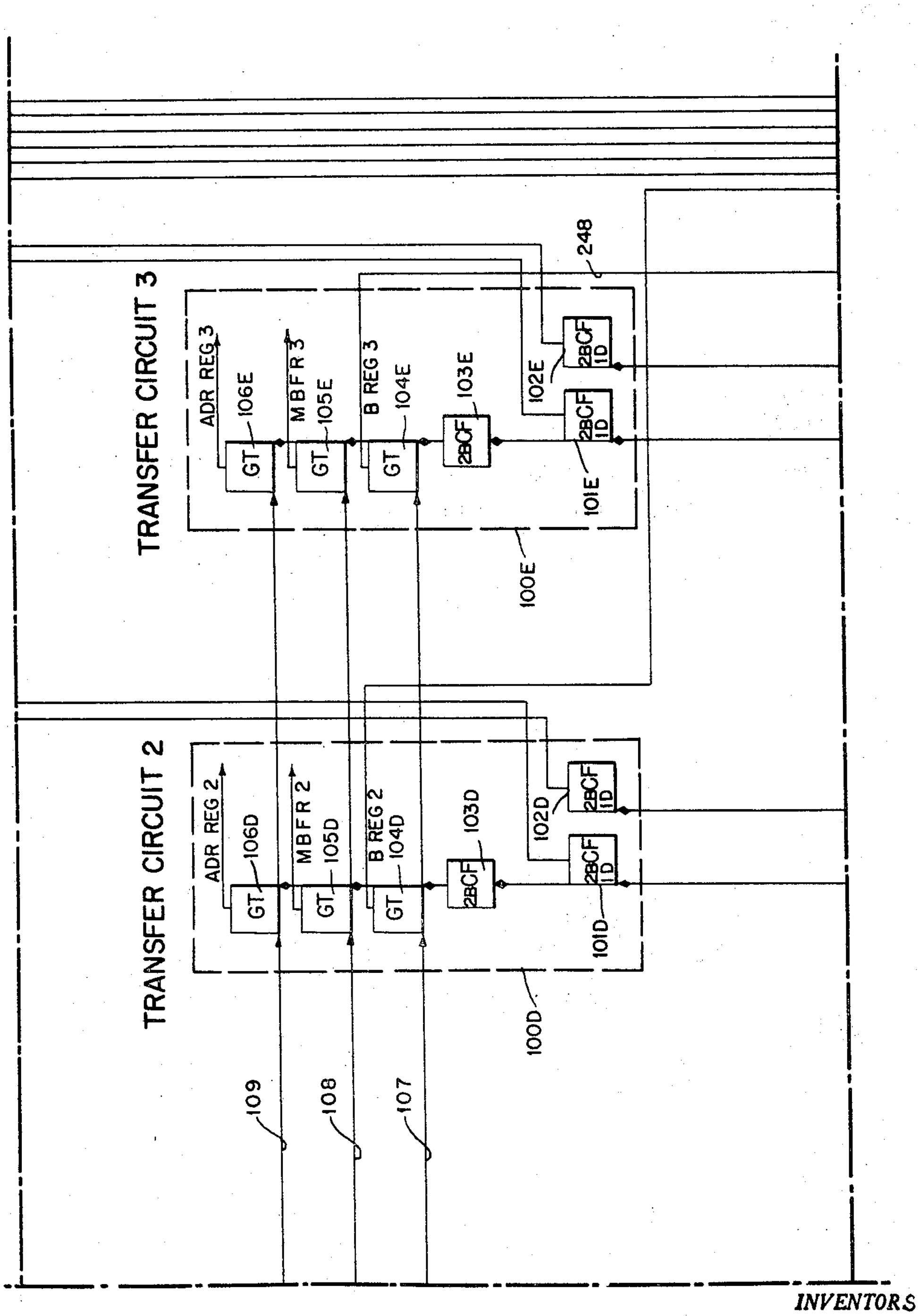

Reference is made now to FIGS. 8 and 9 wherein four like transfer circuits labeled 100 and 100C through 100E, serve the sign bit stage through the number 3 bit stage, respectively. Each of the transfer stages 100 and 100C through 100E serves to transfer binary ones from corresponding bits of an Accumulator Register, to be described subsequently, to a designated register. A detailed description of the transfer circuit 100C in FIGURE 8 will suffice for an understanding of the remaining transfer circuits. Cathode followers 101C and 102C serve as buffers and power amplifiers for the output of the Accumulator stage 1 which is transmitted to the AND circuits 41C, 43C and 40C, 42C of FIGURE 5, respectively. Further, the positive D.C. level input to cathode follower 101C is applied to the input of cathode follower 103C where power amplification takes place before a D.C. level is supplied to gates 104C through 106C. The gates 104C through 106C are conditioned by the binary one side of a flip-flop in Accumulator stage 1 since only binary ones are transferred. The gates 104C through 106C are of the coincidence type. If lines 107 through 109 are pulsed simultaneouly while a D.C. level is establishd on the output of cathode follower 103C, gates 104C through 106C yield an output pulse equal in duration to the input pulse which represents a binary one from Accumulator stage 1. If it is desired to transfer binary ones in the Accumulator Register to the Address Register, not shown, Register driver 112 in FIGURE 8 pulses line 109 to gate binary ones represented in the Accumulator stages through gate tubes 106 and 106C through 106E simultaneously to corresponding bits of the Address Register. In a like manner, Register drivers 110 and 111 serve lines 107 and 108, respectively, to transfer information from the Accumulator to a B Register and Memory Buffer Register, respectively.

*Accumulator*

Figure 10:
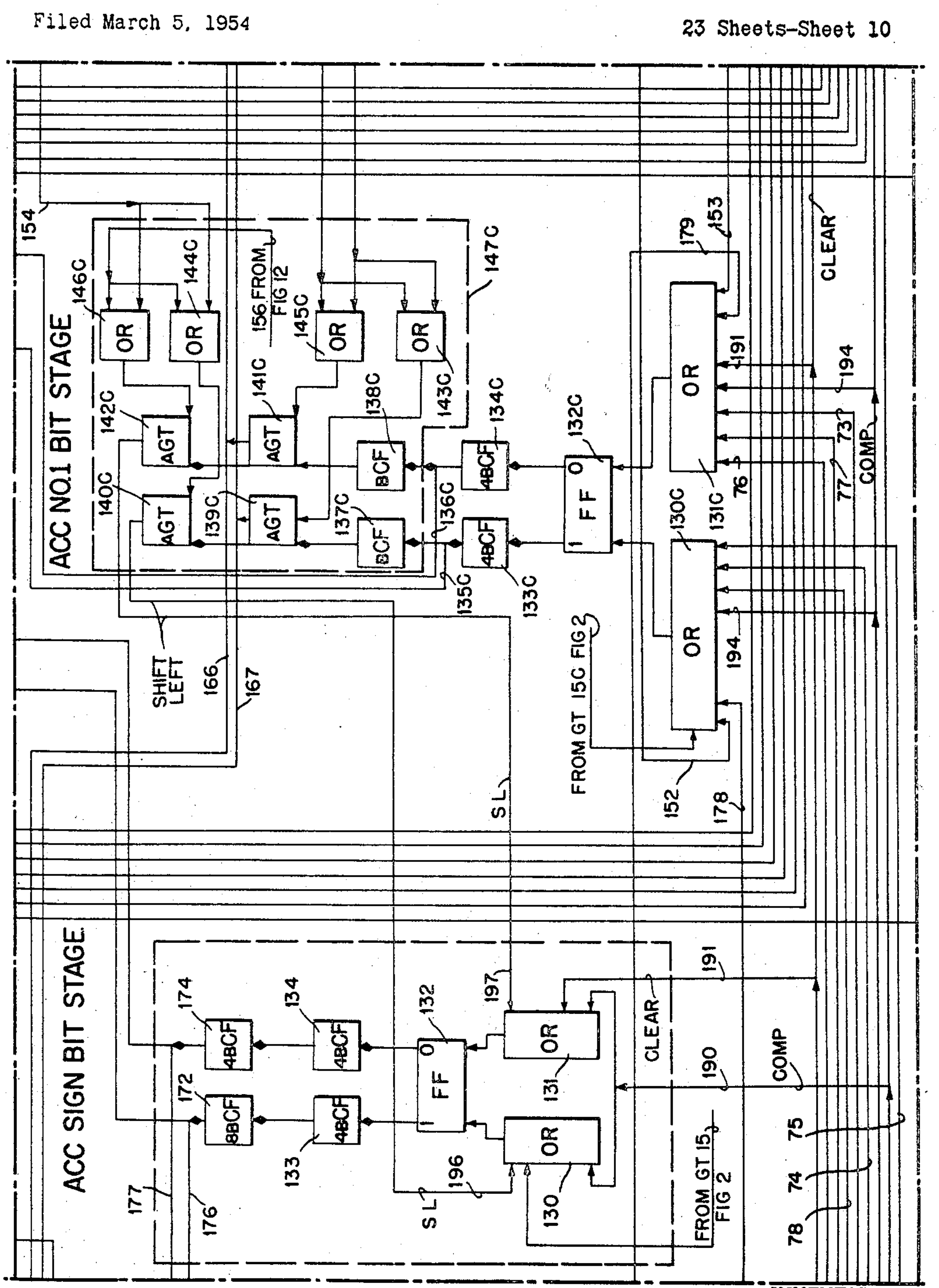
Figure 11:
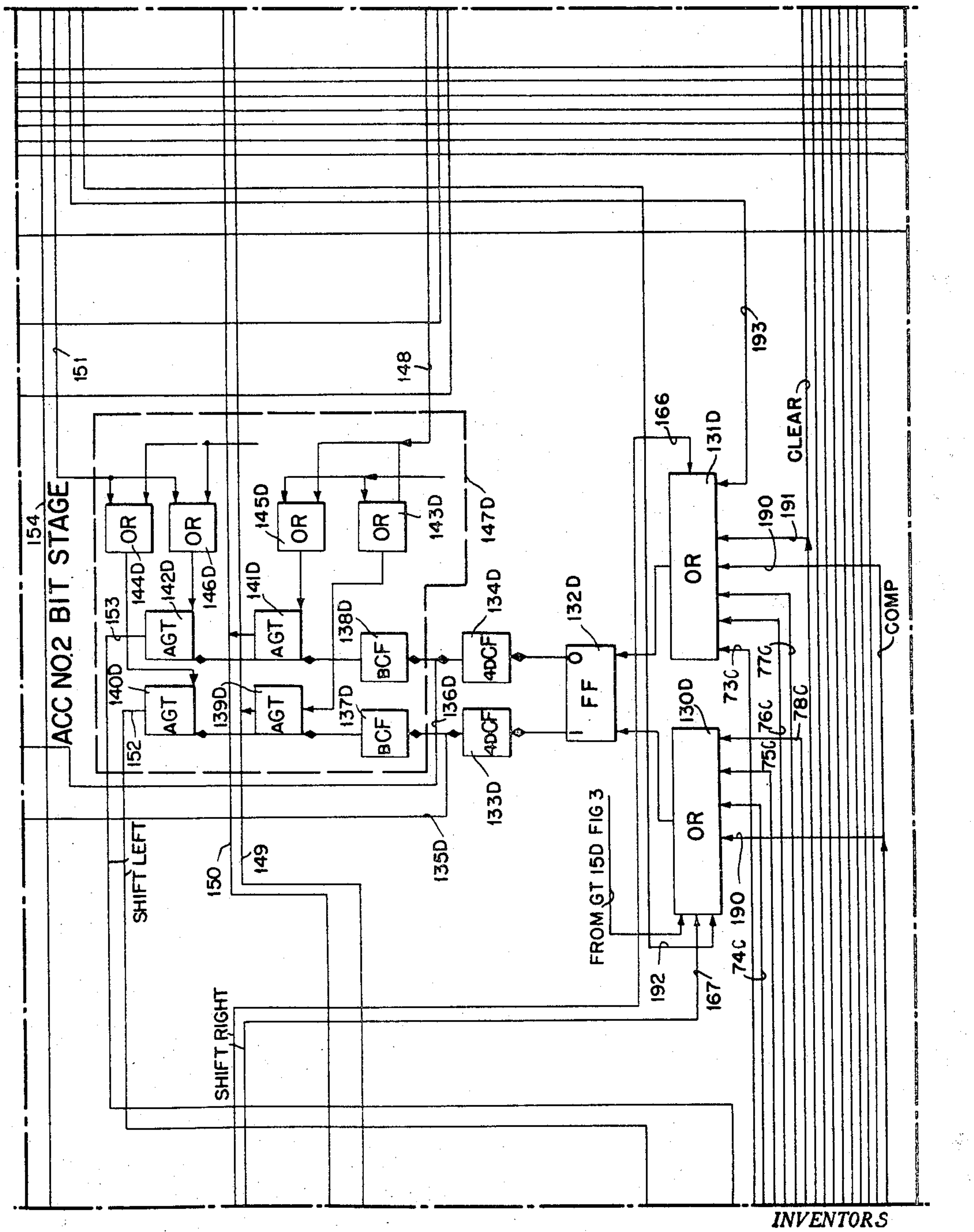
Figure 12:
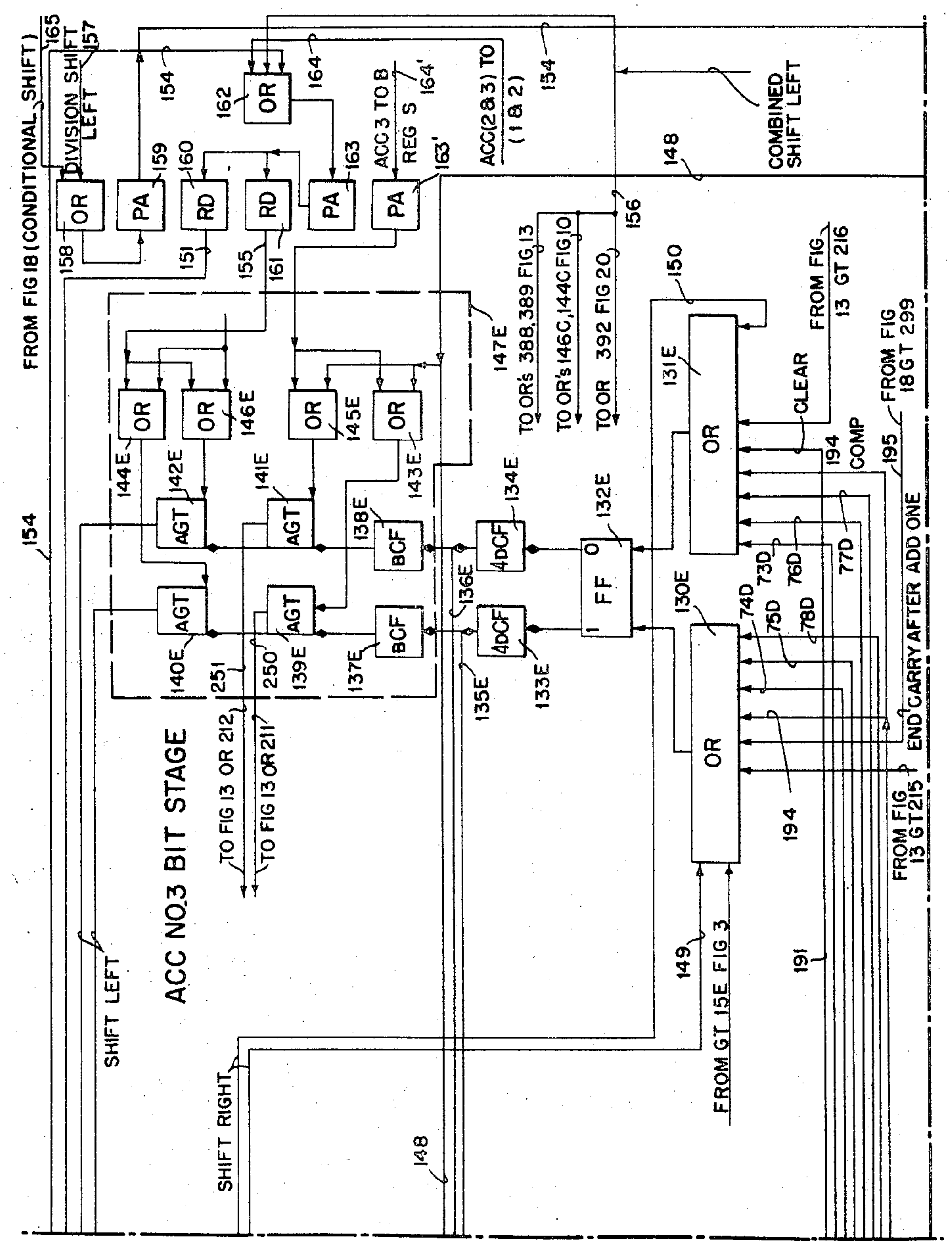

Reference is made to FIGURES 10 through 12 for a discussion of the Accumulator previously mentioned. FIGURE 10 shows two stages labeled Accumulator Sign Bit Stage and Accumulator No. 1 Bit Stage, and FIGURES 11 and 12 show two stages labeled Accumulator No. 2 Bit Stage and Accumultor No. 3 Bit Stage, respectively. A detailed description of the Accumulator stage 2 in FIGURE 11 suffices for an understanding of Accumulator stages 1 and 3.

OR circuits 130D and 131D in FIGURE 11 serve as input devices which isolate multiple input circuits leading to the left and right halves of flip-flop 132, respectively. The output of the left and right halves of flip-flop 132D undergoes power amplification in cathode followers 133D and 134D, respectively, before being applied via leads 135D and 136D to cathode followers 101D and 102D respectively, in FIGURE 9. Further, the output from cathode followers 133D and 134D undergoes further power amplification in cathode followers 137D and 138D, respectively, before establishing a D.C. level input on gates 139D, 140D and 141D, 142D, respectively. The pulse input to each of the gates 139D through 142D is received from OR circuits 143D through 146D, respectively. The gate tubes 139D through 142D, and their associated inputs, enclosed in the dotted line block labelled 147D, function as a transfer circuit. More specifically, the transfer circuit 147D is used to transfer the contents of flip-flop 132D of the Accumulator number 2 bit stage on a shift left operation to flip-flop 132C (FIG. 10) of the Accumulator number 1 bit stage or on a shift right operation to flip-flop 132E (FIG. 12) of the Accumulator number 3 bit stage. In order to illustrate the shifting operation, assume that flip-flop 132D is in the binary one state with a positive D.C. level established on the left output line. If a $\frac{1}{10}$ microsecond pulse is applied to line 148, OR circuits 143D and 145D are activated and gate tubes 139D and 141D each receive a $\frac{1}{10}$ microsecond pulse. Since flip-flop 132D is in the binary one state, gate tube 139D is conditioned to pass the $\frac{1}{10}$ microsecond pulse via line 149 to OR circuit 130E in FIGURE 12 and set the flip-flop 132E in the binary one state. Also, line 149 transmits the $\frac{1}{10}$ microsecond pulse to OR circuits 143C and 145C in FIGURE 10 and initiates the shift right operation in the number 1 bit stage of the Accumulator. Thus it is seen that the contents of flip-flop 132D (FIG. 11) of the Accumulator number 2 bit stage is shifted right into the flip-flop 132E (FIG. 12) of the Accumulator number 3 bit stage and the shift circuit 147C (FIG. 10) of the Accumulator number 1 bit stage is activated. After a short time delay, determined by the time required for a $\frac{1}{10}$ microsecond pulse to travel through one OR circuit and one gate circuit, the contents of flip-flop 132C (FIG. 10) of the Accumulator number 1 bit stage is shifted right into the flip-flop 132D (FIG. 11) of the Accumulator number 2 bit stage. The time delay through an OR circuit and the gate circuit is unimportant in this instance, however, since if all the gates 139C through 139D and 141C through 141D were hit simultaneously, for example, a transfer to the right would take place because the transfer pulse from the gates would be applied to the inputs of the succeeding flip-flop to the right initiating a change from one state of conduction to the other state of conduction, if necessary. Once initiated, the change in conduction state of a flip-flop continues until completion. Had flip-flop 132D been set in the binary zero state of conduction, in the previous example, gate 141D would have established a pulse on line 150 to the binary zero side of flip-flop 132E and to OR circuits 143C and 145C in transfer circuit 147C to initiate the shift right operation.

For the purpose of illustrating the shift left operation, assume the flip-flop 132D is in the binary one state and a shift pulse is applied to line 151. Gate tubes 140D and 142D are pulsed through respective OR circuits 144D and 146D. Gate tube 140D, having been conditioned by flip-flop 132D, passes a pulse via line 152 to OR circuit 130C in FIGURE 10, thereby setting flip-flop 132C in the binary one state. Had the flip-flop 132D been set in the binary zero state in the previous example, gate tube 142D would have passed a pulse on line 153 to OR circuit 131C in FIGURE 10, thereby setting flip-flop 132C in the binary zero state. By pulsing the lines 154 in FIGURE 10, 151 in FIGURE 11 and 155 in FIGURE 12. Accumulator stages 1 through 3 are automatically shifted left. Lines 151, 154 and 155 are simultaneously pulsed if either line 165 or line 157 is pulsed because OR circuit 158 drives a pulse amplifier 159 which in turn pulses register drivers 160 and 161 through OR circuit 162 and another pulse amplifier 163. Pulses for the lines 151 and 155 may be secured by applying an input pulse to OR circuit 162 by means of the leads 156 or 164. Line 156 also pulses OR circuits 144C and 146C in FIGURE 10. Line 156 is pulsed to execute a shift left operation. The lines 156, 157 and 165 are used in different instances for reasons explained more fully hereinafter. It is noted that pulsing line 164 effects a shift of Accumulator bits 2 and 3 to Accumulator bits 1 and 2 whereas pulsing lines 157 or 165 effects a shift of Accumulator bits 1 through 3 to Sign through 2 and automatically brings the Sign bit of the B Register, explained subsequently, into the number 3 bit of the Accumulator. It is further noted that the shift left operation effects a simultaneous shift of information from all bits involved in the shift left operation.

In the right shift operation, shifting in the Accumulator stages 2 and 3 involves a simultaneous shift whereas stages 1 and Sign involve a successive shift. For example, if line 148 in FIGURE 12 is pulsed, OR circuits 143E and 145E in FIGURE 12 and OR circuits 143D and 145D in FIGURE 11 are simultaneously pulsed. Consequently, information in Accumulator bit 3 is shifted right to the Sign bit of the B Register simultaneously as information in Accumulator bit 2 is shifted right. The transfer pulse conveying information from the flip-flop in bit number 2 to bit number 3 of the Accumulator via lines 149 or 150 also performs, as previously mentioned, to initiate the shift right operation in Accumulator bit number 1 by pulsing OR circuits 143C and 145C. In a like manner, the pulse from the Accumulator bit 1 conveying information from bit 1 to the right on lines 166 or 167 also initiates the shift operation that transfers the information in the Accumulator Sign bit to the number 1 bit. That is, a pulse on either line 166 or 167 is applied to both OR circuits 168 and 169 in FIGURE 19 which in turn pass the pulse to gates 170 and 171, respectively. Referring again to FIGURE 10, it is seen that the outputs of flip-flop 132 undergo power amplification first in cathode followers 133 and 134 and secondly in cathode followers 172 and 174, respectively, before establishing a D.C. level on lines 176 and 177 to gates 170 and 171, respectively, in FIGURE 19. The gates 170 and 171, when pulsed, transfer information in the Accumulator Sign bit to the Accumulator number 1 bit on lines 178 and 179, respectively. To summarize the shift right operation, bits 2 and 3 of the Accumulator are shifted simultaneously to the right, and bits 1 and Sign are shifted successively to the right. If the present Accumulator Register were expanded to include, for example, 10 bits instead of the presently illustrated 3 bits, a right shift would involve simultaneous shifting in bits 9 and 10 and successive shifting in the bits 8 through Sign, inclusively. The term "ripple shift" is herein used to refer to the successive shifting operation. The contents of the Accumulator stage 3 is shifted right to the Sign bit of the B Register when pulse amplifier 163' receives a pulse on line 164'.

Figure 5:
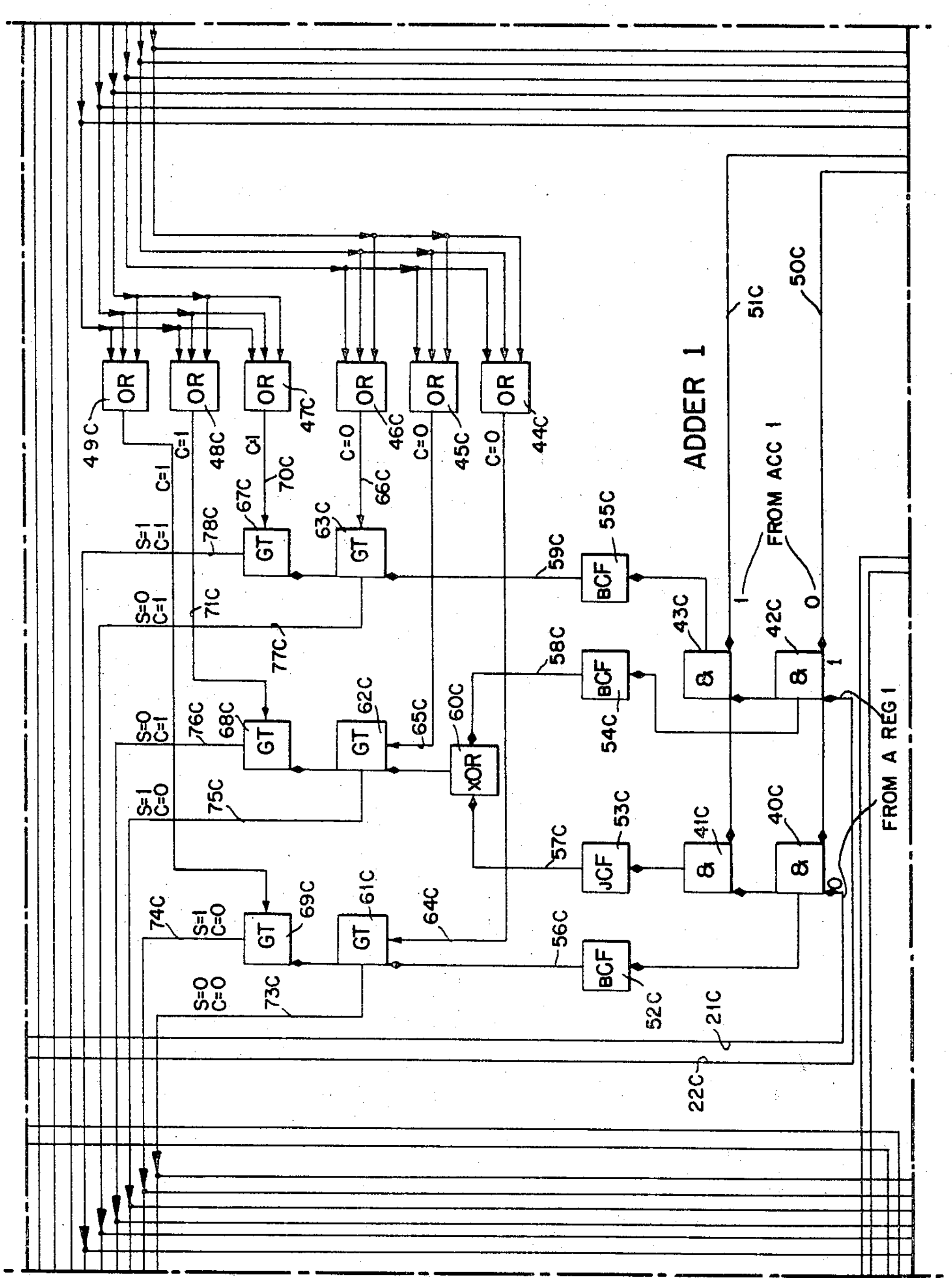

Referring more specifically again to the Accumulator stage 2 in FIGURE 11, the input lines 74C, 75C and 78C to OR circuit 130D convey a sum of one from the output of Adder 1 in FIGURE 5 to the flip-flop 132D. In a similar manner, lines 73C, 76C and 77C, connected to OR circuit 131D, convey a sum of zero from Adder 1 in FIGURE 5 to flip-flop 132D. When lead 190, connected to both OR circuits 130D and 131D, is pulsed, flip-flop 132D is complemented. If line 191 is pulsed, OR circuit 131D is pulsed, setting the flip-flop 132D in the binary zero state of conduction. This is referred to as the clear operation which is employed to set all flip-flops in a register in the binary zero state prior to transferring in a binary number. Input leads 192 and 193, connected to OR circuits 130D and 131D, respectively, are pulsed by gates 140E and 142E, respectively, in FIGURE 12 on a shift left operation. As previously mentioned, leads 166 and 167 convey information to flip-flop 132D on a shift right operation. It is noted that the clear line labeled 191 pulses all bits of the Accumulator simultaneously. The Accumulator bits 1 and 3 are complemented by pulsing line 194 while bits Sign and 2 are complemented by pulsing line 190. Also, both lines 190 and 194 are pulsed simultaneously.

It is pointed out that the inputs to each of the Accumulator stages 1 through 3 on the OR circuits 130C through 130E and 131C through 131E are the same except OR circuit 130E has one additional input line labeled 195 which serves the command function end carry after add 1, described later.

The inputs to the Sign bit of the Accumulator Register, being somewhat different from the remaining registers, are now described independently. The Sign bit of the Accumulator Register, like the remaining bits, is complemented and cleared by pulsing lines 190 and 191, respectively. In the left shift operation, the lines 196 and 197, connected to OR circuits 130 and 131, respectively, transfer information from Accumulator bit 1 to the Sign bit.

*B Register*

Reference is made now to FIGURES 13 through 16 for a description of the B Register. The B Register Bits Sign and 1 through 3 are shown in FIGURES 13 through 16, respectively. Since the composition of each stage is substantially the same, a description of the number 2 bit stage (FIG. 15) suffices to clarify the remaining stages. Flip-flop 210D receives its input through OR circuits 211D and 212D connected to the left and right halves, respectively. The left and right outputs of flip-flop 210D are applied to cathode followers 213D and 214D, respectively, and then to gates 215D and 216D, respectively. The left and right outputs are also applied to gate tubes 217D and 218D, respectively. The gates 215D through 218D constitute a shift circuit 219D. Furthermore, the left half output of flip-flop 210D is applied to transfer gate 220D, the output of which is applied via line 26D to the OR circuit 12D of FIGURE 3. The application of a pulse on line 221 to gates 215D and 216D effects a transfer of information on a left shift operation from flip-flop 210D to flip-flop 210C by means of lines 222 and 223 connected to OR circuits 211C and 212C, respectively, in FIGURE 14. In a similar manner, gates 217D and 218D perform when input line 226 is pulsed to execute the shift right operation of transferring the contents of flip-flop 210D on output lines 224 and 225 to flip-flop 210E. When line 227 is pulsed, gate 220D transfers a binary one via line 26D from flip-flop 210D in the number 2 bit stage of the B Register to the number 2 bit stage of the A Register in FIGURE 3 provided that a binary one is held in the flip-flop 210D. If line 228 is pulsed, flip-flop 210D is complemented since this line is connected to both input OR circuits 211D and 212D. If line 229 is pulsed, flip-flop 210D along with flip-flops 210, 210C and 210E are cleared. The lines 230 and 231, connected to gates 216E and 215E, respectively, transfer the contents of flip-flop 210E to the flip-flop 210D on a shift left operation. In a shift right operation, input lines 232 and 233, connected from gates 218C and 217C respectively, transfer the contents of flip-flop 210C to flip-flop 210D. When it is desired to transfer the contents of the Accumulator stage 2 to the flip-flop 210D, input line 234 to OR circuit 211D is pulsed by transfer gate 104D in FIGURE 9.

Figure 16:
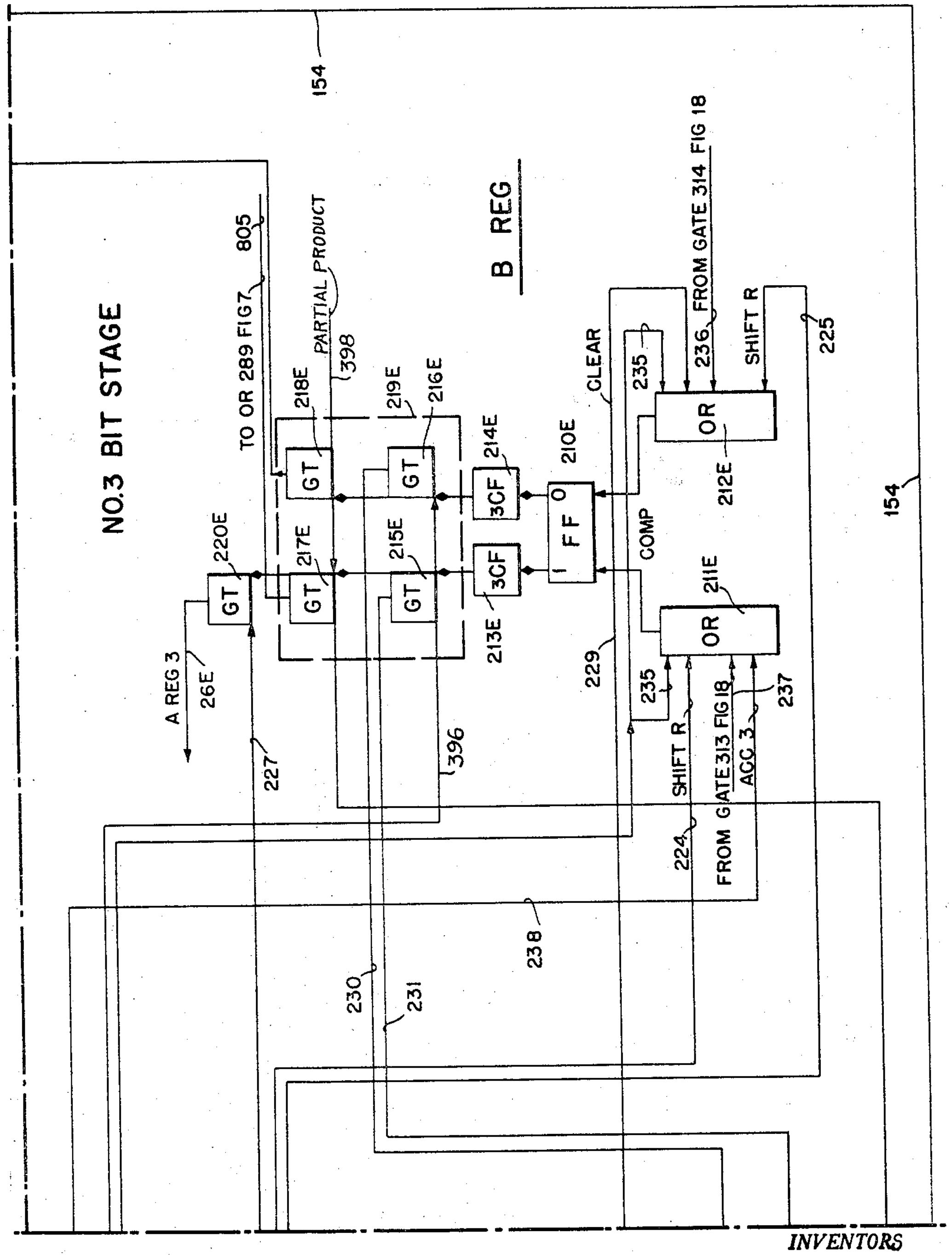

Reference is made to FIGURE 16 for a summary of the inputs to flip-flop 210E of the B Register number 3 bit stage. Lead 235, connected to both OR circuits 211E and 212E, serves to complement flip-flop 210E, while input lead 229 serves to clear the flip-flop. The input leads 224 and 225 to the OR circuits 211E and 212E, respectively, serve to set the flip-flop on a shift right operation. Input lines 236 and 237 are pulsed when there is a carry zero or carry one, respectively, from the Adder S provided that the Divide Connect flip-flop 309 in FIGURE 18, to be described subsequently, is set on the one side. Input line 238 in FIGURE 16 is pulsed by gate 104E in FIGURE 9 when a binary one is transferred from the Accumulator stage 3 to the B Register stage 3.

Figure 14:
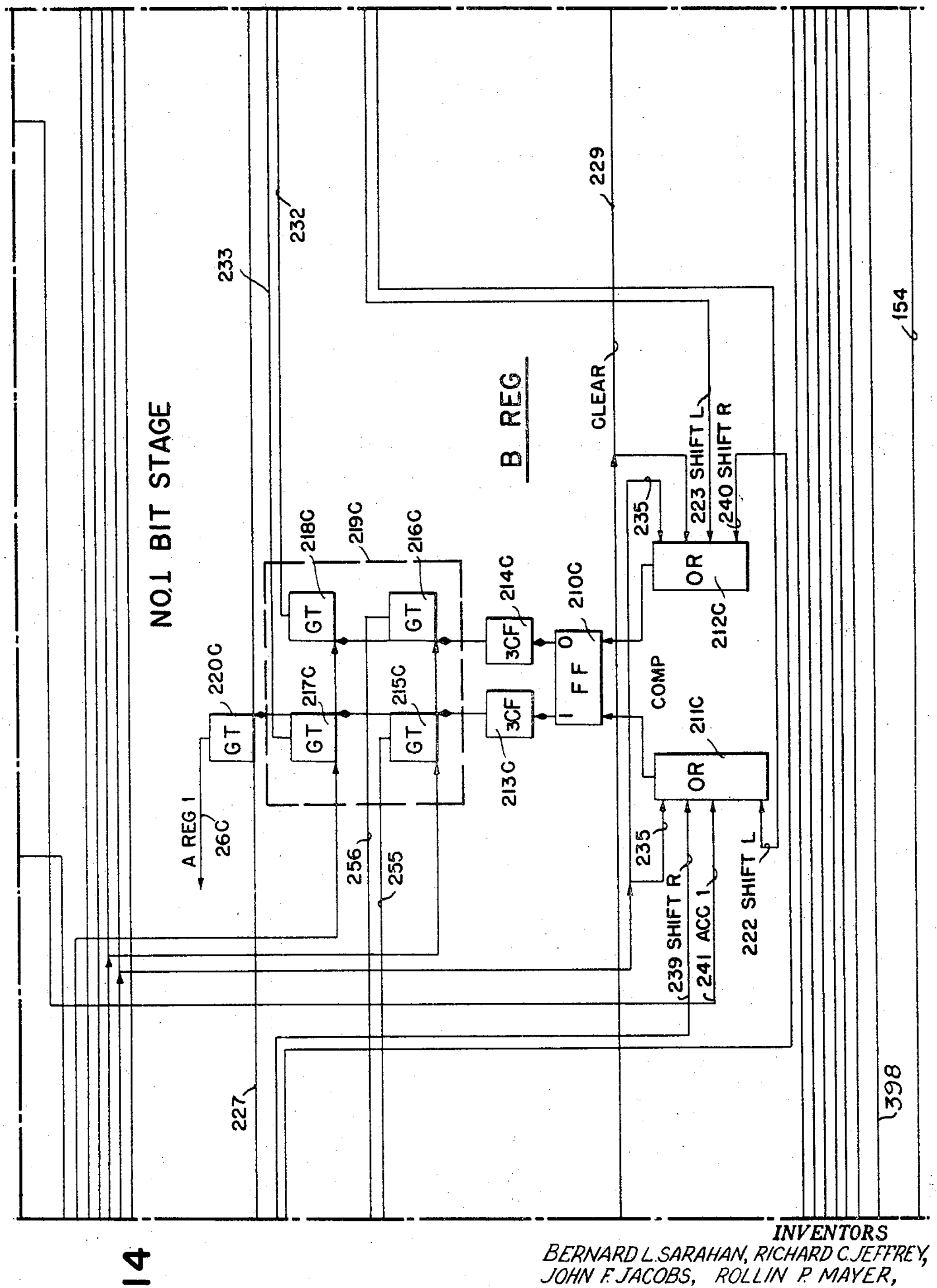
Figure 15:
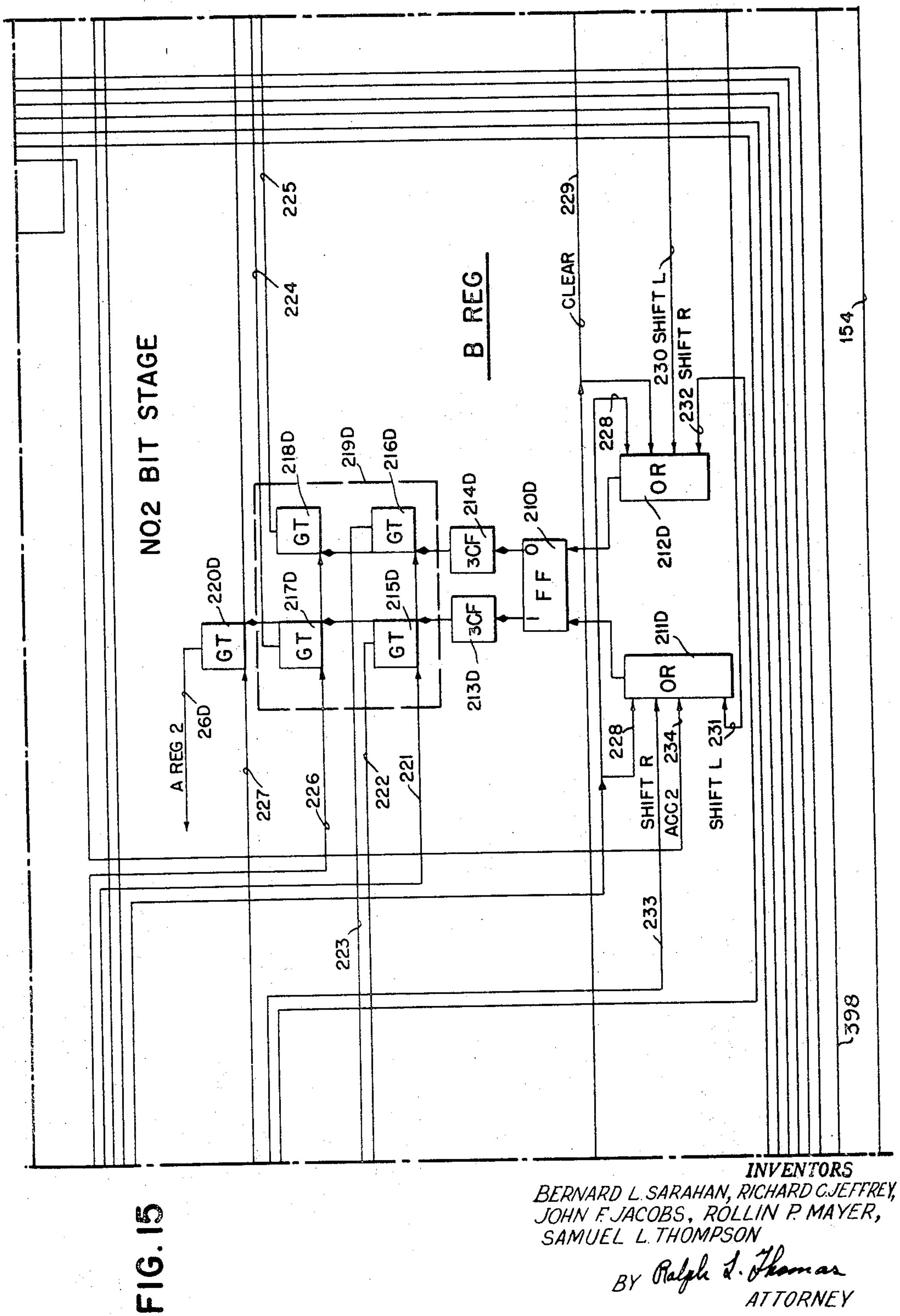

A summary is made now of the input lines to OR circuits 211C and 212C of FIGURE 14. As in the previous register, lines 235 and 229 are used to complement and clear, respectively. Lines 222 and 223, previously mentioned, serve to convey information to OR circuits 211C and 212C, respectively, on a shift left operation. Lines 239 and 240, connected to gates 217 and 218, respectively, serve to transfer information on a shift right operation to OR circuits 211C and 212C, respectively. Input line 241 receives transfer information from gate tube 104C in FIGURE 8 when the information is transferred from Accumulator number 1 bit stage to the B register number 1 bit stage.

Figure 13:
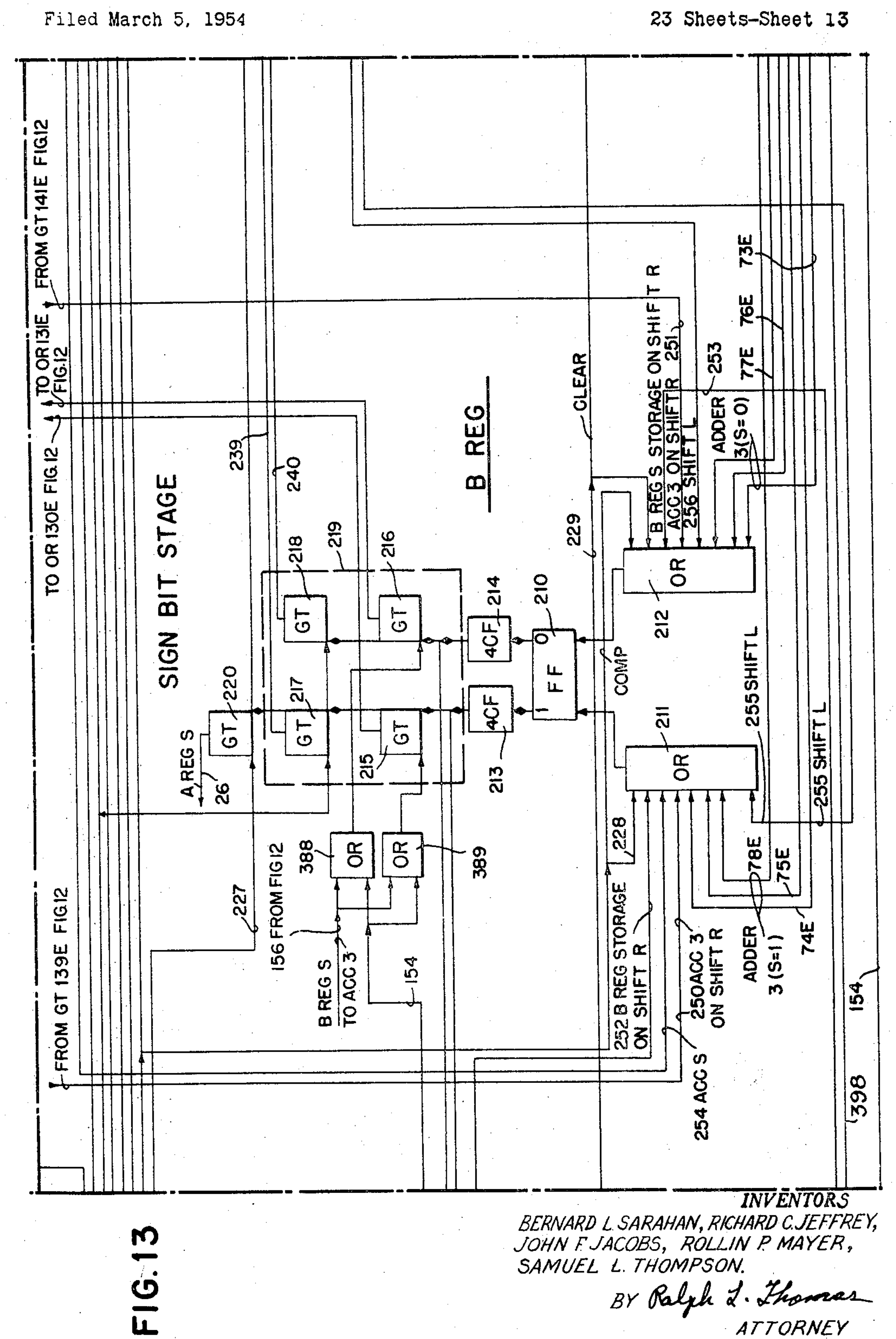

Referring now to the Sign bit stage in FIGURE 13, input lines 228 and 229 serve to complement and clear flip-flop 210, respectively. Input leads 250 and 251 convey the contents of flip-flop 132E in the number 3 bit stage of the Accumulator in FIGURE 12 from gates 139E and 141E, respectively, to input OR circuits 211 and 212, respectively, in FIGURE 13. Input leads 252 and 253 convey information to OR circuits 211 and 212, respectively, on a shift right operation from the B Register Sign Storage flip-flop 366 of FIGURE 20, described subsequently. Input lead 254 conveys a binary one from flip-flop 132 in the Accumulator sign bit stage in FIGURE 10 when gate tube 104 in FIGURE 8 is pulsed. Input leads 74E, 75E and 78E to OR circuit 211 convey a sum of one information from Adder 3 in FIGURE 7. Likewise, input leads 73E, 76E and 77E to OR circuit 212 convey a sum of zero information from Adder 3 in FIGURE 7. Input leads 255 and 256 convey information on a shift left operation from gate tubes 215C and 216C, respectively, to OR circuits 211 and 212, respectively.

From the foregoing description, it is clear at this point that the Sign bit stage of the A Register, the Adder S, the Transfer Circuit S, the Accumulator Sign bit stage, and the B Register Sign bit stage are correspondingly associated. The number 3 bit stage of the A Register, the Adder 3, the Transfer Circuit 3, the Accumulator number 3 bit stage and the B Register number 3 bit stage are likewise associated. In a like fashion, the number 1 bit and the number 2 bit stages of the various registers and transfer circuits are similarly associated. A binary word from a storage device, not shown, may be transferred to the A Register in FIGURES 2 and 3 by means of a Memory Buffer Register, not shown. Information in the A Register may be transferred to the Accumulator Register from which it may be transferred to the B Register and thence from the B Register to the A Register. It is noted that the transfers are of the parallel type. Further, information in the Accumulator Register may be shifted serially into the B Register and vice versa. Information may be extracted from the Computer from both the A or the Accumulator Registers. It is appropriate at this point to discuss the control or end effects for the Computer shown in FIGURES 17 through 20.

Figure 17:
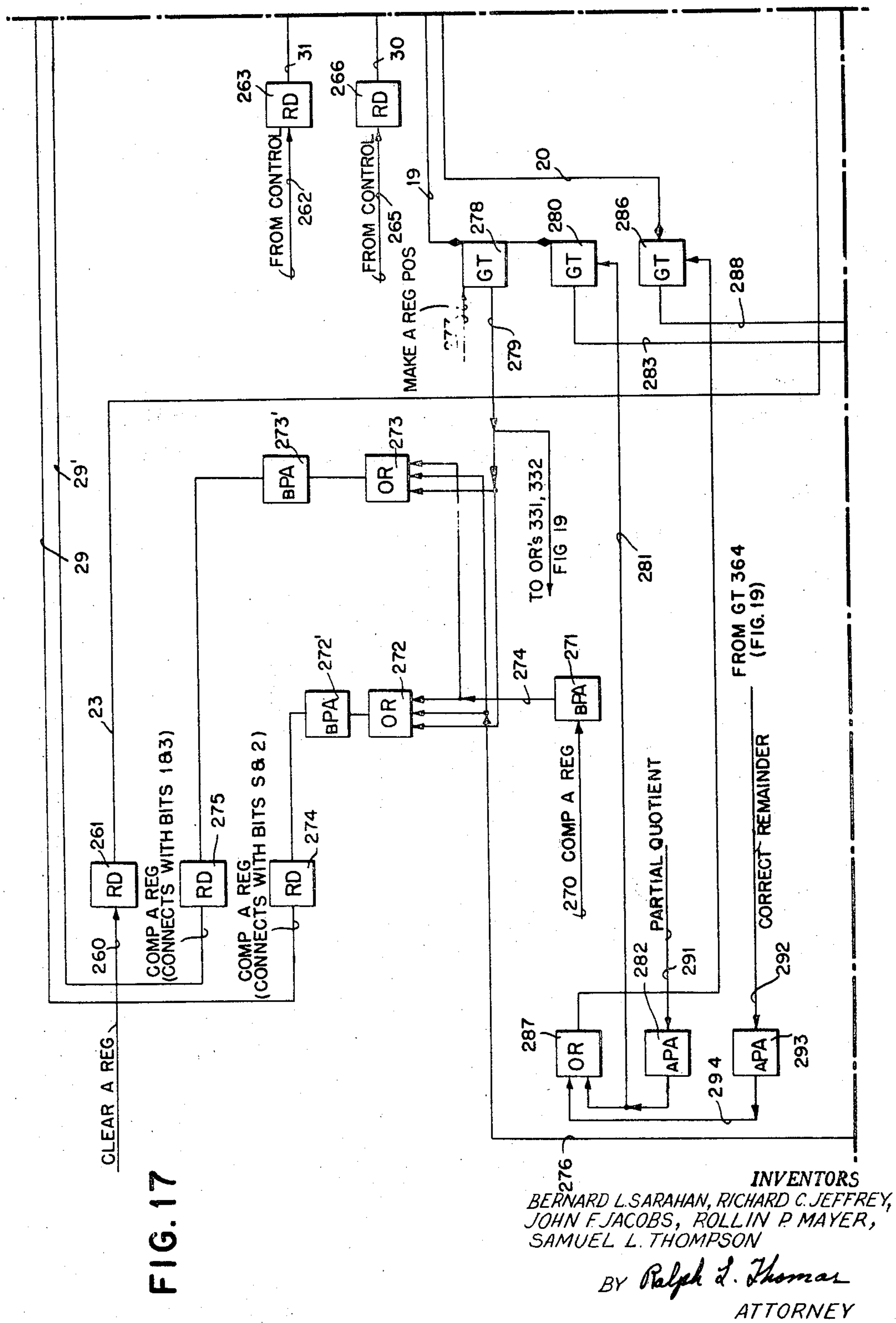

Reference is made to FIGURE 17 wherein input lead 260 conveys a pulse to register driver 261, the output of which pulses OR circuits 11 and 11C through 11E (FIGS. 2 and 3) to clear the A Register by setting flip-flops 10 and 10C through 10E in the zero state of conduction. If input lead 262 (FIG. 17) is pulsed, register driver 263 delivers an output pulse via line 31 to gates 15 and 15C through 15E for transferring the contents of the A Register to the Accumulator Register. In a similar manner, input line 265 is pulsed when it is desired to deliver an output pulse on line 30 from register 266 to gates 16 and 16C through 16E for transferring the contents of the A Register to Memory Buffer Register number 1, not shown. When it is desired to complement the A Register, input lead 270 (FIG. 17) delivers a pulse to a pulse amplifier 271 which in turn pulses OR circuits 272 and 273 by means of line 274. The output pulses from OR circuits 272 and 273 are applied first to pulse amplifiers 272′ and 273′, respectively, and then to register drivers 274 and 275, respectively, which in turn pulse lines 29 and 29′, respectively, to complement flip-flops 10 and 10C through 10E in the A Register. It is noted that line 29 complements bits Sign and 2 of the A Register, and line 29′ complements bits 1 and 3. Further, line 276 (FIG. 17) may be pulsed to accomplish the operation of complementing. If input line 277 of gate 278 is pulsed, line 279 is pulsed provided that the Sign bit flip-flop 10 in FIGURE 2 is set in the one state of conduction. It is pointed out that a pulse on line 277 complements the A Register only if the A Register holds a negative number, the negative number being indicated by a one in its Sign Bit Stage. The pulse from gate 278 also serves to complement the Sign Control flip-flop in FIGURE 19, as pointed out subsequently. Gate 280 as well as gate 278 is conditioned by a positive D.C. level on line 19 from the cathode follower 14 in FIGURE 2, and upon recipt of an input pulse on line 281 from pulse amplifier 282, gate 280 yields an output pulse on line 283 which is applied to OR circuit 284 in FIGURE 7 thence through pulse amplifier 285 to OR circuits 47E through 49E. In a similar fashion, gate tube 286 is set by a D.C. level established on line 20 by cathode follower 13 in FIGURE 2 when flip-flop 10 is in the zero state, so that a pulse received from OR circuit 287 establishes a pulse on output line 288 from gate tube 286 which is delivered to OR circuit 289 in FIGURE 7 thence to pulse amplifier 290 before being applied on the carry zero line to OR circuits 44E through 46E inclusively. It is pointed out that both gates 280 and 286 are pulsed if Partial Quotient line 291 is pulsed whereas only gate 286 is pulsed if the Correct Remainder line 292 is pulsed.

Figure 18:
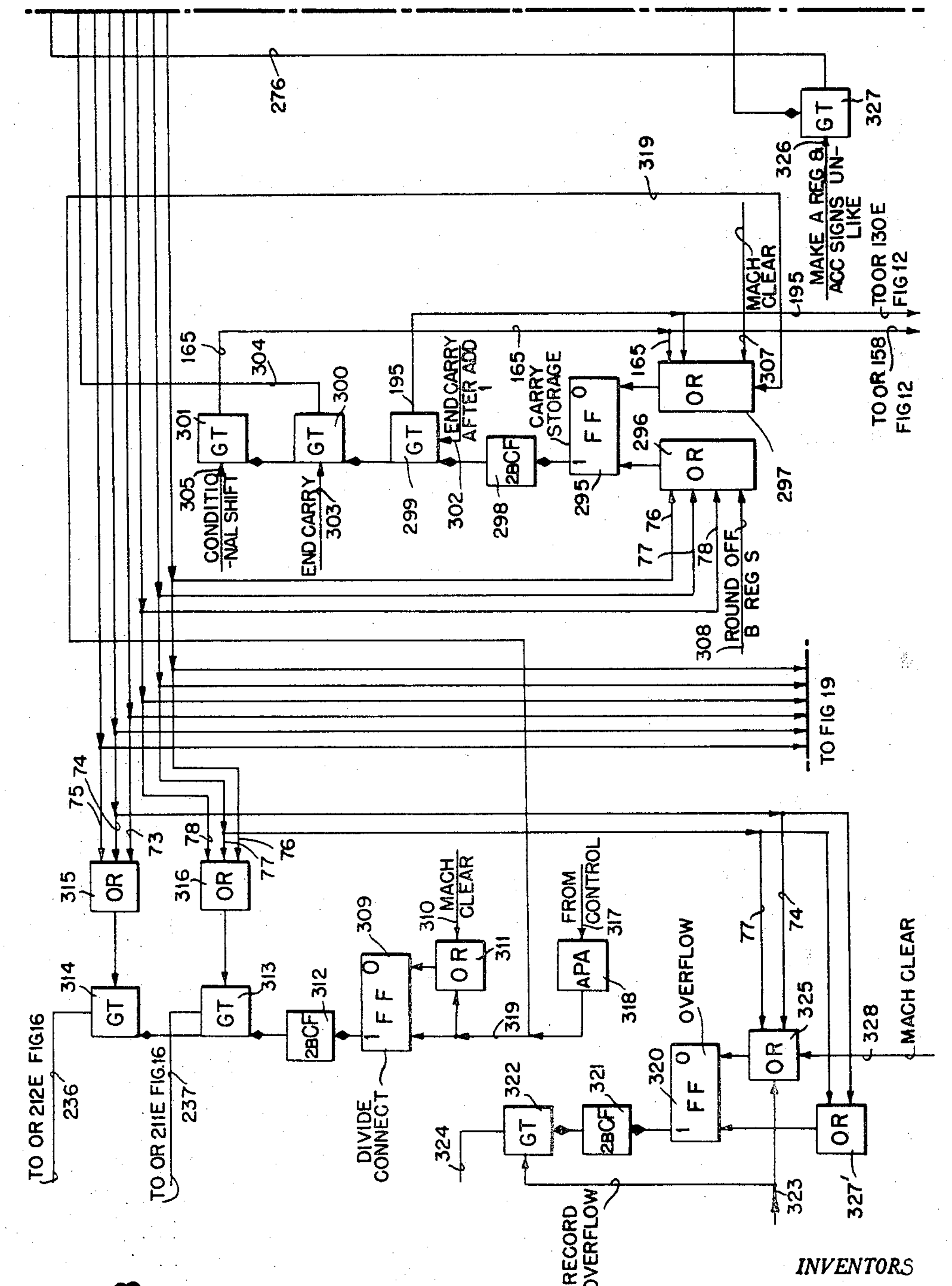

Reference is made to FIGURE 18 wherein carry storage flip-flop 295 has OR circuits 296 and 297 connected to its left and right input sections, respectively. The function of flip-flop 295 is to store the carry from Adder S i.e., a carry of one from Adder S on line 76 through 78 set the flip-flop 295 in the one state of conduction. To determine which state of conduction the flip-flop is in, it is necessary to sample only one of its outputs, and in this case, the one state of conduction is selected. The output of flip-flop 295 undergoes power amplification in cathode follower 298 before being applied to the gates 299 through 301 inclusively. If input line 302, labeled End Carry After Add One, to gate 299 is pulsed, an output pulse on line 195 is delivered to OR circuit 130E of the Accumulator number 3 bit stage in FIGURE 12 to set the flip-flop 132E in the one state of conduction. This operation is termed the end carry after Add 1. An input pulse on line 303 causes gate tube 300 to establish an output pulse on line 304 which is applied to OR circuit 284 in FIGURE 7 to pulse amplifier 285, thereby pulsing the carry one line to OR circuit 47E through 49E inclusively. This operation is termed end carry. A pulse applied to gate 301 on input line 305 sets up a pulse on output line 165 which is applied to OR circuit 158 in the Accumulator number 3 bit stage of FIGURE 12 to pulse the pulse amplifier 159 and initiate a left shift operation in the Accumulator Register as previously explained. This operation is termed conditional shift since it takes place only upon the condition that Adder S supplies a carry of one to the Carry Storage flip-flop 295 (FIG. 18), thereby setting it in the binary one state.

For a description of the inputs to OR circuits 296 and 297, reference is made to FIGURE 18. Lines 76 through 78 convey a carry of one from Adder S (FIG. 4) to OR circuit 296. It is pointed out that input lines 195 and 165 from gates 299 and 301, respectively, serve to set the carry storage flip-flop 295 to the zero state of conduction as well as performing the previously described function. The input line 307 to OR circuit 297 serves to clear flip-flop 295 by setting it in the zero state of conduction. Since the carry storage flip-flop must be cleared before commencing certain mathematical problems, input line 307 is automatically pulsed by means, not shown, prior to commencing each mathematical problem. This operation is termed Machine Clear. The input line 308 to OR circuit 296 serves to set the flip-flop 295 in the one state of conduction in a well known Round Off B Register Sign operation.

Figure 4:
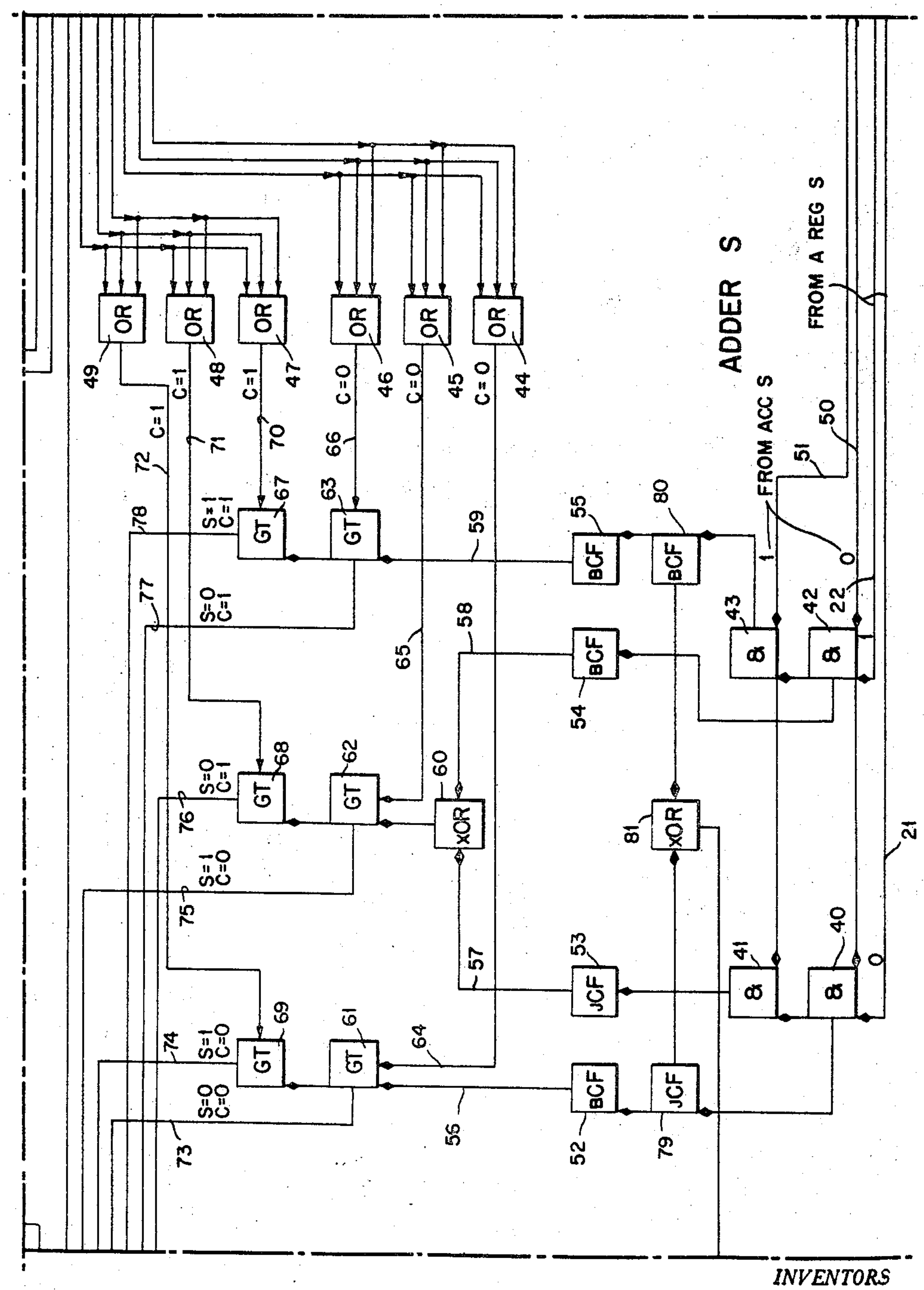

Reference is made to a Divide Connect flip-flop 309 in FIGURE 18 which, like flip-flop 295, is set to the zero state of conduction prior to certain mathematical problems by a pulse automatically applied via line 310 to OR circuit 311 by the Machine Clear operation, previously mentioned. The output on the one side of the Divide Connect flip-flop 309 undergoes power amplification in cathode follower 312 before being applied to condition gates 313 and 314. An output pulse from Adder S in FIGURE 4 on any of the carry zero lines 73 through 75 is passed by OR circuit 315 to gate 314 which, if conditioned transmits a pulse via line 236 to OR circuit 212E in FIGURE 16, thereby setting flip-flop 210E in the number 3 bit stage of the B Register in the zero state of conduction. In a similar fashion, an output pulse on any one of the carry one lines 76 through 78 from Adder S in FIGURE 4 is passed by OR circuit 316 in FIGURE 18 to gate 313 which, if conditioned, transmits a pulse on line 237 to OR circuit 211E in FIGURE 16, thereby setting flip-flop 210E in the number 3 bit stage of the B Register in the one state of conduction. If a pulse is applied to input line 317, pulse amplifier 318 transmits a pulse on line 319 to complement the divide connect flip-flop 309.

Overflow flip-flop 320 in FIGURE 18 has its one side output connected through cathode follower 321 to gate tube 322 which, when pulsed on line 323, transmits a pulse via line 324 to an indicator device, not shown, for directing attention to the fact that an overflow has occurred. An input pulse on line 323 serves two functions. First, gate 322 is pulsed to determine if flip-flop 320 is in the one state of conduction, and if so, an output pulse is established on line 324 to actuate the indicator. Secondly, the pulse on input line 323 is passed by OR circuit 325 to clear Overflow flip-flop 320 by setting it in the zero state of conduction. If input lines 74 and 77 to OR circuits 325 and 327′ are pulsed by Adder S in FIGURE 4, the flip-flop 320 is complemented. A pulse on either line 74 or 77 from Adder S is indicative of an attempt to add two numbers whose sum is greater than one. Lead 328 is pulsed to clear flip-flop 320. As previously stated, the registers cannot hold numbers greater than one in absolute value. However, it is possible to attempt to add two numbers which are each less than one, but whose sum is greater than one. Two possibilities exist. First, any binary number in the A Register and any binary number in the Accumulator Register, each being less than one, cannot yield a sum greater than one if their signs are unlike. Second, if the signs of the numbers in the A Register and Accumulator Register are alike, and if their sum is greater than one, Adder S establishes a pulse on either line 74 or 77 in all cases. Accordingly, Overflow flip-flop 320, originally in the zero state, is complemented by a pulse received on either line 74 or 77, thereby effecting a change from the zero state of conduction to the one state of conduction in Overflow flip-flop 320. A sampling pulse applied to input line 323 yields an output pulse on line 324 from gate 322 to actuate an indicator device, not shown, whenever a sum greater than one is attempted. The Overflow flip-flop is used to modify the Program when inspected during certain mathematical operations.

If input line 326 to gate 327 in FIGURE 18 is pulsed while gate 327 is conditioned by a positive D.C. level from $_x$OR circuit 81 in FIGURE 4, a pulse is established on line 276 which complements the A Register. This operation is termed Make the A Register and Accumulator signs unlike. If the signs of the numbers in the A Register and Accumulator Register are alike, a positive D.C. level is established at $_x$OR circuit 81, and gate 327 is permitted to pass a pulse which renders the above two registers unlike by complementing the A Register.

It is necessary before division problems to set the Divide Connect flip-flop 309 in the one state of conduction by applying a pulse to pulse amplifier 318 via line 317.

At various points in a division problem, it may be necessary to pulse input line 326 as demonstrated by an example division problem given subsequently.

Figure 19:
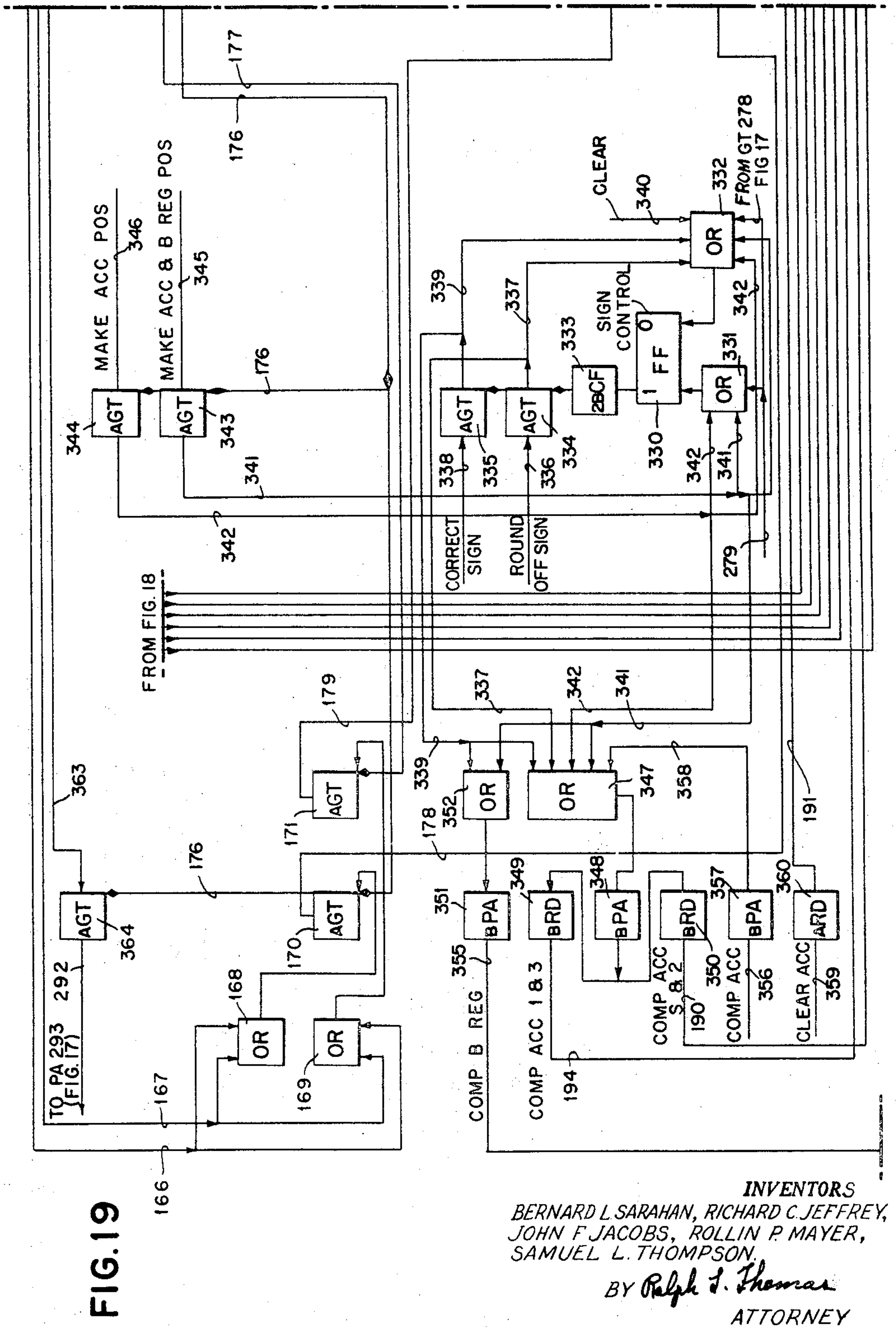

Reference is made now to FIGURE 19 for the Sign Control flip-flop and other controls. Sign control flip-flop 330 is shown with OR circuits 331 and 332 connected to its left and right input sections, respectively. The output from the left side of flip-flop 330, representative of the one state of conduction, undergoes power amplification in cathode follower 333 before being applied to conditioned gates 334 and 335. An input pulse on line 336 produces an output pulse on line 337 from gate 334 provided sign control flip-flop 330 is in the one state of conduction. The output pulse from gate 334 is applied to OR circuit 332 to reset the Sign Control flip-flop 330 to the zero state of conduction. Similarly, an input pulse on line 338 to gate 335 yields an output pulse on line 339, when the Sign Control flip-flop 330 is in the one state of conduction, which sets the sign control flip-flop in the zero state of conduction. An input pulse on line 340 to OR circuit 332 clears the Sign Control flip-flop by setting it in the zero state. An input pulse on lines 279, 341, or 342 complements the Sign Control flip-flop 330 since both OR circuits 331 and 332 are pulsed. Pulses on lines 341 and 342 are derived from gates 343 and 344, respectively when input lines 345 and 346, respectively, are pulsed and a positive D.C. level is established on line 176 by flip-flop 132 in the Accumulator sign bit stage of FIGURE 10. When gate 344 is conditioned by a D.C. level from flip-flop 132 in FIGURE 10, an input pulse applied to gate 344 on line 346 serves to complement the Accumulator Register, by establishing a pulse on line 342 to OR circuit 347. Pulse amplifier 348 receives the pulse from OR circuit 347 and in turn pulses register drivers 349 and 350 each of which supplies a pulse on lines 194 and 190, respectively, to complement the flip-flops 132 and 132C through 132E in the stages Sign through 3 of the Accumulator Register shown in FIGURE 10 through 12. In the same manner, a pulse applied to line 345 causes gate 343 to transmit a pulse to OR circuit 347 on line 341 and complement the Accumulator Register as previously pointed out. Further, the pulse on line 341 is applied to pulse amplifier 351 through OR circuit 352 and a pulse is transmitted to both register drivers 353 and 354 in FIGURE 20 by means of line 355. Register drivers 353 and 354 establish pulses on lines 228 and 235, respectively, to complement the flip-flops 210 through 210E in the Sign through 3 stages of the B Register in FIGURES 13 through 16, respectively. An output pulse on line 339, from the previously mentioned gate 335, pulses both OR circuits 352 and 347 which serve to complement both the B Register and the Accumulator Register since pulse amplifiers 348 and 351 are pulsed by OR circuits 347 and 352, respectively. A pulse applied on either line 337 or line 342 to OR circuit 347 serves to complement the Accumulator Register. A pulse applied to line 356 causes pulse amplifier 357 to establish a pulse on line 358 to OR circuit 347 and complement the Accumulator Register. An input pulse on line 359 causes register driver 360 to establish a pulse on line 191 to clear the Accumulator Register by setting flip-flops 132 through 132E in the zero state of conduction. If line 361 in FIGURE 8 is pulsed, pulse amplifier 362 delivers a pulse on line 363 to gate 364 in FIGURE 19 which, if line 176 has positive D.C. level established thereon, delivers an output pulse on line 292. This operation is termed Inspect Accumulator Sign Bit For One. If the Accumulator Sign bit is one, gate 364 is conditioned to pass a pulse to pulse amplifier 293 in FIGURE 17 to correct the remainder as previously explained.

Figure 20:
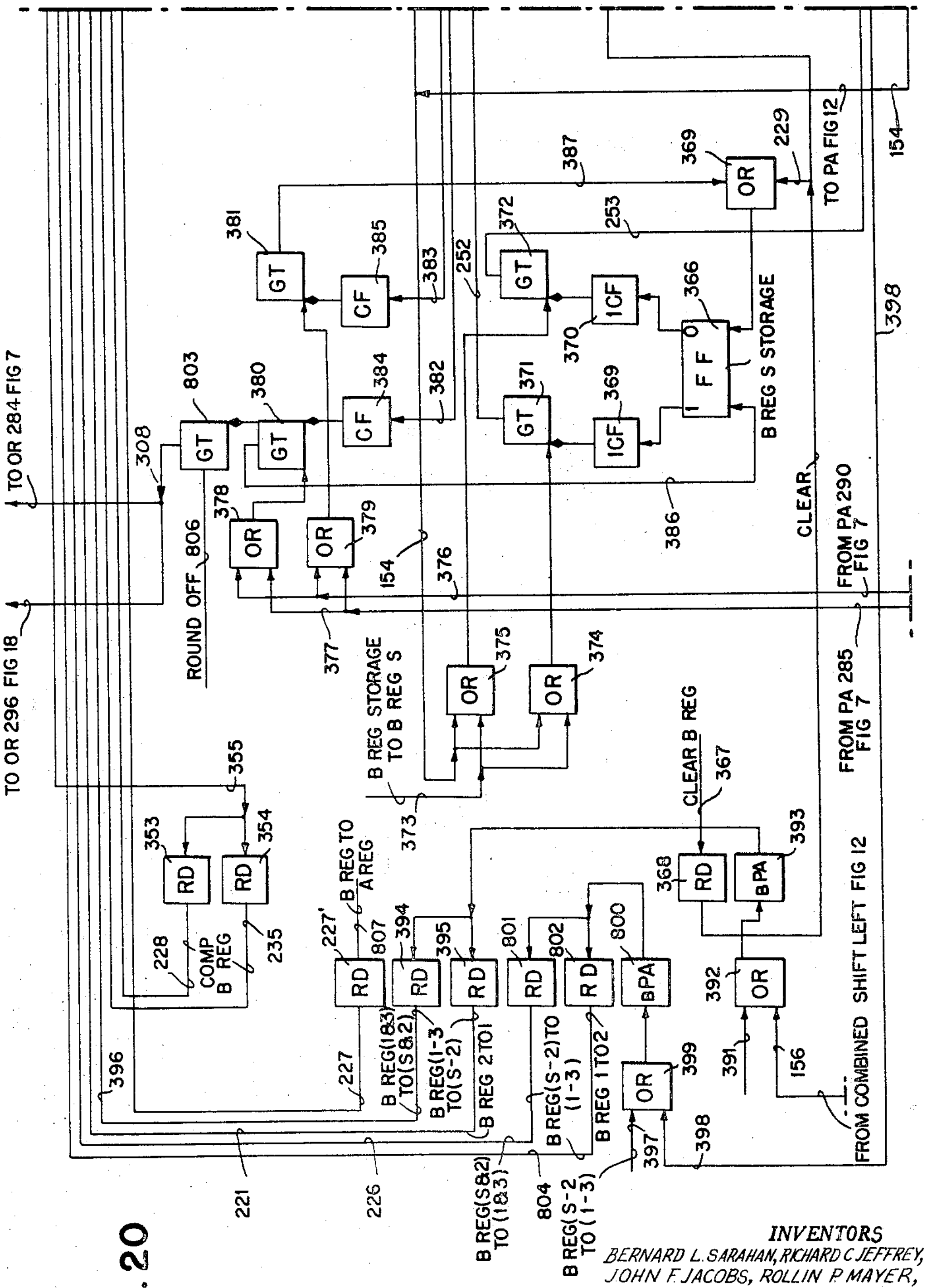

Reference is made to FIGURE 20 wherein flip-flop 366 serves to store the B Register Sign bit information whenever there is a carry of one or zero supplied to Adder 3 in FIGURE 7. A pulse on line 367 causes register driver 368 to establish a pulse on line 229 which is applied through OR circuit 369 to clear the B Register Sign Storage flip-flop 366. A pulse on line 229 also serves to clear the B Register stages S through 3. The outputs from the left and right sections of flip-flop 366 are passed through cathode followers 369 and 370, respectively, to gates 371 and 372, respectively. A pulse applied on line 373 or line 154 is passed by OR circuits 374 and 375 to gates 371 and 372, respectively. If flip-flop 366 is in the zero state, gate 372 establishes a pulse on line 253 and sets flip-flop 210 in FIGURE 13 in the zero state. If flip-flop 366 is in the one state, gate 371, when pulsed, delivers an output pulse on line 252 to set flip-flop 210 in FIGURE 13 in the one state. It is noted that OR circuits 374 and 375 are pulsed only when pulse amplifier 159 in FIGURE 12 is energized or when input line 373 is energized. The pulse amplifier 159, previously described, is pulsed to shift the Accumulator left, and in this left shift operation, the contents of the B Register Sign bit stage is transferred to the Accumulator number 3 bit stage. In addition, the contents of the B Register Sign Storage flip-flop 366 is transferred simultaneously to the flip-flop 210 in the Sign Bit Stage of the B Register in FIGURE 13. Lines 376 and 377, when pulsed by pulse amplifiers 290 and 285 respectively, in FIGURE 7, pulse OR circuits 378 and 379 to establish an input pulse on both gates 380 and 381, respectively, to transfer the contents of the Sign Bit Stage of the B Register in FIGURE 13 to the B Register Sign Storage flip-flop 366. The outputs from cathode followers 213 and 214 in FIGURE 13 are applied via lines 382, 383, respectively, to cathode followers 384 and 385, respectively, in FIGURE 20, which are in turn connected to gates 380 and 381, respectively. The outputs of gates 380 and 381 are transferred on lines 386 and 387, respectively, to the left and right input sections of the B Register Sign Storage flip-flop 366. In each add operation, as previously pointed out, the contents of corresponding bits in the A Register and the Accumulator are totalized in the corresponding Adder along with the carry, and the sum placed in the Accumulator stage one position to the right. The sum from Adder 3 is automatically placed in the Sign bit stage of the B Register. Since it may be desirable to retain the information in the Sign Bit Stage of the B Register, its contents is simultaneously and automatically shifted to the B Register Sign Storage in each add operation. This is accomplished in this manner. Either pulse amplifier 285 (FIG. 7) or pulse amplifier 290 is pulsed to initiate an add operation and hence a pulse is established on either line 376 or 377 in FIGURE 7 which pulse is applied to both OR circuits 378 and 379 (FIGS. 7 and 20) which in turn transmit the pulse to gates 380 and 381, respectively, to transfer the contents of the Sign Bit Stage to the B Register Sign Storage flip-flop as previously explained. If the Accumulator Register is shifted one place to the left after an add operation to get the sum bits in their correct orders, it is first necessary to pulse the pulse amplifier 159 which in turn supplies a pulse on line 154 from FIGURE 12 to OR circuits 374, 375 (FIG. 20) and OR circuits, 388 and 389 (FIG. 13). OR circuits 388 and 389 pass the pulse to gates 215 and 216 which transfer the contents of the B Register Sign Bit Stage to the Accumulator number 3 Bit Stage. The OR circuits 374 and 375 pass the pulse from line 154 to gates 371 and 372 which transfer the contents of the B Register Sign Storage back to the B Register Sign Bit Stage.

If input lines 156 or 391 are pulsed, OR circuit 392 passes the pulse to pulse amplifier 393 which in turn pulses register drivers 394 and 395 which pulse lines 396 and 221, respectively, to shift the B Register Stages 1 through 3 to Sign through 2.

If input lines 397 or 398 (FIG. 20) to OR circuit 399 are pulsed, a pulse amplifier 800 energizes register drivers 801 and 802 which in turn establish pulses on output lines 226 and 804, respectively, to shift the B Register Stages Sign through 2 to Stages 1 through 3. In certain operations it is desirable to successively shift the contents of the B Register one position to the right and to sample the contents of the 3 Bit Stage of the B Register for each successive shift. This is accomplished by applying successive pulses to input line 398, labeled Partial Product, in FIGURE 16 which energizes gates 217E and 218E, thereby sensing the contents of flip-flop 210E. If the contents of flip-flop 210E is a one, gate 217E transmits a pulse on line 805 through OR circuit 289 in FIGURE 7 to pulse amplifier 290 and establishes a pulse on the carry zero input line to Adder 3 which initiates an add operation, thereby totalizing the contents of the A Register and the Accumulator Register. If the contents of flip-flop 210E of FIGURE 16 is a zero, gate 218E establishes a pulse on line 148 and initiates a shift right operation of the Accumulator Bits Sign through 3. Further, the pulse on line 398 in FIGURE 16 is applied to OR circuit 399 in FIGURE 20 which passes the pulse to pulse amplifier 800 the output of which pulses register drivers 801 and 802, thereby effecting a right shift operation of B Register stages Sign through 2 to stages 1 through 3. To summarize briefly, a pulse applied to line 398 in FIGURE 16 effects a shift operation of the B Register Sign through 2 to the B Register Stages 1 through 3 and either shifts the Accumulator Stages 1 through 3 to the right with the contents of the Accumulator number 3 bit stage being placed in the Sign bit stage of the B Register or initiates an add operation which totalizes the contents of the A Register and the Accumulator Register and places the sum one position to the right in the Accumulator Register with the output of Adder 3 being placed in the Sign Bit of the B Register. The preceding operation takes place for each successive pulse applied to input line 398 in FIGURE 16.

A novel feature of the apparatus herein described is the speed by which mathematical calculations are accomplished. Increased speed is obtained by using fast acting basic circuits, described subsequently, in the various blocks shown throughout FIGURES 2 through 20 and in the novel intercircuit arrangement of the components shown in block form. A typical example of the former is the high speed flip-flop. Typical of the latter timesaving feature is the intercircuit arrangement for accomplishing the operation described in the previous paragraph. Assume, for example, a 10 bit stage apparatus, of the type herein described, is performing the previous operation. A first pulse applied to input lead 398 in FIGURE 16 (assuming the B Register number 3 bit stage is in the one state) pulses line 805 and initiates an add operation commencing with Adder 3 (FIG. 7). As soon as the output of Adder 3 (representing the sum of the contents of the number 3 bit stage of the A Register and the number 3 bit stage of the Accumulator Register) transmits a pulse on one of the lines 73E through 78E, Adder 3 is then idle. The output of Adder 3 is automatically stored in the Sign bit stage of the B Register, and further, the output of Adder 3 initiates an add operation in Adder 2. As previously pointed out, each adder has three inputs, the first and second of which are positive D.C. levels supplied by corresponding bit stages of the A Register and Accumulator Register, whose sum is represented by a positive D.C. level on one of four output lines from the AND circuits in each adder. The third input, in the form of a pulse, from the next lower order adder, representative of a carry zero or carry one, initiates and effects a final sum representative of a sum and a carry. Further, the first pulse on line 398 (FIG. 16) is applied to OR circuit 399 (FIG. 20) to effect a right shift of the B Register stages Sign through 2 to B Register stages 1 through 3 simultaneously with the add operation in Adder 3; whereupon the Sign Bit Stage of the B Register is free prior to the arrival of the output from Adder 3. Since the contents of the Accumulator number 3 bit stage need not be preserved after the add operation in Adder 3 is commenced, this stage is ready to receive the output of the Adder 2 stage upon completion of the add operation in Adder 2. It is pointed out that the add operation in Adder 3 and the shift operation in the B Register commence simultaneously and the output from Adder 3 is derived in short order and applied to the Sign bit stage of the B Register for storage and applied to Adder 2 for initiating the add operation in that adder. While the add operation is progressing successively to the left, starting first in Adder 3, then to Adder 2, etc., successive pulses are applied to line 398 to pulse line 805 to commence other successive add operations in Adder 3. Accordingly, in the 10 bit stage apparatus assumed, as soon as the add operation commenced by the first pulse has progressed from Adder 10 to Adder 9, a second pulse is applied to line 398 and as soon as the second add operation in Adder 3 has progressed to Adder 2, a third pulse is applied to line 398, etc. It is thereby possible to have as many as 10 successive add operations in progress at any one instant, the partial sum being progressively shifted right in the Accumulator and into the B Register through the Sign bit stage. The pulse on line 398 in FIGURE 16 being asynchronous with respect to the completion of the add operation in Adder S of FIGURE 4 results in a substantial time saving in carrying out successive add operations.

The asynchronous add operation combined with an inherent shift may be initiated in one instance by pulsing line 806 in FIGURE 7 connected to pulse amplifier 807. The asynchronous add shift operation plus one is initiated, in one instance, by pulsing line 808 in FIGURE 7 connected to pulse amplifier 809.

While many diversified programming procedures are applicable to the apparatus herein described, only typical programming procedures which may be employed in fundamental mathematical processes are illustrated. For example, the processes of addition, subtraction, multiplication and division may be programmed as described below.

The Machine Clear operation is presumed prior to each of the following fundamental mathematical processes. This consists, among other things, of clearing the Carry Storage flip-flop 295 (FIG. 18), the Overflow Flip-Flop 320 (FIG. 18), the Sign Control flip-flop 330 (FIG. 19), and the Divide Connect flip-flop 309 (FIG. 18).

*Addition*

Before the numbers to be added are inserted, the A Register and Accumulator Register are cleared. Clearing is accomplished by pulsing line 260 (FIG. 17) to clear the A Register and by pulsing line 359 (FIG. 19) to clear the Accumulator Register.

The augend of the two binary numbers is placed in the A Register (FIGS. 2 and 3) by pulsing OR Circuits 12 and 12C through 12E when the corresponding order of the Augend is a ONE. Once in the A Register, this number is transferred to the Accumulator by pulsing line 262 (FIG. 17), and the A Register is then again cleared by pulsing line 260 (FIG. 17). The addend of the two numbers is then placed in the A Register by pulsing OR circuits 12 and 12C through 12E when the corresponding orders of the addend is a ONE. Line 806 (FIG. 7) labeled CARRY ZERO is pulsed which results in the adder Stages 3 through S successively producing signals representative of the sum of the contents of the corresponding stages of the A Register and Accumulator Register together with the carry from the next lower order. The sum signals from the adders set the flip-flops in the Accumulator Register according to the sum with the orders shifted one binary place to the right. If the numbers in the A Register and the Accumulator Register produce a carry of one out of the Adder S, the Carry Storage flip-flop is set in the one state by a pulse on one of the lines 76, 77 or 78 (FIG. 18). The sum in the Accumulator Register is shifted left to properly place the orders of the sum by pulsing the line 157 (FIG. 12) labeled Division Shift Left. The A Register is cleared by pulsing line 260 (FIG. 17). Line 303 (FIG. 18) labeled END CARRY is pulsed, and if the Carry Storage flip-flops is in the ONE state, the line 304 transmits the pulse to cause the Adder Stages 3 through S to add a ONE to the contents of the Accumulator Register. The Accumulator Register is shifted left to get the sum bits in the proper order by pulsing line 305 labeled Conditional Shift. The final sum is extracted from the Accumulator Register by pulsing any of the lines 107 through 109 (FIG. 8).

In the event two numbers are added, whose sum is greater than one, either line 74 or line 77 (FIG. 18) is pulsed, thereby complementing the overflow flip-flop 320.

The above described operation may be summarized as a series of commands as follows:

Clear Acc. Register and A Register
Write Augend in A Register
Transfer A Register to Accumulator Register
Clear A Register
Write Addend in A Register
Carry Zero to Adder 3
Division Shift Left
Clear A Register
End Carry
Conditional Shift For example, when an augend of plus 6/8 and an addend of minus 5/8 are added, the contents of the various registers following each command is as follows:

| Command | A Reg. | Acc. Reg. | Carry Storage | B Reg. |
|---|---|---|---|---|
| Clear Acc. Reg. & A Reg. | 0.000 | 0.000 | 0 | 0.000 |
| Write Augend in A Reg. | 0.110 | 0.000 | 0 | 0.000 |
| Transfer A Reg. to Acc. Reg. | 0.110 | 0.110 | 0 | 0.000 |
| Clear A Reg. | 0.000 | 0.110 | 0 | 0.000 |
| Write Addend in A Reg. | 1.010 | 0.110 | 0 | 0.000 |
| Carry Zero to Adder 3 | 1.010 | 0.000 | 1 | 0.000 |
| Division Shift Left | 1.010 | 0.000 | 1 | 0.000 |
| Clear A Reg. | 0.000 | 0.000 | 1 | 0.000 |
| End Carry | 0.000 | 0.000 | 1 | 1.000 |
| Conditional Shift | 0.000 | 0.001 | 0 | 0.000 |

*Subtraction*

The commands for subtraction are identical to the commands for addition except that prior to the command Carry Zero to Adder 3, an additional command termed Complement A Register takes place. As noted previously, the A Register is complemented by pulsing line 270 (FIG. 17).

For example, when a subtrahend of 1/8 and a minuend of 7/8 are subtracted, the contents of the various registers following each command is as follows:

| Command | A Reg. | Acc. | Carry Storage | B Reg. |
|---|---|---|---|---|
| Clear Acc. Reg. and A Reg. | 0.000 | 0.000 | 0 | 0.000 |
| Write minuend in A Reg. | 0.111 | 0.000 | 0 | 0.000 |
| Transfer A Reg. to Acc. Reg. | 0.111 | 0.111 | 0 | 0.000 |
| Clear A. Reg. | 0.000 | 0.111 | 0 | 0.000 |
| Write subtrahend in A Reg. | 0.001 | 0.111 | 0 | 0.000 |
| Complement A Reg. | 1.110 | 0.111 | 0 | 0.000 |
| Carry Zero to Adder 3 | 1.110 | 0.010 | 1 | 1.000 |
| Division Shift Left | 1.110 | 0.101 | 1 | 0.000 |
| Clear A Reg. | 0.000 | 0.101 | 1 | 0.000 |
| End Carry | 0.000 | 0.011 | 1 | 0.000 |
| Conditional Shift | 0.000 | 0.110 | 0 | 0.000 |

*Multiplication*

Multiplication is performed by over and over addition, as previously stated, with the multiplicand in the A Register and the multiplier in the B Register at the beginning. The first partial product is placed in the Accumulator Register and in the Sign bit stage of the B Register. The B Register number 3 bit stage is sensed for a one or a zero and then the B Register stages S through 3 are shifted right by a pulse applied to line 398 (FIG. 16) labelled Partial Product. If there is a one, the line 805 (FIG. 16) sets up a pulse on the carry zero line to Adder 3. If there is a zero, the Accumulator Register is rippled right by a pulse on line 148 (FIG. 16). In either case, the B Register is shifted right by the command pulse on line 398 (FIG. 20) so that its sign bit is cleared to receive the sum output from Adder 3 or the contents of the number 3 bit stage of the Accumulator Register, depending on whether a one or zero was sensed. A pulse is applied to the Partial Product line once for each order of the multiplier.

Since positive numbers only are used in the registers during the multiplication process, a negative number in any register is complemented to render it positive. The Sign Control flip-flop 330 (FIG. 19), set to zero by the Machine Clear operation, is automatically complemented whenever any register is made positive. Thus it serves to preserve the sign of the product so that at the completion of the multiplication process, the correct sign of the product is established. If the Sign Control flip-flop is complemented once, the correct sign for the product is negative, whereas if the Sign Control flip-flop is not complemented or is complemented twice, the correct sign for the product is positive. When the correct sign for the product is negative, the Accumulator Register and B Register (containing the product) are complemented. By making the multiplicand positive, no end carry can result during the multiplication process employing over and over addition, thereby resulting in an additional saving of time by eliminating end carry operations. The multiplier is made positive along with the multiplicand in order to preserve the correct sign. Upon completion of the multiplication process, the sign of the product is corrected by pulsing line 338 (FIG. 19) which, if the sign is negative, complements the Accumulator Register and B Register.

Upon completion of the multiplication process, the complete product is contained in the Accumulator Register and stages sign through 2 of the B Register combined, and the sign of the product is the Accumulator sign. Thus the Sign bit stage of the B Register does not serve its usual function of indicating proper sign during multiplication. Instead, it holds a significant bit of the product.

The above described operations may be summarized as a series of commands as follows:

Clear A Reg., Acc. Reg., and B Reg.
Write the multiplier in A Reg.
Transfer A Reg. to Acc. Reg.
Make Acc. Reg. Positive
Transfer Acc. Reg. to B Reg.
Clear A Reg. and Acc. Reg.
Write multiplicand in A Reg.
Make A Reg. positive
Partial product
Repeat Partial product once for each additional order of the multiplier.
Correct Sign.

For example, with a multiplier of $-\frac{3}{8}$ and a multiplicand of $+\frac{6}{8}$ the contents of the various registers following each command is as follows:

| Command | A Reg. | Acc. Reg. | B Reg. | Sign Control FF |
|---|---|---|---|---|
| Clear A Reg., B Reg., Acc. Reg. | 0.000 | 0.000 | 0.000 | 0 |
| Write Multiplier in A Reg. | 1.101 | 0.000 | 0.000 | 0 |
| Transfer A Reg. to Acc. Reg. | 1.101 | 1.101 | 0.000 | 0 |
| Make Acc. Reg. Positive | 1.101 | 0.010 | 0.000 | 1 |
| Transfer Acc. Reg. to B Reg. | 1.101 | 0.010 | 0.010 | 1 |
| Clear A Reg. and Acc. Reg. | 0.000 | 0.000 | 0.010 | 1 |
| Write Multiplicand in A Reg. | 0.110 | 0.000 | 0.010 | 1 |
| Make A Reg. positive | 0.110 | 0.000 | 0.010 | 1 |
| Partial Product | 0.110 | 0.000 | 0.001 | 1 |
| Partial Product | 0.110 | 0.011 | 0.000 | 1 |
| Partial Product | 0.110 | 0.001 | 1.000 | 1 |
| Correct Sign | 0.110 | 1.110 | 0.111 | 0 |

*Division*

As previously described, division is accomplished by the non-restoring method. The dividend contained as a single number in both the Accumulator Register and the B Register and the divisor contained in the A Register are rendered positive at commencement by pulsing lines 345 (FIG. 19) and 277 (FIG. 17), respectively. The Sign Control flip-flop 330 (FIG. 19) is complemented once each time a register is made positive and serves to hold the correct sign of the quotient and remainder and the sign is corrected at the end of the division process.

The Divide Connect flip-flop 309 (FIG. 18), used to transfer each quotient bit from Adder S to the number 3 bit stage of the B Register, is set in the one state of conduction by pulsing line 317 (FIG. 18) before commencement of the division process.

A series of steps, repeated once for each order of the divisor, is described as follows:

(1) The A Register is complemented if its sign and the sign of the Accumulator Register are alike by pulsing line 326 (FIG. 18) labeled Make A Register and Accumulator Register Signs Unlike.

(2) The dividend, contained in the Accumulator Register and B Register combined, is shifted one place to the left by pulsing line 156 (FIG. 12) labeled Combined Shift.

(3) By pulsing line 291 (FIG. 17) labeled Partial Quotient, the two's complement of the divisor is added to the partial remainder contained in the Accumulator Register provided that the sign of the divisor is negative; whereas the divisor is added to the partial remainder provided that the sign of the divisor is positive.

(4) A left shift operation is performed by pulsing line 157 (FIG. 12) labeled Division Shift Left to place the orders of the new remainder in the proper stages of the Accumulator Register.

After the series of steps, repeated once for each order of the divisor, have been completed, additional operations are performed to correct the remainder and affix the proper signs to both the quotient and remainder as follows:

First, the Divide Connect flip-flop is complemented and the signs of the A Register and Accumulator Register are made unlike by pulsing lines 317 and 326 (FIG. 18), respectively. It is noted that the Carry Storage flip-flop 295 (FIG. 18) is set to the zero state of conduction simultaneously as the Divide Connect flip-flop is complemented.

Second, the contents of the A Register is added to the contents of the Accumulator provided that the sign of the Accumulator is negative by applying a pulse to line 361 (FIG. 8) labelled Test Accumulator Sign for a One. If the Accumulator Register sign is positive (zero), no correction is required, and a pulse on line 361 is uneventful since gate 364 (FIG. 19) is not conditioned. If, however, the sign of the Accumulator Register is negative, gate 364 passes a pulse applied to line 361 and effects an addition of the contents of the A Register and Accumulator Register. More specifically, gate 364 supplies a pulse on line 292 (FIG. 17) to power amplifier 293 which in turn pulses gate 286 which, under the assumed circumstances, is conditioned by the flip-flop 10 (FIG. 2) in the A Register Sign bit stage. The gate 286 in turn establishes a pulse on line 288 to OR circuit 289 (FIG. 7); whereupon pulse amplifier 290 establishes a pulse on the carry zero OR circuits 44E through 46E (FIG. 7) to initiate an add operation.

Third, a left shift of one place is required for the Accumulator Register and the B Register Sign stage provided that an addition operation was performed as described in the preceding paragraph. The line 305 (FIG. 18) is pulsed, and if gate 301 (FIG. 18) is conditioned, a left shift operation is effected. The gate 301 is conditioned when the Carry Storage flip-flop 259 (FIG. 18) is in the one state of conduction. As noted previously, the Carry Storage flip-flop was set in the zero state when the Divide Connect flip-flop 309 (FIG. 18) was complemented. Therefore, in the event no addition operation took place, the Carry Storage flip-flop (still in the zero state) prevents the passing of a pulse applied on line 305; consequently, the undesired left shift operation is inhibited. In the event an addition operation took place, a carry of one represented by a pulse on line 76 sets the Carry Storage flip-flop in the one state. A pulse results on line 76 under these conditions because an addition of a number (in the A Register) and the complement of a smaller number (in the Accumulator Register) results in a carry of one from the Adder 1 (FIG. 5) to the Adder S (FIG. 4). Furthermore, Adder S receives a one from the Accumulator Sign bit stage on one of its D.C. inputs and a zero from the A Register Sign bit stage on its other D.C. input. Consequently, the output of Adder S must be a sum of zero and a carry of one which is represented by a pulse on line 76.

Fourth, the remainder contained in the Accumulator Register and the quotient contained in the B Register have the proper sign affixed by applying a pulse to line 338 (FIG. 19) labelled Correct Sign. Like the sign correction for the multiplication process previously explained, the gate 335 is conditioned by the Sign Control flip-flop whenever a sign correction is necessary.

Since the apparatus herein described employs fractional numbers, the quotient, in order to be contained, must be less than one. Thus, the divisor is made larger than the dividend prior to commencing the division process.

A program for accomplishing division may include the following commands:

Clear All Registers.
Write the right half of the dividend in A Register.
Transfer A Register to Accumulator Register.
Transfer Accumulator Register to B Register.
Clear A Register and Accumulator Register.
Write the Left Half of dividend in A Register.
Transfer A Register to Accumulator Register.
Clear A Register.
Place Divisor in A Register.
Complement Divide Connect flip-flop.
Make Accumulator and B Register Sign Positive.
Make A Register Positive.
Make Accumulator Register and A Register signs Unlike.
Combined Shift Left.
Partial Quotient.
Division Shift Left.
Repeat preceding four commands once for each order of divisor.
Make Accumulator Register and A Register Signs unlike.
Complement Divide Connect flip-flop.
Test Accumulator Sign for ONE.
Conditional Shift.
Correct Sign.

For example, with a dividend of plus $^{35}/_{64}$ and a divisor of plus $^{5}/_{8}$ the contents of the various registers following each command are as follows:

| Operation | A Reg. | ACC Reg. | B Sign Storage | B Reg. |
|---|---|---|---|---|
| Clear A Reg., ACC and B Reg | 0.000 | 0.000 | 0 | 0.000 |
| Write the Right Half of dividend in A Reg | 0.110 | 0.000 | 0 | 0.000 |
| Transfer A Reg. to ACC Reg | 0.110 | 0.110 | 0 | 0.000 |
| Transfer ACC Reg. to B Reg | 0.110 | 0.110 | 0 | 0.110 |
| Clear A Reg. & ACC Reg | 0.000 | 0.000 | 0 | 0.110 |
| Write the Left Half of dividend in A Reg | 0.100 | 0.000 | 0 | 0.110 |
| Transfer A Reg. to ACC Reg | 0.100 | 0.100 | 0 | 0.110 |
| Clear A Reg | 0.000 | 0.100 | 0 | 0.110 |
| Write Divisor in A Reg | 0.101 | 0.100 | 0 | 0.110 |
| Complement the Divide Conect Flip-Flop | 0.101 | 0.100 | 0 | 0.110 |
| Make ACC—B Reg. Pos | 0.101 | 0.100 | 0 | 0.110 |
| Make A Reg. Pos | 0.101 | 0.100 | 0 | 0.110 |
| Make ACC Reg. and A Reg. Signs Unlike | 1.010 | 0.100 | 0 | 0.110 |
| Combined Shift Left | 1.010 | 1.000 | 0 | 1.100 |
| Partial Quotient | 1.010 | 1.001 | 1 | 1.101 |
| Division Shift Left | 1.010 | 0.011 | 1 | 1.101 |
| Make ACC and A Reg. Signs Unlike | 1.010 | 0.011 | 1 | 1.101 |
| Combined Shift Left | 1.010 | 0.111 | 1 | 1.011 |
| Partial Quotient | 1.010 | 0.001 | 1 | 0.011 |
| Division Shift Left | 1.010 | 0.010 | 1 | 1.011 |
| Make ACC and A Reg. signs unlike (Complement A Reg. if A Reg. Sign and ACC sign are alike) | 1.010 | 0.010 | 1 | 1.011 |
| Combined shift Left | 1.010 | 0.101 | 1 | 0.111 |
| Partial Quotient | 1.010 | 0.000 | 0 | 0.111 |
| Division shift Left | 1.010 | 0.000 | 0 | 0.111 |
| Make ACC and A Reg. signs unlike | 1.010 | 0.000 | 0 | 0.111 |
| Complement the Divide Connect Flip-Flop | 1.010 | 0.000 | 0 | 0.111 |
| Test Accumulator S for One | 1.010 | 0.000 | 0 | 0.111 |
| Conditional Shift | 1.010 | 0.000 | 0 | 0.111 |
| Correct Sign | 1.010 | 0.000 | 0 | 0.111 |

*Control*

Pulses for executing the above commands are supplied by any conventional apparatus, not shown, which forms no part of this invention. It is understood that generator means for supplying control pulses are well-known to those skilled in the art.

*Basic circuits*

Figure 21:
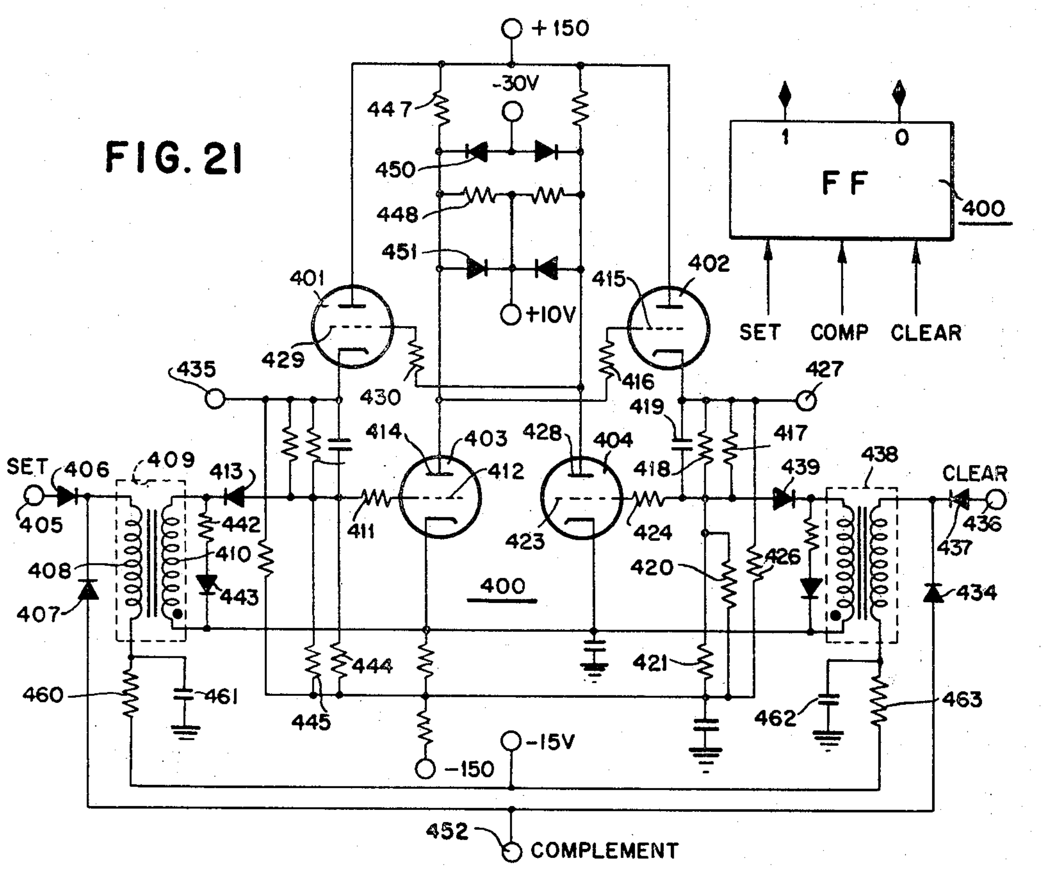
FIG. 21 shows in block and schematic form the flip-flop circuit shown in block form throughout FIGS. 2 through 20. The schemactic diagram further includes input OR circuits for the SET and CLEAR terminals.

Reference is made to FIGURES 21 through 30 for a detailed showing of the circuits employed in the block diagrams of FIGURES 2 through 20. More specifically, FIGURE 21 illustrates in block and schematic form the High Speed Flip-Flop labelled FF. A flip-flop is a bi-stable switching device which operates so that it is always in one of two stable conditions except during a transition of states, the switching from one stable condition to another being accomplished by means of short duration pulses applied to the inputs of the flip-flop circuit.

As shown in block form in FIG. 21, a flip-flop 400 has three inputs and two outputs. A positive pulse applied to the SET input terminal shown on the left of the block diagram 400 of FIGURE 21 produces a positive D.C. level at the left or binary one output, and a negative D.C. level at the right or binary zero output; a positive pulse applied to the right or CLEAR input terminal produces a positive D.C. level output on the right or binary zero output and a negative D.C. level output at the left or binary one output. A positive pulse applied to the center input, shown as the complement input, reverses the existing conduction state of the flip-flop to its opposite conduction state. This latter function is known as complementing the flip-flop, and is described in greater detail hereinafter.

Referring now to the schematic diagram of FIG. 21, tubes 401 and 402 function as cathode followers, while tubes 403 and 404 function as trigger tubes. The flip-flop may be considered as comprising two identical circuits, each circuit including a trigger tube, a cathode follower and associated circuits. It is believed that a detailed description of one of such circuits and its mode of operation, together with a more general description of the remaining circuitry, is sufficient for an understanding of the flip-flop circuit. With respect to the ensuing description, it is assumed that the flip-flop circuit initially is in the OFF condition which, by the convention employed herein, indicates that trigger tubes 403 and 404 are in the conducting and non-conducting states, respectively.

When a positive pulse is applied to the SET input terminal 405, it passes through a diode 406 to a primary winding 408 of a transformer 409, resulting in a negative pulse being induced in the secondary winding 410 of transformer 409. The pulse is prevented from going to trigger tube 404, however, by the high back resistance of diode 407. When trigger tube 403 is conducting, its grid bias is approximately zero with respect to the cathode. Since diode 413 is positioned in a loop between grid and cathode of trigger tube 403, it also has approximately zero potential produced thereacross when trigger tube 403 is conducting. Transformer secondary winding 410 is connected directly to the cathode of diode 413 and to the cathodes of trigger tubes 403 and 404. The induced pulse is of sufficient amplitude to cause trigger tube 403 to cut off which in turn causes trigger 404 to conduct in a manner described subsequently, thereby reversing the state of the flip-flop circuit to the ON condition. Anode 414 of trigger tube 403 is coupled to control grid 415 of cathode follower tube 402 through resistor 416. As trigger tube 403 is cut off, its rising anode potential is applied directly to control grid 415 of cathode follower tube 402, resulting in a corresponding rise in the cathode follower output. The cathode impedance of cathode follower 402 comprises a network including parallel connected resistors 417 and 418 and capacitor 419 in series with the parallel combination of resistors 420 and 421. The resistance elements in the above configuration constitute a voltage divider network used to control the bias on control grid 423 of trigger tube 404, the grid 423 being tapped from the voltage divider network through resistor 424. The bias on grid 423 of trigger tube 404 maintains trigger tube 404 cut off when trigger tube 403 is conducting. Resistor 426, bridged across the cathode impedance network, provides the correct output load for cathode follower 402. Terminal 427 is the output terminal of cathode follower 402, shown as the 1 output in the block diagram 400.

As the output from the anode circuit of trigger tube 403 rises, a portion of the resultant increased output from cathode follower tube 402 is applied to grid 423 of trigger tube 404 in the manner described above. This applied potential overcomes the negative bias on trigger tube 404, causing its anode potential to decrease as current conduction increases. Anode 428 of trigger tube 404 is connected to control grid 429 of cathode follower tube 401 through resistor 430, the lowered anode potential resulting in a decreased output from cathode follower tube 401. The output from cathode follower tube 401 is tapped to control grid 412 of trigger tube 403 through resistor 411. The decreased output from cathode follower 401 results in a negative bias being applied to control grid 412 of trigger tube 403 to maintain the trigger tube 403 in its cut off condition.

The operation above describes the complete cycle when the flip-flop circuit is switched from the OFF to the ON condition. Terminal 435 is the output terminal of cathode follower 401, shown in the block diagram as the "0" output.

While the operation described above illustrates a change from the OFF to ON condition of the flip-flop, the switching from the ON to the OFF condition is accomplished in a similar manner. A positive pulse applied to the CLEAR input terminal 436 passes through diode 437 to transformer 438 where it is inverted before being applied to the cathode of diode 439. Since trigger tube 404 is conducting, a zero potential exists across diode 439. The negative pulse therefore passes through diode 439 and resistor 424 to control grid 423 of trigger tube 404, causing trigger tube 404 to be cut off. The cut off of trigger tube 404 results in an increase of positive potential appearing on anode 428 of trigger tube 404. This change of potential is applied to control grid 429 of cathode follower 401, producing a corresponding increase of positive potential at the output of cathode follower 401. A portion of the output of cathode follower 401 is in turn applied to control grid 412 of trigger tube 403, causing trigger tube 403 to conduct. This results in a decrease of positive potential at anode 414 of trigger tube 403 which is then applied to control grid 415 of cathode follower 402. The decreased output from the cathode follower 402 is then coupled to control grid 423 of trigger tube 404 to maintain it in the cut off condition.

The operation of the flip-flop circuit is briefly summarized as follows: a positive pulse applied to the SET terminal 405 produces a positive and a negative D.C. level at output terminals 427 and 435, respectively; a positive pulse applied to CLEAR input terminal 436 produces a reversal of the polarity of D.C. levels at output terminals 427 and 435.

The combination of resistor 442 and diode 443 across secondary winding 410 of transformer 409 is a damping network to prevent transformer 409 from oscillating. Resistors 444 and 445 associated with trigger tube 403 are identical in function to resistors 420 and 421 associated with trigger tube 404. Resistors 447 and 448 together with diodes 450 and 451 are connected in the anode circuit of trigger tube 403, as shown. The functions of diodes 450 and 451 are to clamp the output level to 30 volts negative when trigger tube 403 is conducting and to clamp the output level to 10 volts positive when trigger tube 403 is cut off. The output level at terminal 435 is thereby constrained between the levels of +10 and −30 volts depending on the state of trigger tube 403. Grid resistors 411, 416, 424 and 430 serve to inhibit parasitic oscillations.

A positive pulse applied to complement input terminal 452 of the flip-flop 400 reverses its existing state. When a positive pulse is applied to terminal 452, it passes through separate paths including diodes 407 and 434 and transformers 409 and 438, respectively, where pulse inversion takes place. The negative pulses are applied to the cathodes of diodes 413 and 439 which are associated with the grid circuits of trigger tubes 403 and 404, respectively. Assuming trigger tube 403 is conducting, the above negative pulse cuts it off. As current conduction in trigger tube 403 decreases, its positively rising anode potential is applied through cathode follower tube 402 to grid 423 of trigger tube 404, thereby causing the voltage on grid 423 of trigger tube 404 to increase in the positive direction. The cathode follower 402 drives grid 423 above cutoff. A portion of the resulting reduction in potential at anode 428 of trigger tube 404 is coupled, as before stated, to grid 412 of trigger tube 403 to maintain trigger tube 403 in a cut-off condition after the pulse has terminated. Thus trigger tubes 403 and 404 are rendered non-conducting and conducting, respectively, and the state of the flip-flop is rapidly reversed. The pulse duration is short relative to the time required to reverse the conduction state of the flip-flop 400. Once initiated, the change in state continues until completion. If the flip-flop circuit is ON and trigger tube 404 is conducting when the complement pulse is applied, the flip-flop circuit operates in an identical manner to cut off trigger tube 404, thereby reversing its state to the OFF condition.

From the above discussion, it is evident that when the flip-flop is in one of its bi-stable states, a positive pulse applied to the input terminal of the non-conducting tube does not change the state of the flip-flop. On the other hand, a positive pulse applied to the Complement input always reverses the existing state of the flip-flop.

It is noted that diodes 406 and 407, transformer primary 408, resistor 460 and capacitor 461, together with the negative source of 15 volts potential, constitute a logical OR circuit, discussed more fully hereinafter. Similarly, diodes 437 and 434, the primary winding of transformer 438, capacitor 462 and resistor 463, together with the negative source of 15 volts, constitute a logical OR circuit.

Figure 22:
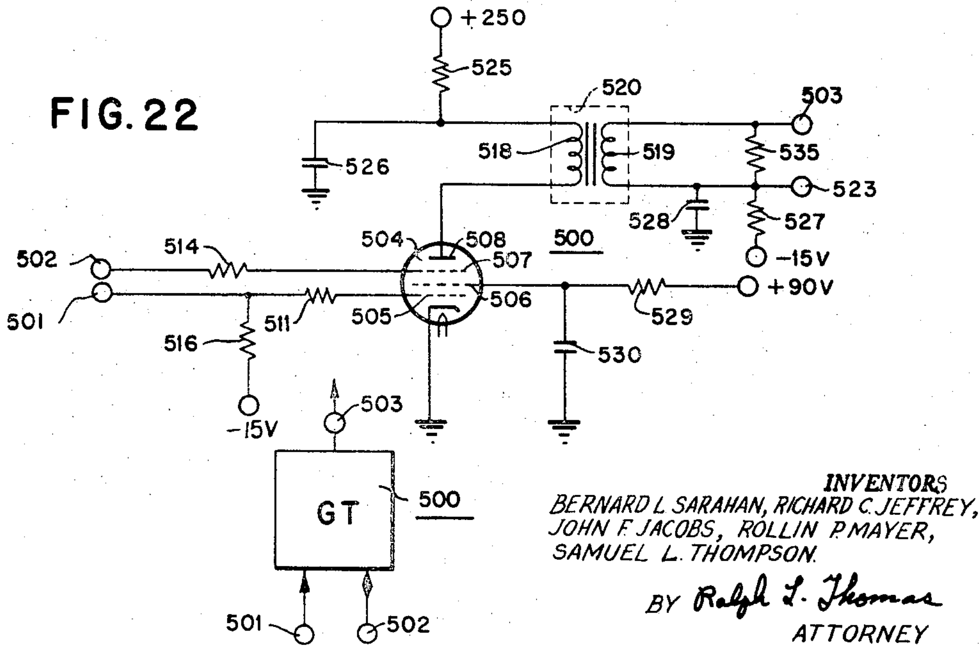
FIG. 22 illustrates in block and schematic form the gate circuit shown in block form throughout FIGS. 2 through 20.

FIG. 22 illustrates in block and schematic form the gate circuit illustrated in block form in FIGS. 2 through 20 inclusive. The gate circuit herein described is a vacuum tube AND gate which has two inputs i.e., a pulse input applied to terminal 501 and a D.C. level input applied to terminal 502 which terminal 502 effects energization of the control grid and suppressor grid, respectively. An output pulse, equal in duration to the input pulse, is produced on terminal 503.

Referring now to the schematic diagram of FIG. 22, there is shown a tube 504 having a control grid 505, a screen grid 506, a suppressor grid 507 and an anode 508. Control grid 505 receives an input pulse from terminal 501 through a parasitic suppressor resistor 511, and the suppressor grid 507 receives a D.C. level signal from terminal 502 through a parasitic suppressor resistor 514. Screen grid 506 is biased at a positive potential of 90 volts from a source, not shown, connected to a terminal 515, while the control grid 505 is biased negatively by the circuit supplying the positive pulses. A negative voltage source, connected to grid 505 through resistors 511 and 516, prevents vacuum tube 504 from conducting if the driving circuit, supplying the negative bias, should fail. Upon receiving the two positive inputs at terminals 501 and 502, the gate tube operates as a conventional pulse coincidence circuit and conducts, thereby producing a voltage across a primary winding 518 of output transformer 520. A voltage pulse, induced in the secondary winding 519 of transformer 520, is applied across output terminals 503 and 523.

The resistor and capacitor combinations of 525 and 526, 527 and 528, 529 and 530 comprise decoupling networks associated with the anode circuit, the output circuit, and the screen grid circuit respectively. Resistor 535 is a transformer terminating resistor providing damping for the output transformer 520. Positive anode potential is supplied by a source, not shown, through resistor 525.

With respect to the cathode followers illustrated in block form in the logical diagrams of FIGURES 2 through 20 inclusive, three individual types of cathode followers, shown as the B, D and J type of cathode follower, respectively, are employed singly or in combination. Cathode followers in the logical diagrams of FIGS. 2 through 20 are designated by the letters CF within a block; the type of cathode follower is indicated by a letter to the left of the CF; and the number of each type is indicated by the numeral immediately preceding the type letter. A combination of different types of cathode followers indicates a circuit arrangement comprising the indicated number and type of cathode followers connected in parallel.

The conventional cathode follower circuit has a high input and a low output impedance, and it is widely employed as an impedance matching device to couple an input signal to an output load without polarity inversion and with minimum distortion. With respect to logical circuits, the impedance matching qualities of the cathode follower are generally employed either in driving logical circuits or in driving gate circuits.

Figures 23, 23A, 24, 25:
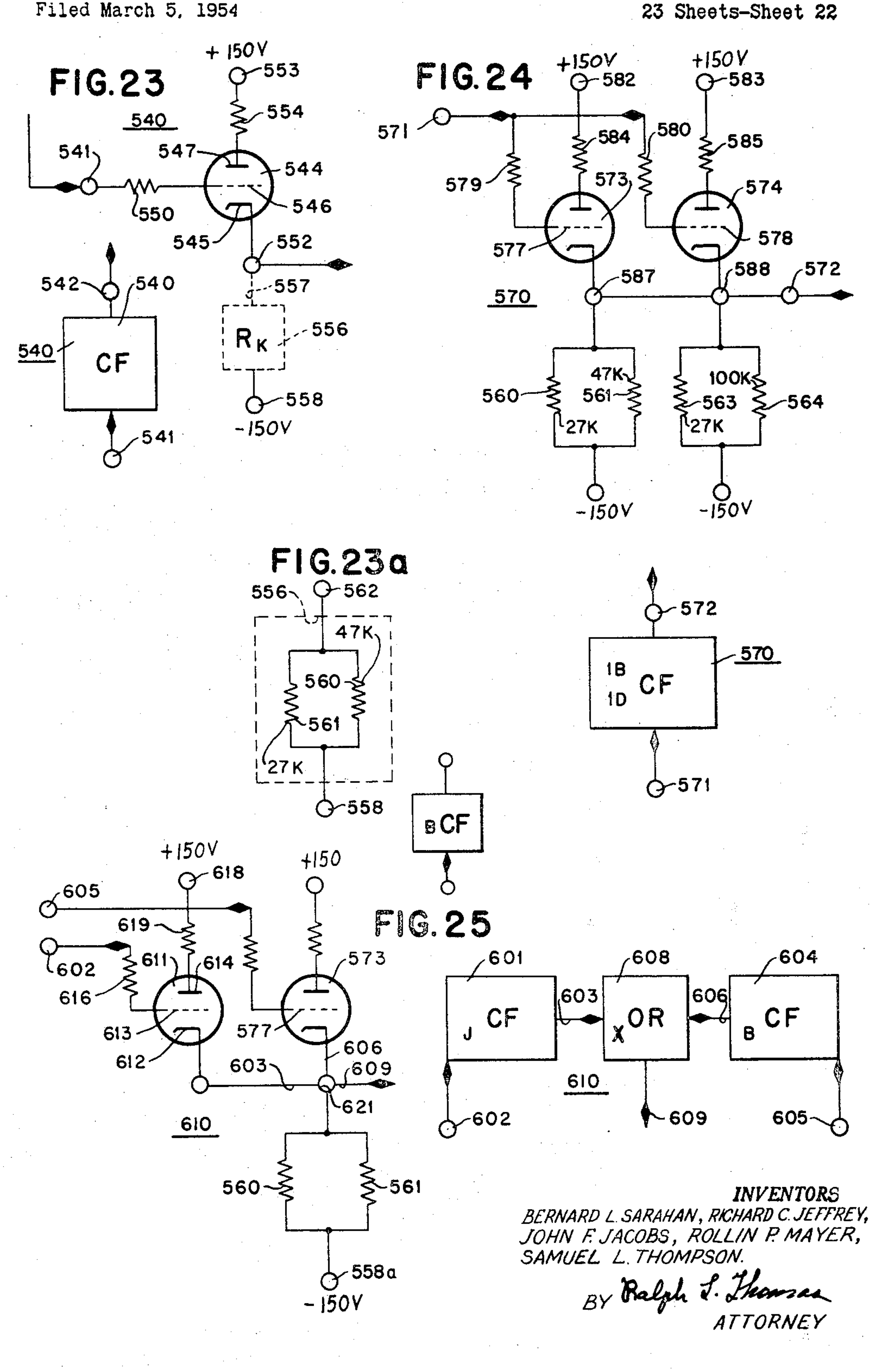
FIG. 23 illustrates in block and schematic form a general type cathode follower, showing the cathode resistance network in block form, while FIG. 23(*a*) shows the cathode resistance network employed in the B type cathode follower shown in block form throughout FIGS. 2 through 20.
FIG. 24 illustrates in block and schematic form the parallel connected B and D type cathode follower circuits shown in block form throughout FIGS. 2 through 20.
FIG. 25 illustrates in block and schematic form the parallel connected B and J type cathode followers shown in block form throughout FIGS. 2 through 20.

Referring to FIG. 23, there is shown a cathode follower 540 in block form with a D.C. level input terminal 541, and a D.C. level output terminal 542.

The simplified schematic diagram of FIG. 23 illustrates the cathode resistance $R_k$ in block form. As shown, the cathode follower circuit comprises vacuum tube 544 having a cathode 545, a control grid 546 and an anode 547. The D.C. level input at terminal 541 is supplied to the control grid 546 through a resistor 550. The D.C. level output terminal 552 is connected to cathode 545. A positive potential source is connected to anode 547 through a terminal 553 and a resistor 554. Resistors 550 and 554 are employed to suppress parasitic oscillations. Cathode resistor 556, indicated as $R_k$ in dotted block form, is connected between cathode terminal 552 and a negative source of potential, not shown, connected to a terminal 558. The cathode follower indicated in block form as $_J$CF is one of the type of cathode followers which has no separate cathode resistor. That is, its cathode is connected to the cathode resistor of another type of cathode follower, as pointed out more fully hereinafter.

FIG. 23*a* illustrates the cathode resistance network $R_k$ employed in the $_B$CF cathode follower. As shown, the resistance comprises resistors 560 and 561 in parallel, having values of 27K and 47K ohms respectively, one end of the combination being connected to terminal 562, the other end of the resistors being connected to negative power supply terminal 558. The difference between the B and D type cathode followers lies in the value of $R_k$ employed, which value is dictated by load requirements. In general, the value of the cathode resistance is dictated by the permissible fall time of the output waveform and by the requirement that the lower level of the output waveform be maintained below a predetermined value to insure that the succeeding gate tube is cut off by this lower level. The value of capacitive load which can be driven is also a function of the permissible fall time. In general, the value of capacitive load which can be driven varies inversely as the value of cathode resistance $R_k$.

FIG. 24 shows a block and schematic diagram of the B and D type cathode followers connected in parallel, and is illustrative of the arrangement employed to parallel any number of cathode followers indicated in block form in the logical diagrams of FIGS. 2 through 20. In general, the number of cathode followers employed in any circuit is dictated by the output load requirements and by circuit limitations imposed on the maximum plate dissipation which can be tolerated in each tube. The block diagram 570 of FIG. 24 illustrates an arrangement employing one B and one D type of cathode follower, indicated at the left end of the block diagram 570 by "1B and 1D." Terminals 571 and 572 are connected to the input and output, respectively.

FIG. 24 also illustrates the parallel connected B and D type cathode follower circuits in schematic form. The cathode follower tubes 573 and 574 together with their associated components are each identical to the cathode follower circuit illustrated in FIG. 23. With respect to the parallel combination of cathode followers, a common D.C. level input from terminal 571 supplies grids 577 and 578 through associated resistors 579 and 580, respectively. The anode supply is connected to the anodes of tubes 573 and 574 from terminals 582 and 583, respectively, through resistors 584 and 585, respectively. The output of the cathode followers is coupled to output terminal 572 through junction points 587 and 588, respectively. The effective POWER output of the two cathode followers in parallel is equal to the sum of the individual outputs of each cathode follower, while the plate dissipation of each may remain within permissible limits.

FIG. 25 illustrates in block and schematic form interconnected cathode follower circuits of the B and J type designated by the block diagrams indicated at 610.

Referring to the block diagram of FIG. 25, a J type cathode follower 601 has a D.C. level applied at input terminal 602 to obtain a D.C. level output on conductor 603. The B type cathode follower 604 has a D.C. level applied to input terminal 605 to obtain a D.C. level output on conductor 606. The D.C. $_X$OR circuit 608, in fact an interconnection of the cathodes of the vacuum tubes used in the blocks 601 and 604, is represented in block form to illustrate a logical function.

Referring to the schematic diagram of FIG. 25, there is illustrated the B and J type cathode follower tubes sharing a common cathode impedance. The J type cathode follower includes tube 611 having a cathode 612, a control grid 613 and an anode 614. Input terminal 602 is connected to control grid 613 of tube 611 through parasitic suppressor 616. The positive anode supply is connected from terminal 618 through parasitic suppressor resistor 619 to anode 614. The operation of the B type cathode follower including tube 573 and associated circuits is identical to the cathode follower already described with respect to FIGS. 23 and 23*a*.

Since each cathode follower circuit has a separate associated input, the circuits are not connected in parallel. Rather, they share a common cathode impedance comprising resistors 560 and 561 connected in parallel. The cathodes of tubes 573 and 611 are interconnected at terminal 621, while a single output conductor 609 delivers the output.

To avoid confusion in terminology, the D.C. type diode circuits are considered as four basic logical circuits which are defined as follows:

| Name | Definition |
|---|---|
| Positive AND | A positive AND circuit requires that all inputs be positive for a positive output. |
| Positive OR | A positive OR circuit gives a positive output if any input is positive. |
| Negative AND | A negative AND circuit requires that all inputs be negative for a negative output. |
| Negative OR | A negative OR circuit gives a negative output if any input is negative. |

With respect to the logical circuits illustrated throughout FIGS. 2 through 20, D.C. AND circuits and pulsed OR circuits are used in the apparatus herein described.

Figure 26:
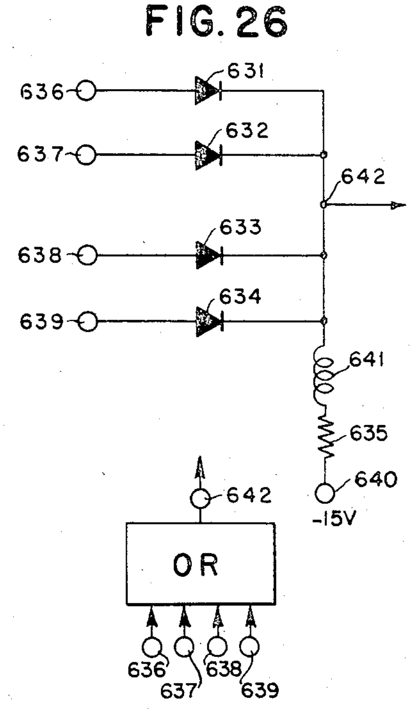
FIG. 26 illustrates in block and schematic form a multiple input logical OR circuit of the pulse type shown in block form throughout FIGS. 2 through 20.

FIG. 26 illustrates in block and schematic form a pulsed OR circuit of the type illustrated in block form throughout the logical diagrams of FIGS. 2 through 20. The circuit diagram of FIG. 26 illustrates a pulsed OR circuit of the type used to drive a gate circuit or a pulse amplifier circuit, the latter type circuits being illustrated in FIGS. 22, 28 and 29, respectively. The cathodes of diodes 631 to 634 inclusive are shown connected through an inductance 641 to one end of a common load resistor 635, the other end of which is connected to a terminal 640 to which a source of 15 volts negative potential is applied. The anodes of diodes 631 to 634 inclusive are connected to input terminals 636 through 639, respectively. As is well-known in the art, a diode is a device which permits current to flow freely in the direction indicated by the arrowhead, but offers a high impedance to current flow in the reverse direction. The input terminals 636 through 639 are connected to a source of negative 15 volts from the secondary winding of the output transformer of the driving circuit employed. It is noted that a pulsed OR circuit is driven either by a gate circuit, an A or B type Pulse Amplifier or a Register Driver, illustrated in FIGS. 22, 28, 29, and 30, respectively. Each of the driving circuits delivers a pulse through an output transformer, the secondary winding of which is connected to a source of negative 15 volts. Thus diodes 631 through 634 normally have a potential of negative 15 volts applied to each side, or an effective potential of zero volts is applied thereacross.

The input pulse to the OR circuit in the ensuing discussion is a $\frac{1}{10}$ microsecond positive pulse, heretofore referred to, this pulse being of an order of magnitude of approximately 30 volts with respect to the reference level of $-15$ volts. Assuming a $\frac{1}{10}$ microsecond pulse is applied to input terminal 636, for example, the RC time constant of the back resistance of diode 631 and the input capacity of the load circuit (gate or pulse amplifier circuit) causes the voltage on the grid of the load circuit, connected to OR circuit output terminal 642, to remain more positive than negative 15 volts. If the above RC circuit action prevents the input wave from discharging to negative 15 volts before the next input pulse arrives, the result is to limit the amplitude of the next input pulse, since the diode does not conduct until the amplitude of the leading edge of the next pulse exceeds the amplitude of the trailing edge of the preceding pulse. To prevent this condition from occurring, choke 641 is connected to output terminal 642, as shown, to offset the capacitance effect in the time constant and thereby reduce the fall time of each input pulse. If the coil alone is employed to compensate for the capacitive effect, the high Q of the coil causes the trailing edge of the input waveform to overshoot in a negative direction and tend to remain at this lower level. To overcome this, a load resistor 635 is connected between the choke and the source of negative 15 volts which lowers the Q of the circuit, causing rapid recovery of the overshoot.

Reference is made to FIG. 21 for a description of the OR circuits used with a flip-flop. Since the OR circuit for the left input section is like the OR circuit for the right input section, a discussion of the OR circuit for the left input suffices for an understanding of both. The OR circuit for the left input section of flip-flop 400 includes diodes 406 and 407, transformer primary winding 408, resistor 460, capacitor 461 and a source of negative 15 volts, connected as shown. It is noted that except for the substitution of transformer 409 for choke 641 and the addition of condenser 461, the OR circuit for the left input section of flip-flop 400 is similar to the OR circuit of FIGURE 26. The load is directly coupled to the OR circuit of FIGURE 26 whereas the load is transformer coupled to the OR circuit in FIGURE 21. Capacitor 461 is employed to compensate the transformer reactance and limit negative overshoot. An additional diode is connected to the transformer primary winding 408 for each additional input circuit.

While the effect of a single input pulse to the OR circuit of FIG. 26 has been considered, the effect resulting from two or more input pulses is the same, i.e. the OR circuit operates to pass a pulse to the load circuit. With respect to the illustration of OR circuits in block form in the logical diagrams of FIGS. 2 through 20, inputs and outputs are shown connected to any side of the block for ease of illustration.

Figure 27:
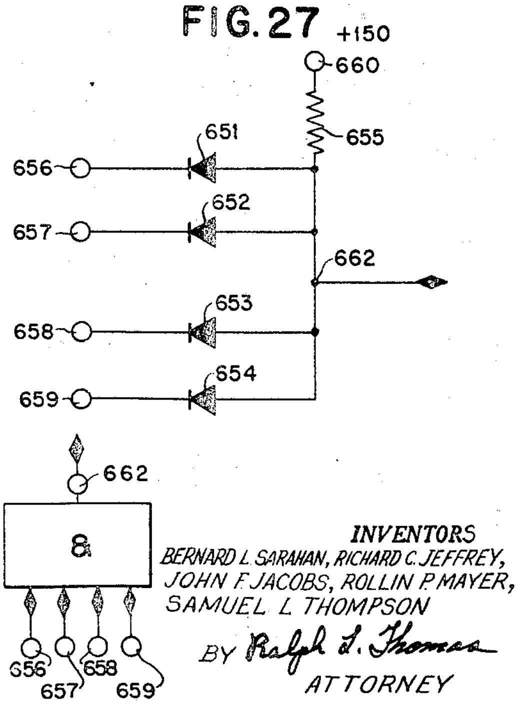
FIG. 27 illustrates in block and schematic form a multiple input logical AND circuit of the type shown in block form throughout FIGS. 2 through 20.

Referring to FIG. 27, there is shown in block and schematic form a positive AND circuit of the type illustrated in block form in logical diagrams, FIGS. 2 through 20 inclusive. As shown, the circuit is similar to the OR network except that the diodes 651 to 654 inclusive are reversed and the load resistor is connected to a source of positive potential at terminal 660. The positive AND circuit requires positive input pulse to the terminals 656 through 659 in order to obtain a positive output pulse.

Assuming all inputs at terminals 656 to 659 inclusive are at a D.C. level of positive 10 volts, a net potential of 140 volts exists across the circuit between output terminal 660 and each of the input terminals 656 to 659 inclusive. Under these conditions, current flows through the forward direction of the diodes 651 to 654 inclusive, making the potential at the anode of each diode the same as its input terminal except for the negligible voltage drop across the diode. The D.C. level at output terminal 662 is effectively positive 10 volts.

However, if the potential to one of the input terminals such as terminal 656, for example, is lowered to a negative value, for example negative 30 volts, the net voltage across the circuit between terminals 660 and 656 is increased to 180 volts. The output terminal 662 is effectively connected to input terminal 656 since the diode 651 is conducting, and there is relatively little voltage drop thereacross. This places a net potential of 40 volts across diodes 652 to 654 inclusive in the reverse direction, preventing these diodes from conducting in the forward direction.

While only two inputs have been shown in the logical AND circuits of FIGS. 2 through 20, the operation of a two input AND circuit is identical to the four input AND circuit above described. The inputs to the block diagram AND circuits as well as gate circuits of FIGS. 2 through 20 are shown as entering on any side, including the same side, of the block for ease of illustration. The logical AND circuits differ from the OR circuits in having D.C. level inputs, generally provided by cathode followers, rather than pulse inputs, usually supplied to OR circuits by gate circuits or pulse amplifiers.

Figures 28, 29, 30:
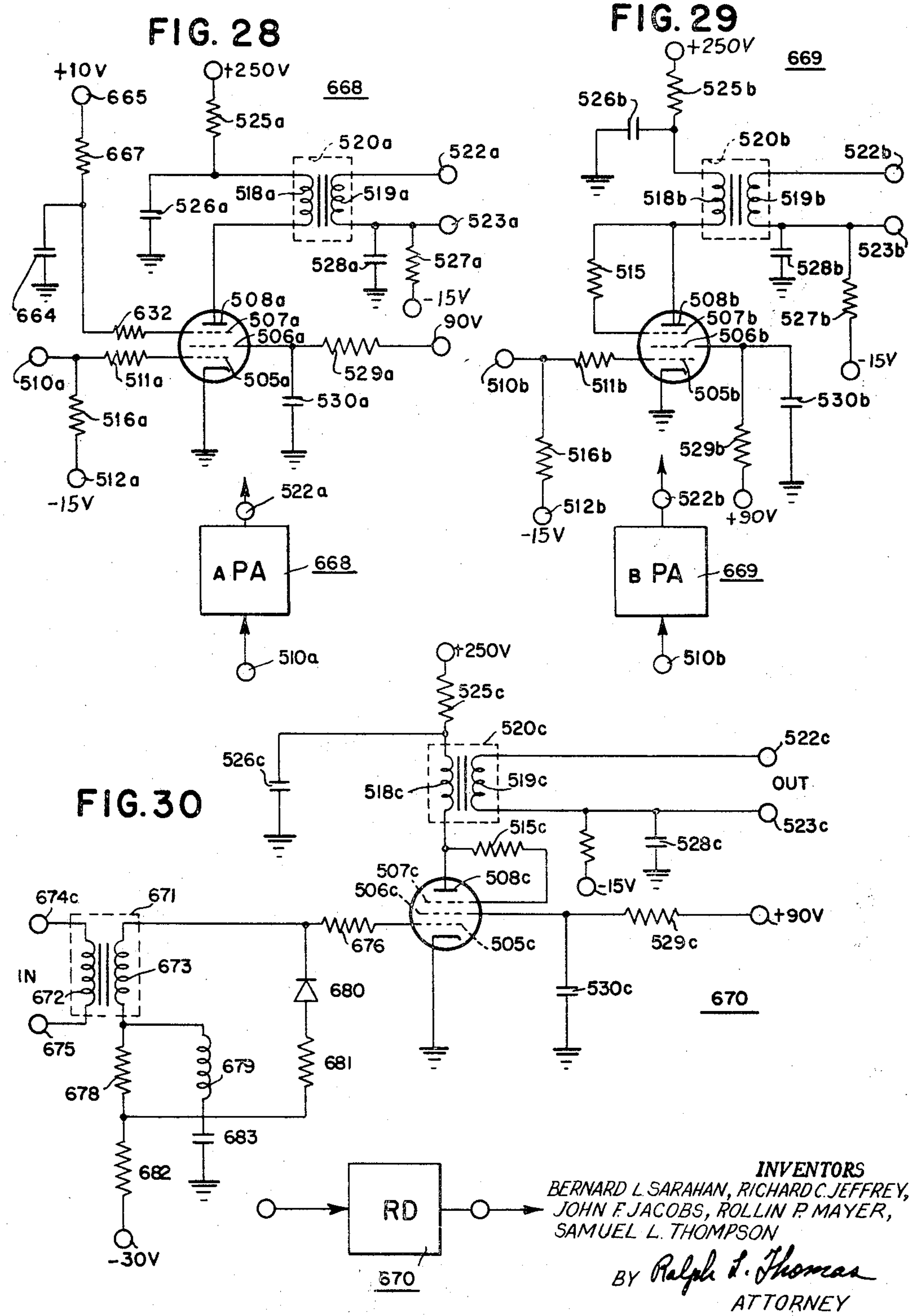
FIG. 28 illustrates in block and schematic form the A type Pulse Amplifier shown in block form in FIGS. 2 through 20.
FIG. 29 illustrates in block and schematic form the B type Pulse Amplifier shown in block form in FIGS. 2 through 20.
FIG. 30 illustrates in block and schematic form the Register Driver Circuit shown in block form in FIGS. 2 through 20.

FIG. 28 illustrates in block and schematic form the type A Pulse Amplifier shown in block form in the block diagrams of FIGS. 2 through 20. The reference numbers which identify components of the gate circuit 500, illustrated in FIGURE 22, are also used with the letter *a* affixed to identify corresponding components in the type A Pulse Amplifier illustrated in FIGURE 28. Since the type A Pulse Amplifier is similar to the gate tube circuit illustrated in FIGURE 22, reference is made to the preceding discussion of FIGURE 22 for a description of components common to both circuits.

The type A Pulse Amplifier 668 differs in one respect from the gate circuit 500 in that the suppressor grid 507*a* of the Type A Pulse Amplifier (corresponding to grid 507 in the gate circuit) is connected to a constant source of positive D.C. potential from terminal 665 through decoupling resistor 667 and parasitic resistor 632. The type A Pulse Amplifier circuit is therefore constantly conditioned to receive and pass a pulse applied to its control grid 505*a*. Capacitor 664, associated with resistor 667, serves as a decoupling capacitor. The type A Pulse Amplifier serves to produce an output pulse across secondary winding 519*a* of transformer 520*a* when a 1/10 microsecond positive pulse is received on input terminal 510*a*.

FIG. 29 illustrates in block and schematic form the type B Pulse Amplifier which differs from the type A Pulse Amplifier in having a greater power output. The reference numbers which are applied to components of gate circuit 500, illustrated in FIGURE 22, are also used with the letter *b* affixed to identify corresponding parts in the type B Pulse Amplifier illustrated in FIGURE 29. Since the type B Pulse Amplifier is similar to the gate tube circuit illustrated in FIGURE 22, reference is made to the preceding discussion of FIGURE 22 for a description of components common to both circuits. The type B Pulse Amplifier differs from the gate circuit in that the suppressor grid 507*b* of the type B Pulse Amplifier is connected by a resistor 515 to anode 508*b*. Like the type A Pulse Amplifier, the type B Pulse Amplifier is always conditioned to receive a 1/10 microsecond positive pulse on its control grid 505*b* and yield a positive output pulse on output terminals 522*b* and 523*b*. The type B Pulse Amplifier is capable of driving a load on the order of 50 to 100 percent greater than the load which can be driven by the type A Pulse Amplifier.

FIG. 30 illustrates in block and schematic form a Register Driver 670 labelled RD throughout FIGS. 2 through 20. The register drivers, either singly or in combination, are employed for simultaneously pulsing a plurality of gate tubes, a plurality of flip-flops or another heavy load device. The reference numbers which identify components of the type B Pulse Amplifier 669, illustrated in FIGURE 29, are also used with the letter *c* affixed to identify corresponding components in the Register Driver, illustrated in FIGURE 30.

Since the Register Driver 670 is similar to the B type Pulse Amplifier, reference is made to the preceding discussion of FIGURE 29 for a description of components common to each circuit. Unlike the type B Pulse Amplifier, the Register Driver 670 employs a coupling arrangement including a transformer feeding its control grid 505*c*. A transformer 671, having a primary winding 672 and a secondary winding 673, delays an input pulse supplied to control grid 505*c*. The one side of the secondary winding 673 is connected through resistor 676 to control grid 505*c*, while the other side of the secondary winding 673 is connected to a negative 30 volt D.C. source through resistors 678 and 682. In addition, resistors 678 and 681 in series with diode 680 constitute a serial circuit connected across the secondary winding 673, and inductor 679 and condenser 683 are connected in series between the lower side of transformer secondary 673 and ground. The transformer 671 is a step up transformer employed to increase the magnitude of the input pulse. The other elements in the grid circuit function to reduce positive overshoot in the grid voltage, to match the characteristics of the circuit supplying the input pulse, and to minimize loss of voltage to the grid of the tube. A 1/10 microsecond positive pulse applied to input transformer 671 causes register driver 670 to yield a positive pulse between output terminals 522*c* and 523*c*.

All pulse lines, shown with a conventional arrowhead, interconnecting the various units shown in block form throughout FIGURES 2 through 20 have a negative D.C. level established thereon in the absence of a positive pulse. All D.C. level lines, shown with a diamond shaped arrowhead, have either a positive or a negative D.C. level established thereon depending on the state of the flip-flop which controls these lines.

While there have been shown and described and pointed out the fundamental novel features of the invention as applied to a particular embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a computer, an adder having stages corresponding to the orders of a multi-digit number, a register having corresponding stages connected to said adder stages for holding and supplying to said adder stages first signals representing the orders of a first multi-digit number, means for supplying to said adder stages second signals representing the corresponding orders of a second multi-digit number at the same time that said first signals are supplied, and means for causing said adder stages successively to provide to successive stages of said register, at least one removed from said corresponding stages, order by order as they are derived, third signals representing the total of said first and second multi-digit numbers to replace in said register said first signals with signals representing said total displaced at least one order.

2. The apparatus of claim 1 which includes means for shifting signals from stage to stage in said register, and means for causing a said shift operation in lower order stages of said register while said adder is providing total signals to the higher order stages of said register.

3. The apparatus of claim 1 which includes means for shifting signals successively from stage to stage in said register and means for operating said adder means to provide total signals to lower order stages of said register while said shifting means is operating to shift signals in the higher order stages of said register.

4. The apparatus of claim 1 wherein said first and second signals are D.C. signals and said third signal is a pulse.

5. The apparatus of claim 1 which includes a second register having stages for holding signals representing the orders of a multi-digit number, one of said stages being adapted to be coupled to the lowest order stage of said adder to receive said third signal from said adder stage.

6. The apparatus of claim 1 which includes a second register having stages for holding signals representing the orders of a multi-digit number, one of said stages being coupled to the lowest order stage of said adder to receive said third signal from said adder, and means for shifting the signals from said one of said stages successively to other stages of said second register.

7. The apparatus of claim 1 which includes means for shifting signals from stage to stage in said register, a second register having stages for holding signals representing the orders of a multi-digit number, means for shifting the signals in said second register from stage to stage, means for coupling one of said stages of said second register to the lowest order stage of said adder to receive said third signal from said adder, and means for coupling another stage of said second register to said adder and said first named shift means to cause alternative operation of said adder and shift means according to the nature of the signal contained in said other stage.

8. In a computer, an adder having stages corresponding to the orders of a multi-digit number, a register having corresponding stages connected to said adder stages for holding and supplying to said adder stages first signals representing the orders of a first multi-digit number, means for supplying to said adder stages second signals representing the corresponding orders of a second multi-digit number, at the same time that said first signals are supplied, and means for causing said adder stages successively to provide to successive stages of said register at least one removed from said corresponding stages, order by order as they are derived, third signals representing the total of said first and second multi-digit numbers to replace in said register said first signals with signals representing said total displaced at least one order, said last-named means including means for supplying to each of said adder stages above the lowest order a carry signal from the preceding stage.

9. The apparatus of claim 8 wherein said first and second signals are D.C. signals and said carry signal is a pulse.

10. The apparatus of claim 8 wherein said first and second signals are D.C. signals and said third and carry signals are pulses.

11. The apparatus of claim 8 which includes means for shifting the signals representing said total in said register to the stage corresponding to the adder stage from which they were derived, for supplying to the lowest order adder stage a signal representing a carry other than zero, and for causing said adder stages successively to provide to said removed stages of said register order by order signals representing the sum of said carry and said total.

12. In a computer, a register having stages for static storage of signals representing the orders of a multi-digit number, means for supplying said signals successively to said stages, means for shifting said signals successively from stage to stage of said register, and means for causing said two means to operate simultaneously on different stages of said register.

13. The apparatus of claim 12 wherein said first named means is an adder.

14. In a digital computer, first and second registers having stages for storing signals representing the sign and orders of a multi-digit number, complementing means for changing the signals held in said second register to represent the complement of the number represented by the previous signals, adder means coupled to said registers for deriving signals representing the total of the numbers represented by the signals held in said registers and for supplying said total signals to said first register to replace the signals previously held therein, means operative prior to each operation of said adder means to sense and compare the signals held in corresponding selected stages of said first and second registers and to cause operation of said complementing means when a predetermined relationship between said compared signals is sensed, and means for operating said adder means after each operation of said sensing means, including means controlled by the presence of a predetermined signal in said selected stage of said second register for causing said adder means simultaneously to derive said total plus an additional digit in the lowest order.

15. The apparatus of claim 14 wherein said selected stages are stages representing the respective signs of the numbers held in said registers.

16. The apparatus of claim 14 which includes means for shifting the signals in said first register between each operation of said sensing means, and said adder means.

17. The apparatus of claim 14 wherein said adder means is adapted to provide signals representing a carry from the highest order of the total and which includes means responsive to said carry signals for registering signals corresponding thereto.

18. The apparatus of claim 14 which includes a third register adapted to be coupled to said first register to receive and hold signals representing the lower orders of a number held in said first and third registers combined, and means including a signal supplied by said adder means and representing a carry from the highest order of the total for replacing the signals in said third register with signals corresponding to said carry signals.

19. In a computer, a first means having stages for holding signals representative of a first number, the digit in each order of said first number being represented by D.C. signals, said first means having N stages, a second means having at least N stages for holding signals representative of a second number, the digit of each order of said second numbers being represented by D.C. signals, a plurality of adders, one corresponding to each stage of said first means, first connecting means for simultaneously transmitting the D.C. signals representative of digits of said first and second numbers from corresponding stages of said first and second means to the corresponding adder, each of said adders including first totalizing means responsive to the D.C. signals supplied by said first connecting means to produce a D.C. signal representative of their sum, second connecting means for transmitting a pulse signal representative of a carry from each adder to a pulse input of its succeeding adder, each adder including second totalizing means responsive to the D.C. signal from said first totaling means and a pulse signal representative of a carry from said second connecting means to produce a pulse signal representative of the resultant sum and a pulse signal representative of the resultant carry, means to apply the pulse signal representative of the resultant carry to the second connecting means of the succeeding adder to initiate operation of the second totalizing means of that adder, input means for supplying a pulse signal representative of a carry to the lowest order adder to initiate operation of that adder, storage means responsive to signals representative of a carry number greater than zero from the highest order adder of said plurality of adders for indicating a carry greater than zero, and means coupled to said storage means and said input means for causing said plurality of adders to add the signal representative of a carry number other than zero to the contents of said second means for holding a number.

References Cited in the file of this patent

UNITED STATES PATENTS

| | | |
|---|---|---|
| 2,404,047 | Flory | July 16, 1946 |
| 2,635,229 | Gloess et al. | Apr. 14, 1953 |
| 2,672,283 | Havens | Mar. 16, 1954 |
| 2,679,975 | Grosvalet | June 1, 1954 |
| 2,685,407 | Robinson | Aug. 3, 1954 |
| 2,686,632 | Wilkinson | Aug. 17, 1954 |
| 2,776,794 | Williams et al. | Jan. 8, 1957 |

OTHER REFERENCES

ERA, "High Speed Computing Devices," 1950, page 93.

"The Transistor" by Bell Telephone Lab. Copyright 1951 (pages 534 to 538, 559 to 562).

(Other references on following page)

OTHER REFERENCES

"A Functional Description of the EDVAC," Univ. of Penn., Moore School of Engineering, vol. I: pages 4–13 to 4–22a; vol. II: Figs. 104–3LD–2, 104–3LC–3 (total 11 pages) (deposited in Patent Office May 3, 1951).

Argonne Nat. Lab., "Progress Report on the Argonne-Oak Ridge Digital Computer, ANL–4600, March 5, 1951, pages 11, 12, 18, 19, 24, 25, 26, 37, 39 and 40 relied on.

Estrin: "A Description of the Electronic Computer at the Institute for Advanced Studies," Proc. Assoc. for Comp. Mach., September 1952, pages 96, 97, 98, 101, 102, 108 and 109 relied on.

Chu: "The Oak Ridge Automatic Computer," Proc. Assoc. for Comp. Mach., September 1952, page 145 relied on.

"Description of a Magnetic Drum Calculator," Annals of Comp. Lab. of Harvard University, vol. XXV (pages 100 through 112), 1952.

Electronic Engineering, October 1952 (pages 442–445), "The Phys. Realiz. of an Electronic Dig. Comp." by A. D. Booth.

Electronic Engineering, January 1953, "Multiplication in the Manchester University High Speed Digital Computer" by Robinson (pages 6 to 10).